William H. Robertson
and Eric R. Coe
Inventors

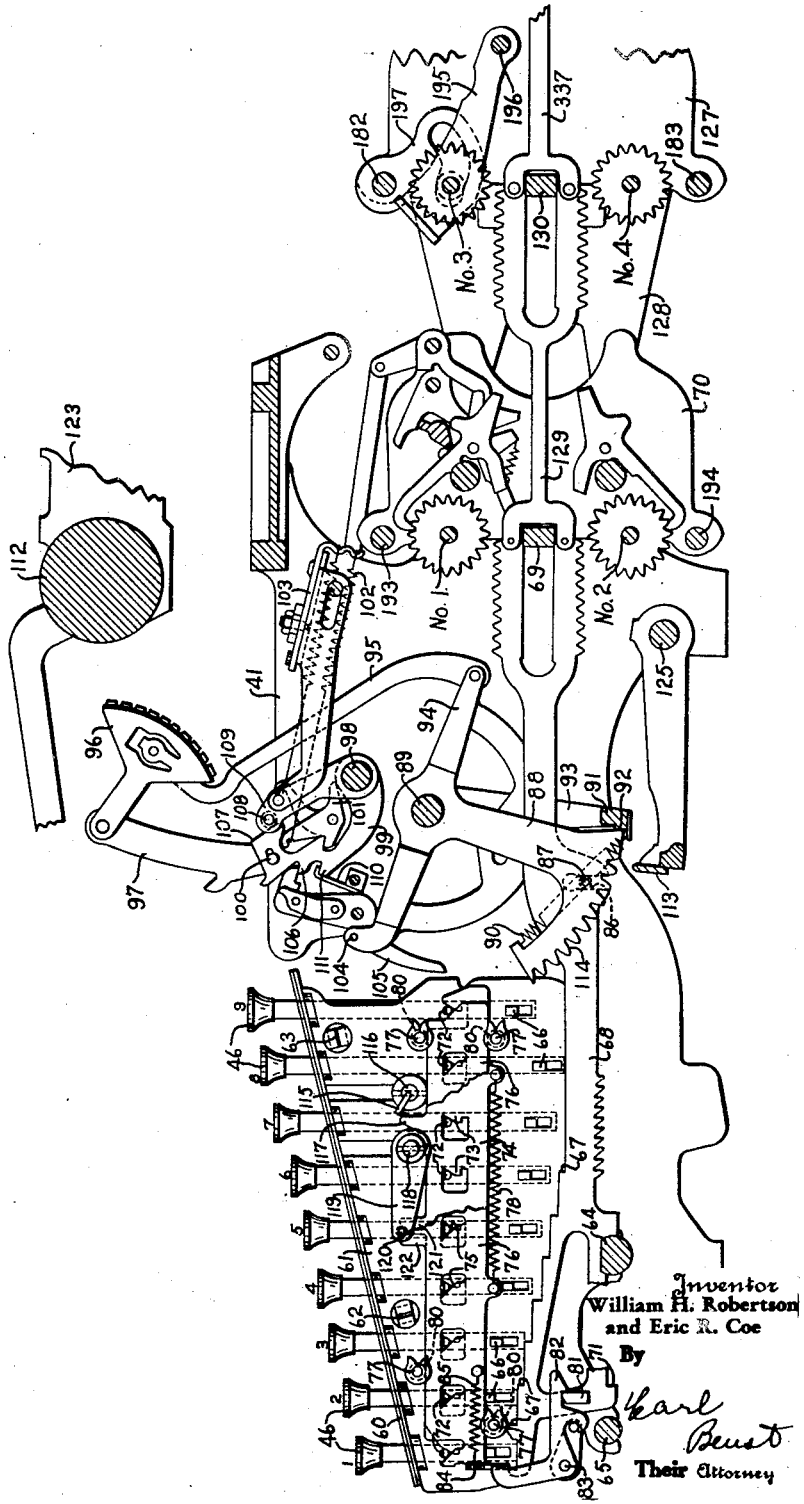

By Earl Benst
Their Attorney

Oct. 26, 1943.   W. H. ROBERTSON ET AL   2,332,755
ACCOUNTING MACHINE
Filed April 27, 1940   34 Sheets-Sheet 5
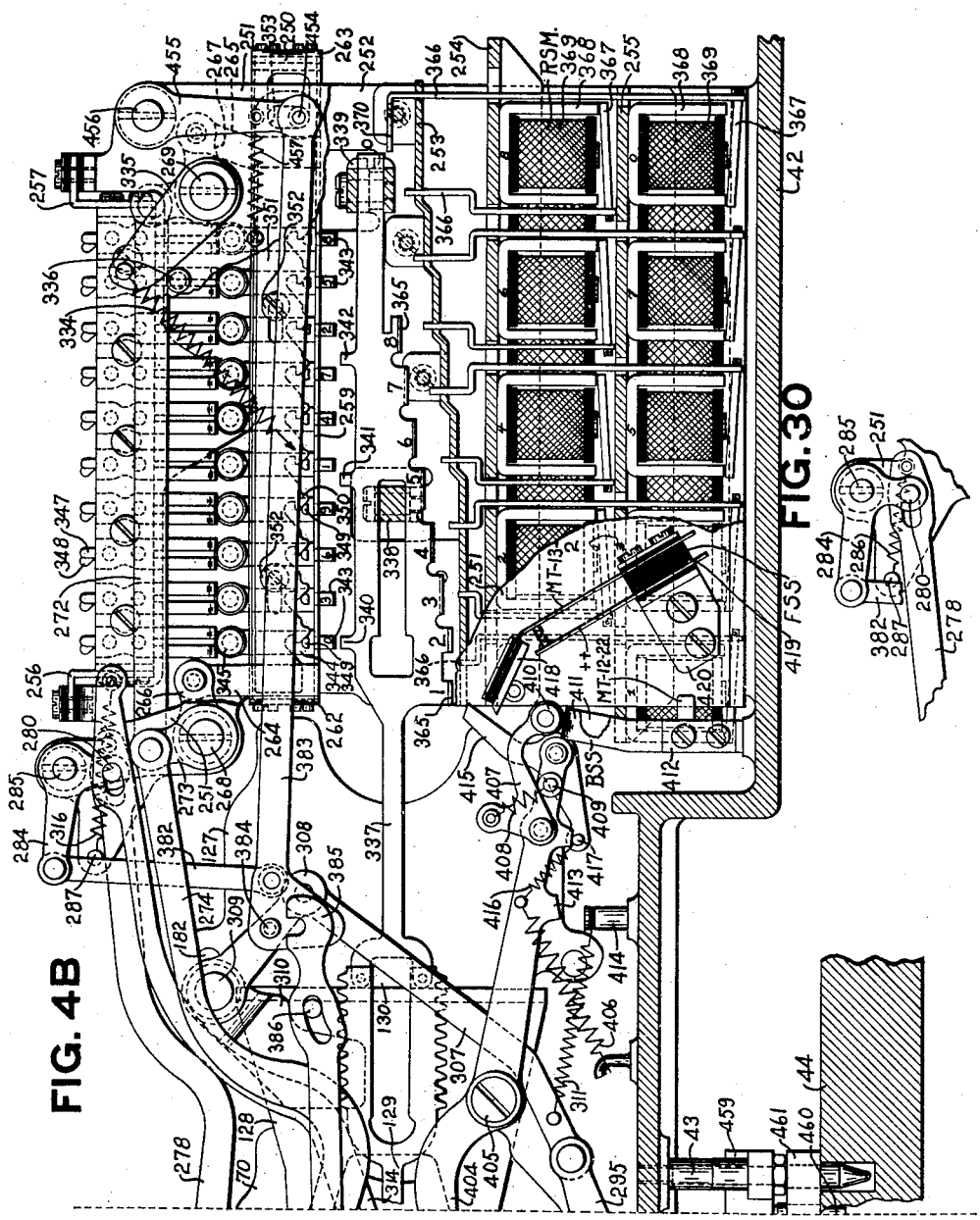
William H. Robertson
and Eric R. Coe
Inventors
By Kearl Beust
Their Attorney

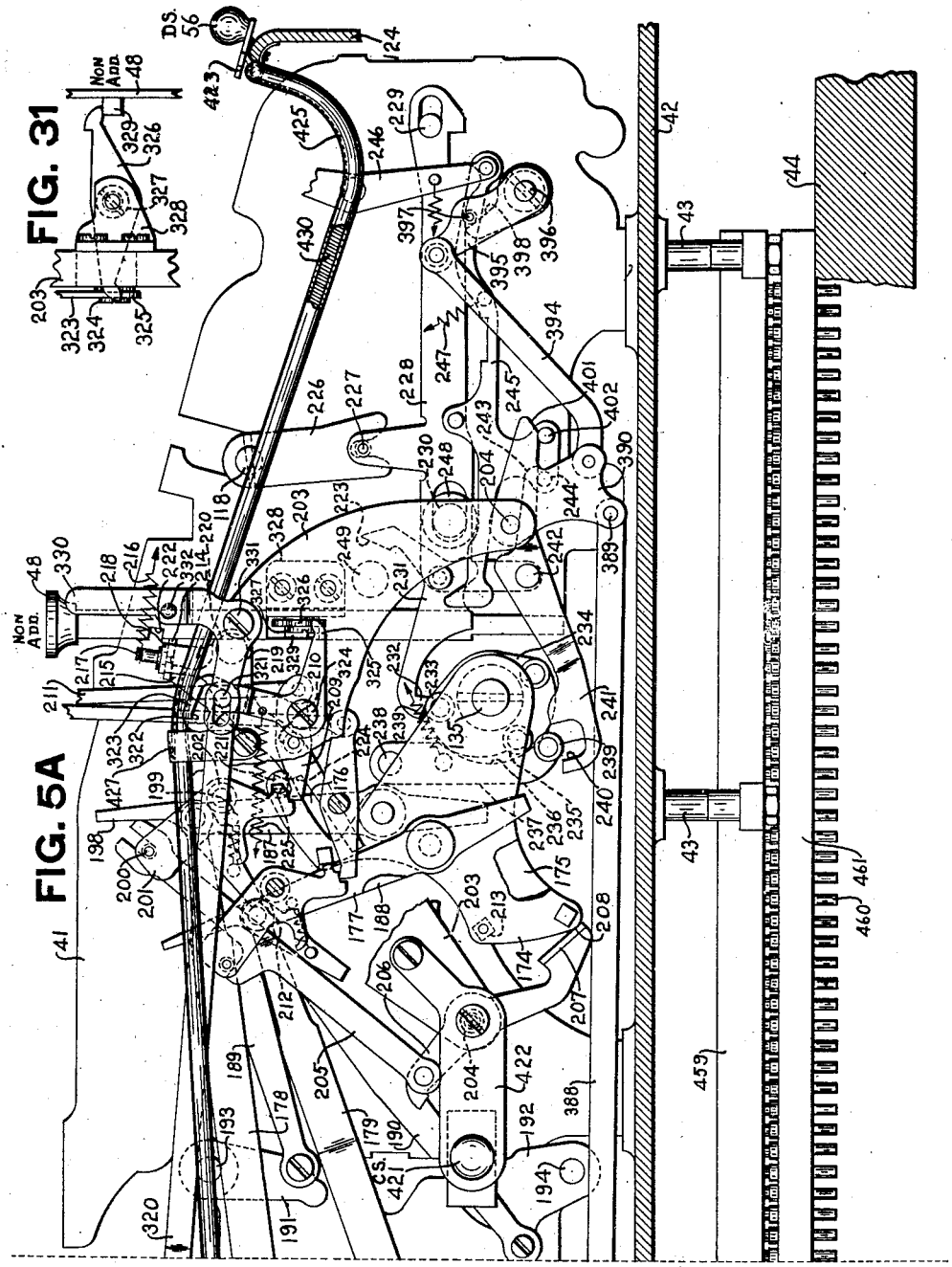

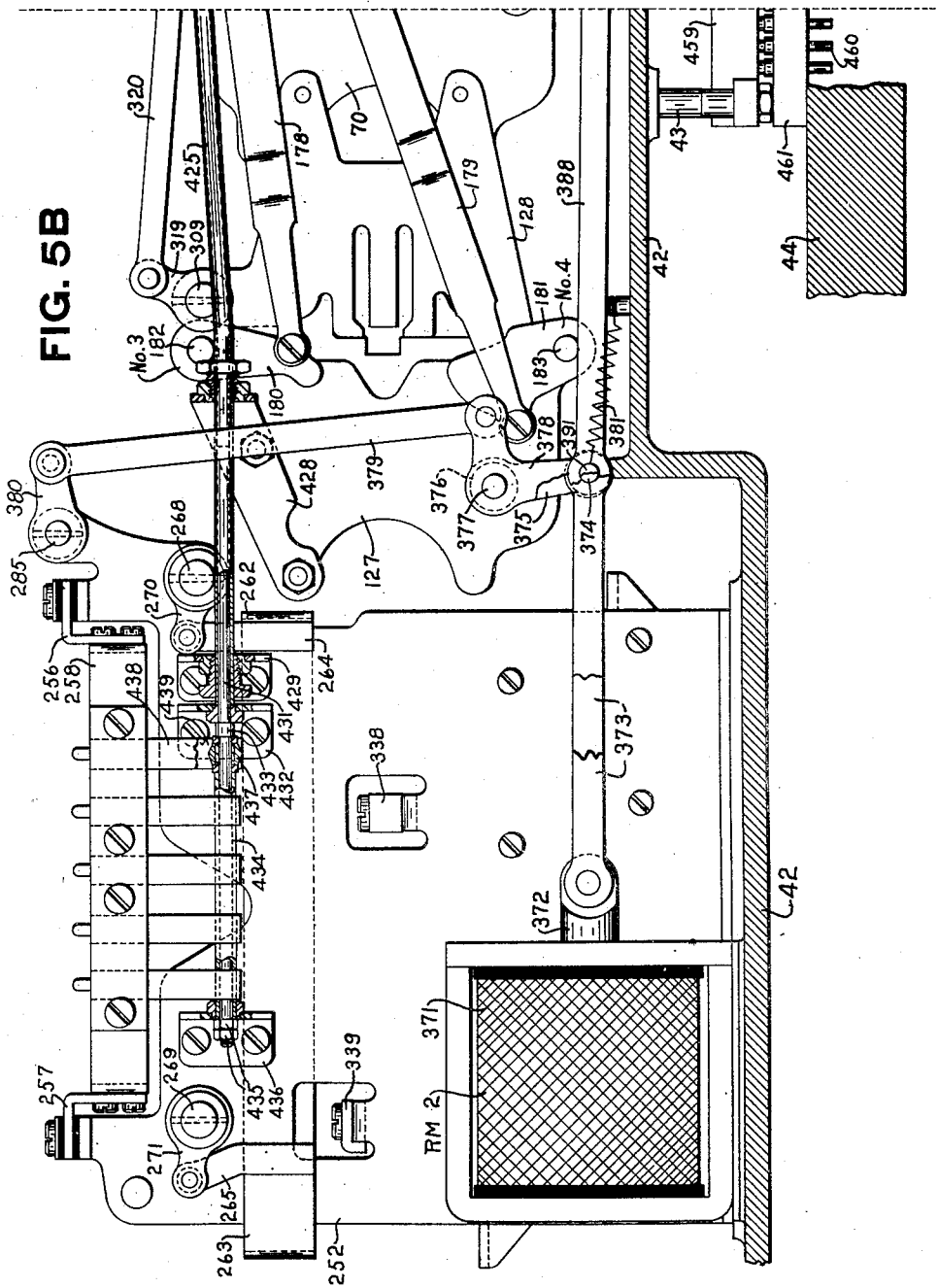

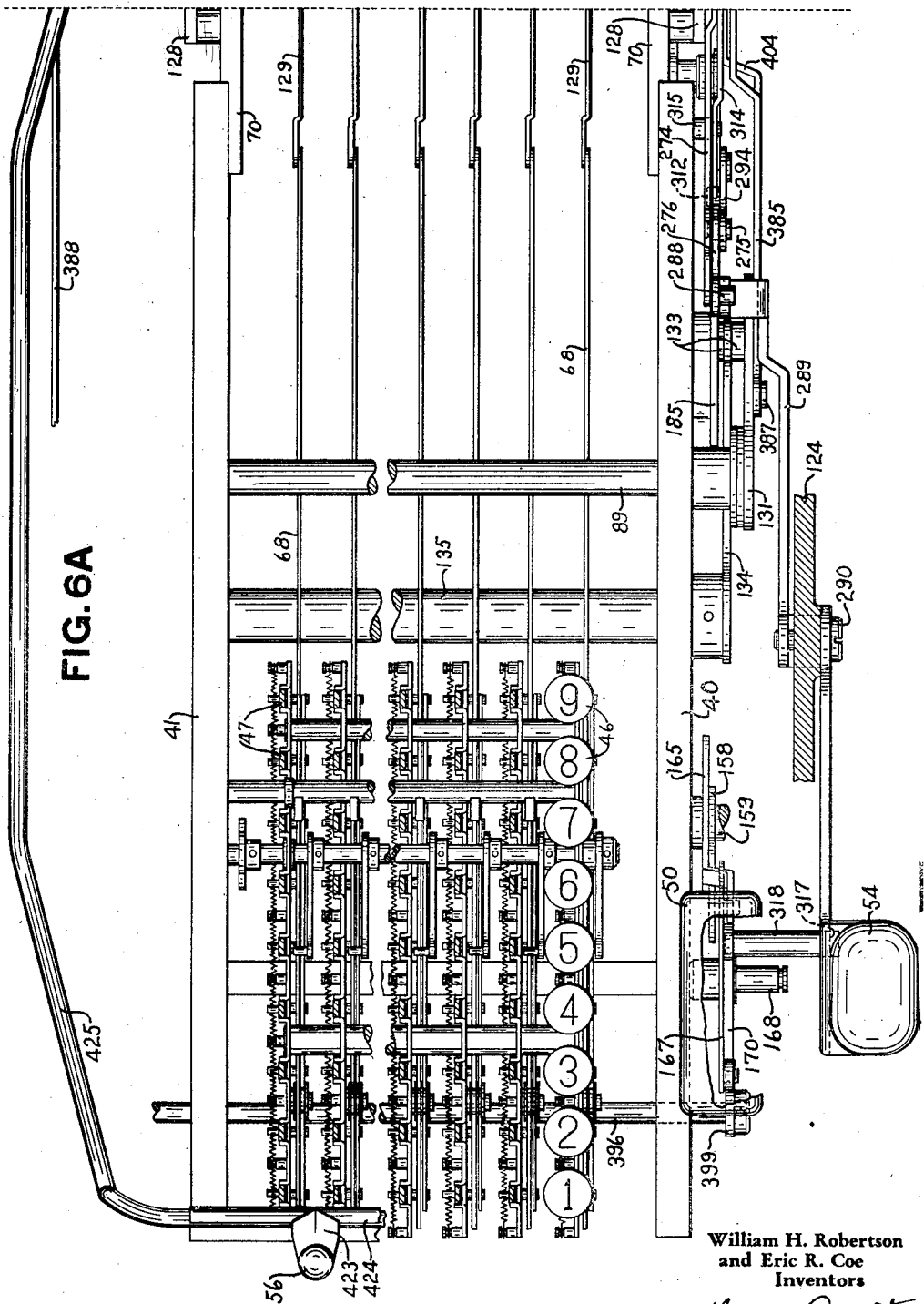

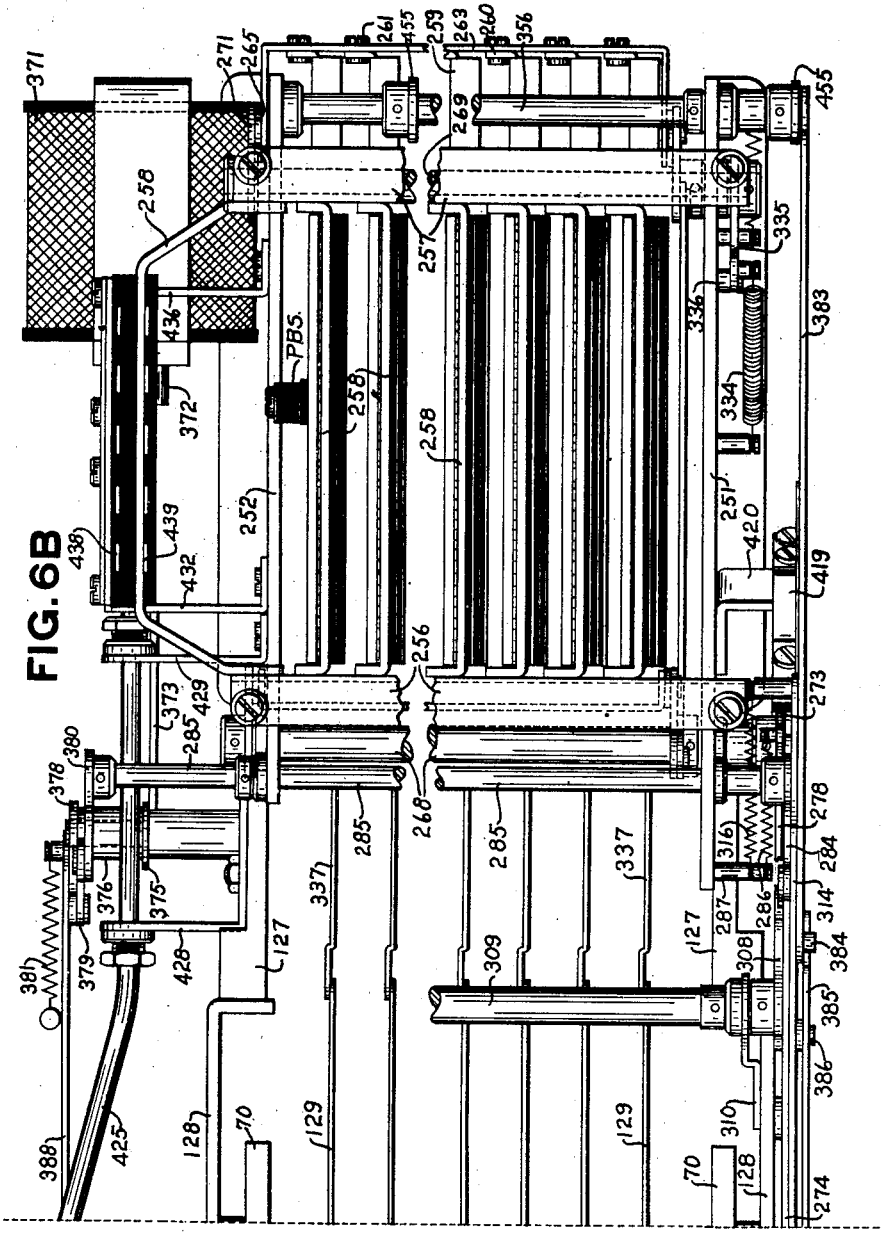

Oct. 26, 1943.    W. H. ROBERTSON ET AL    2,332,755
ACCOUNTING MACHINE
Filed April 27, 1940    34 Sheets-Sheet 10
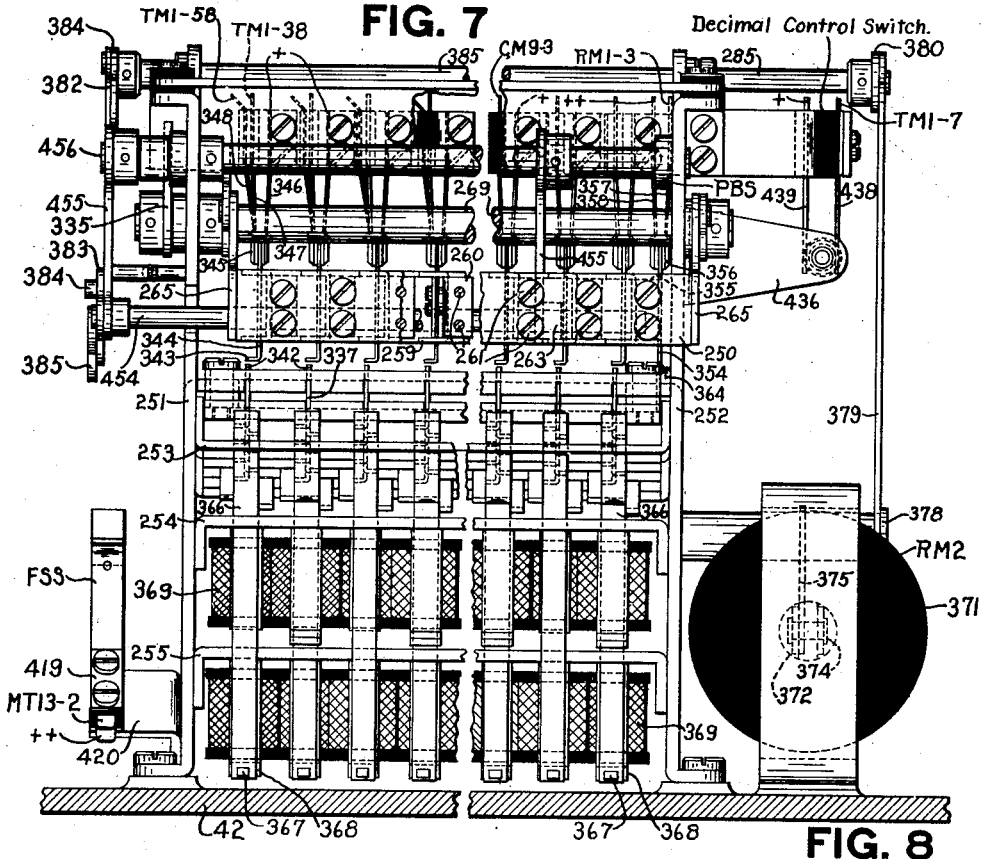
FIG. 7
FIG. 8
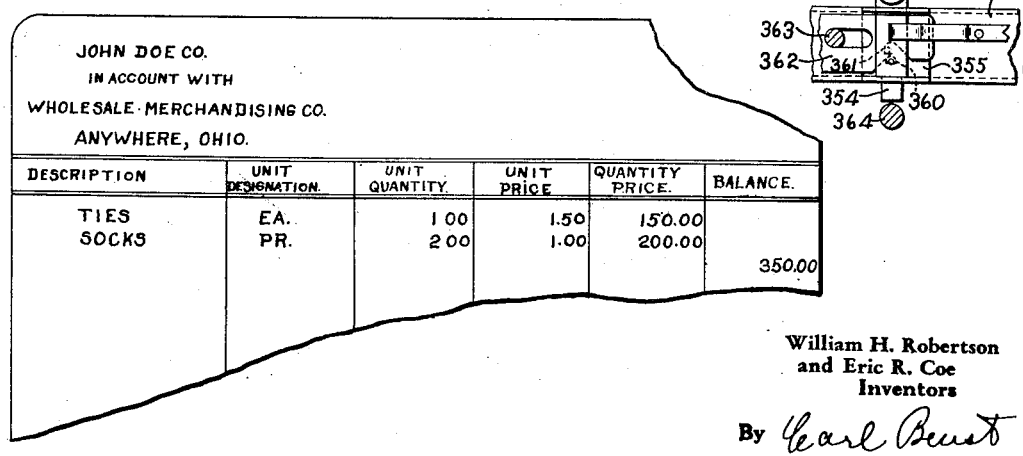
FIG. 32
William H. Robertson
and Eric R. Coe
Inventors
By Carl Beust
Their Attorney Oct. 26, 1943. W. H. ROBERTSON ET AL 2,332,755
ACCOUNTING MACHINE
Filed April 27, 1940 34 Sheets-Sheet 11
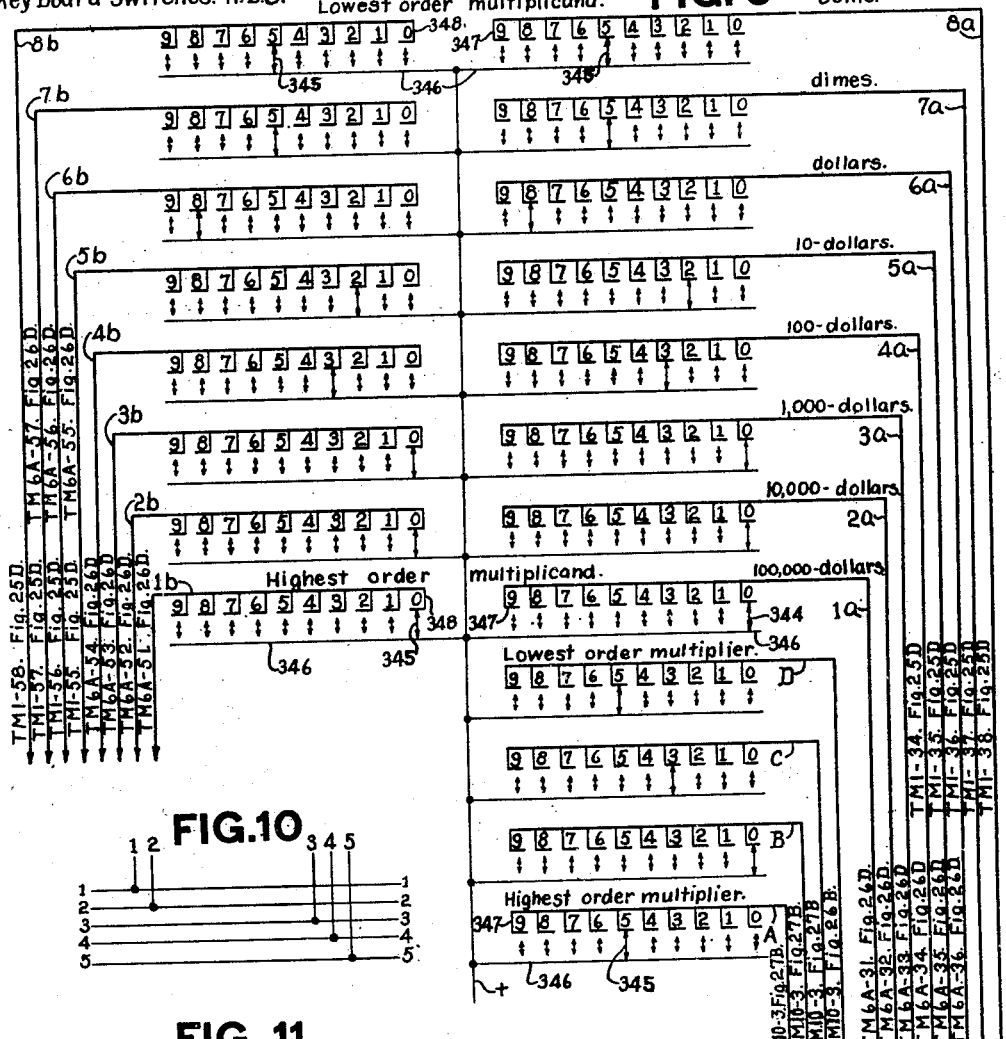
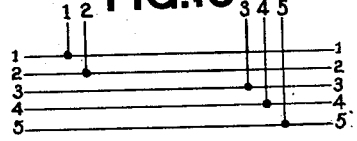
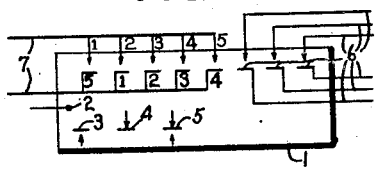
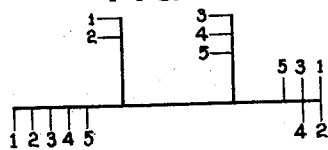
William H. Robertson
and Eric R. Coe
Inventors
By *Pearl Beust*
Their Attorney

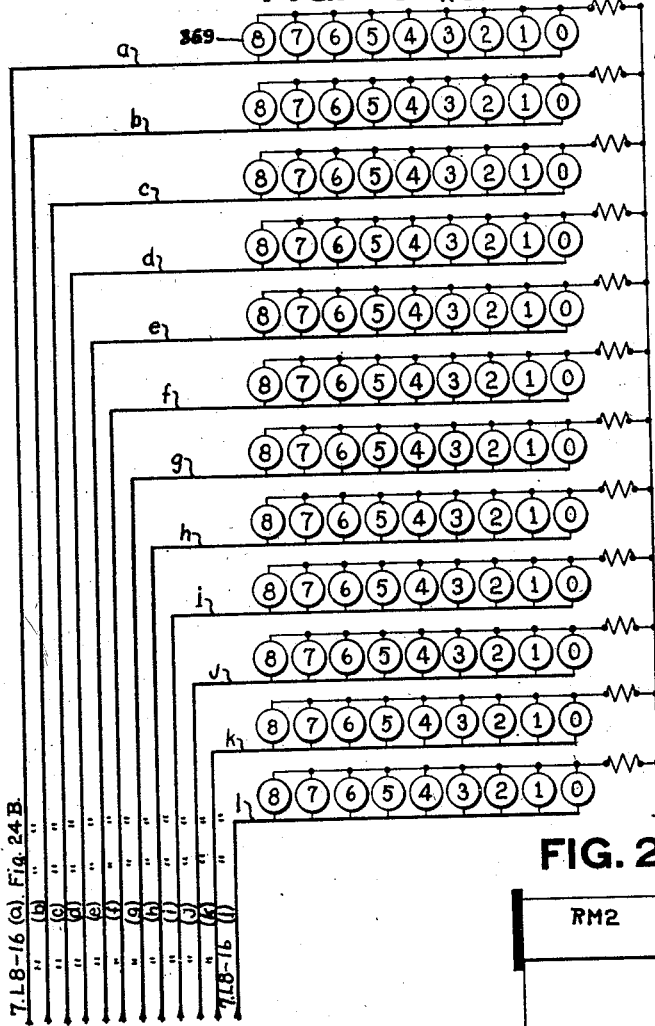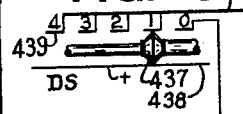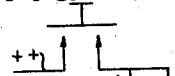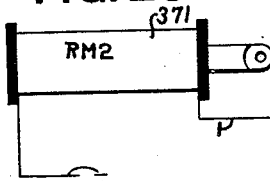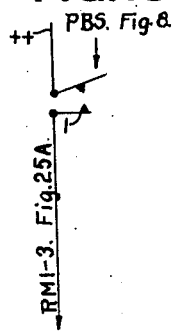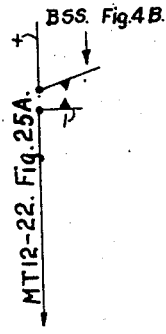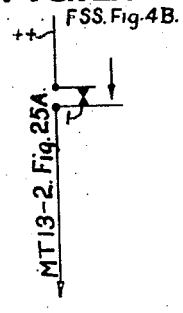

Oct. 26, 1943.   W. H. ROBERTSON ET AL   2,332,755
ACCOUNTING MACHINE
Filed April 27, 1940    34 Sheets-Sheet 13
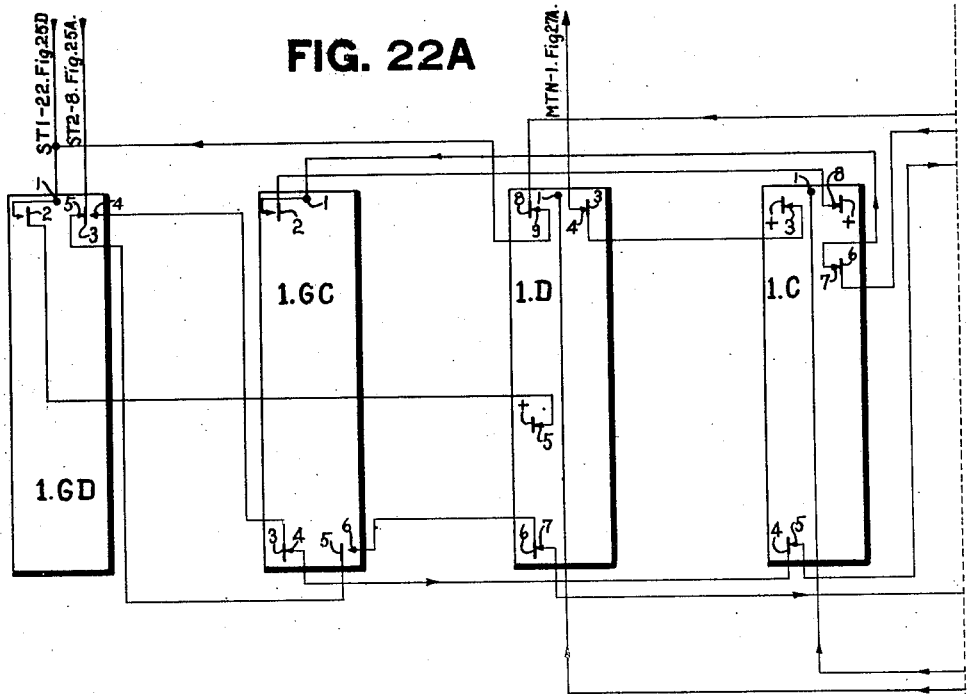
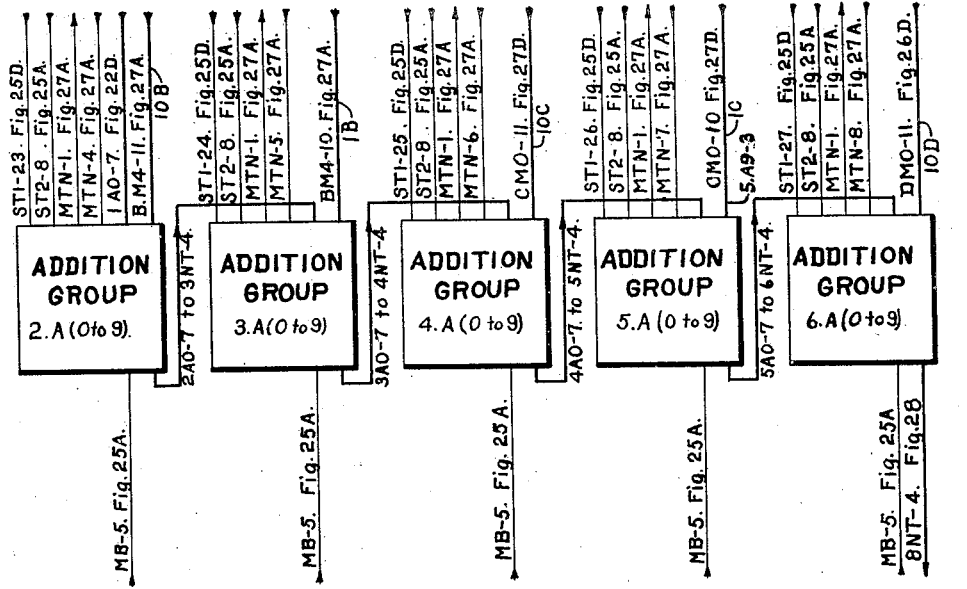
William H. Robertson
and Eric R. Coe
Inventors
By *Karl Benst*
Their Attorney

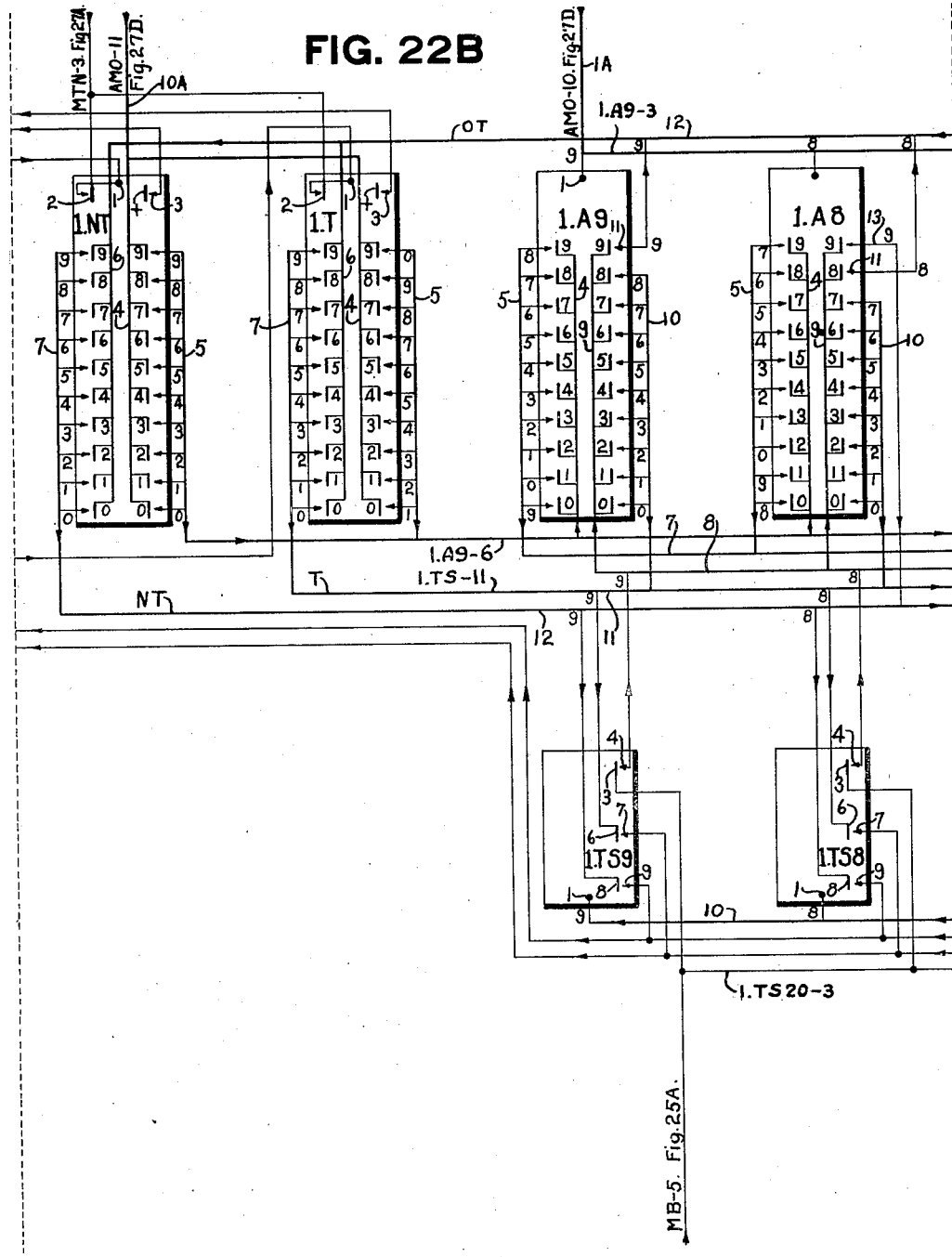

Oct. 26, 1943.  W. H. ROBERTSON ET AL  2,332,755
ACCOUNTING MACHINE
Filed April 27, 1940   34 Sheets-Sheet 15

William H. Robertson
and Eric R. Coe
Inventors

By Earl Benst
Their Attorney

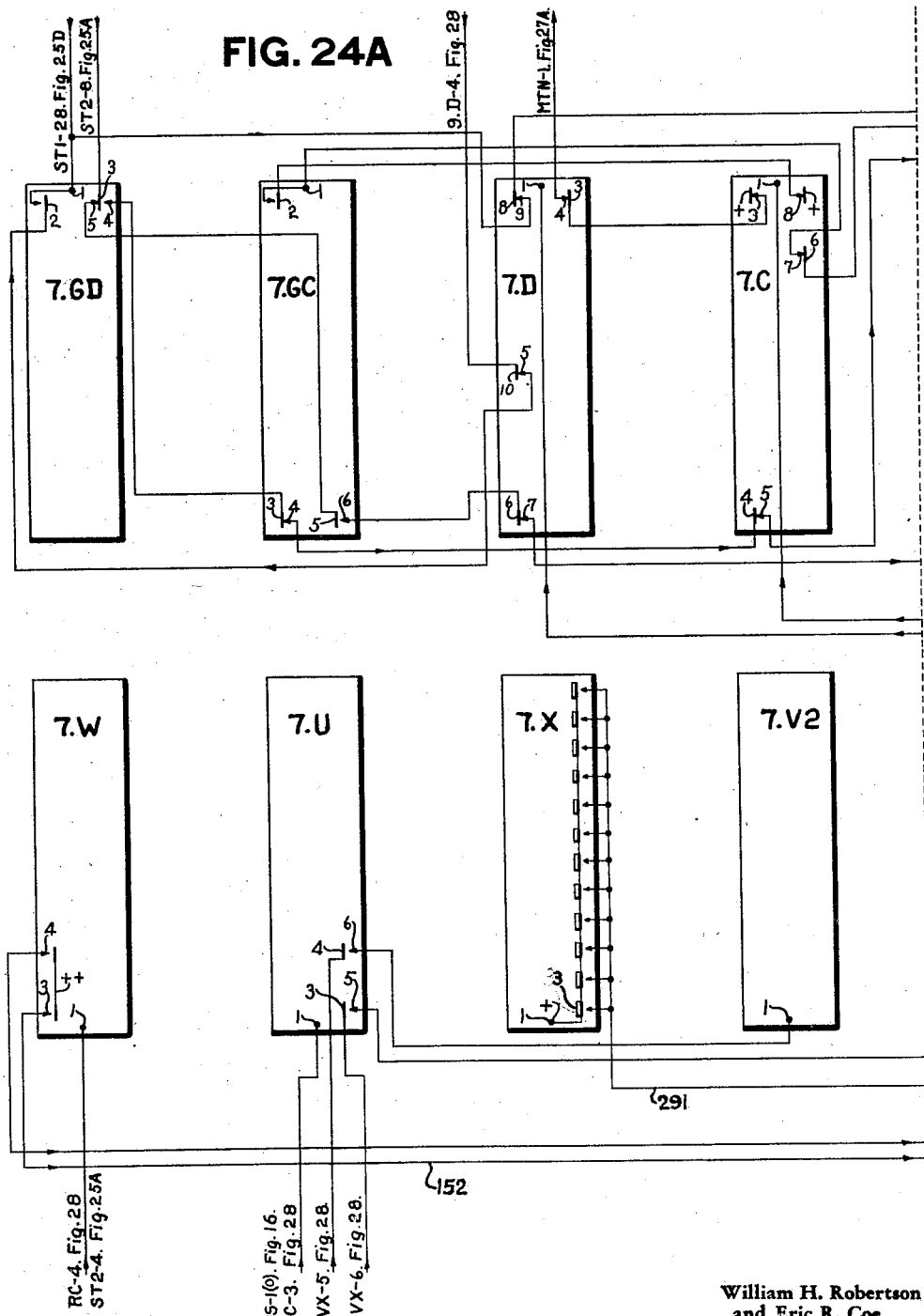

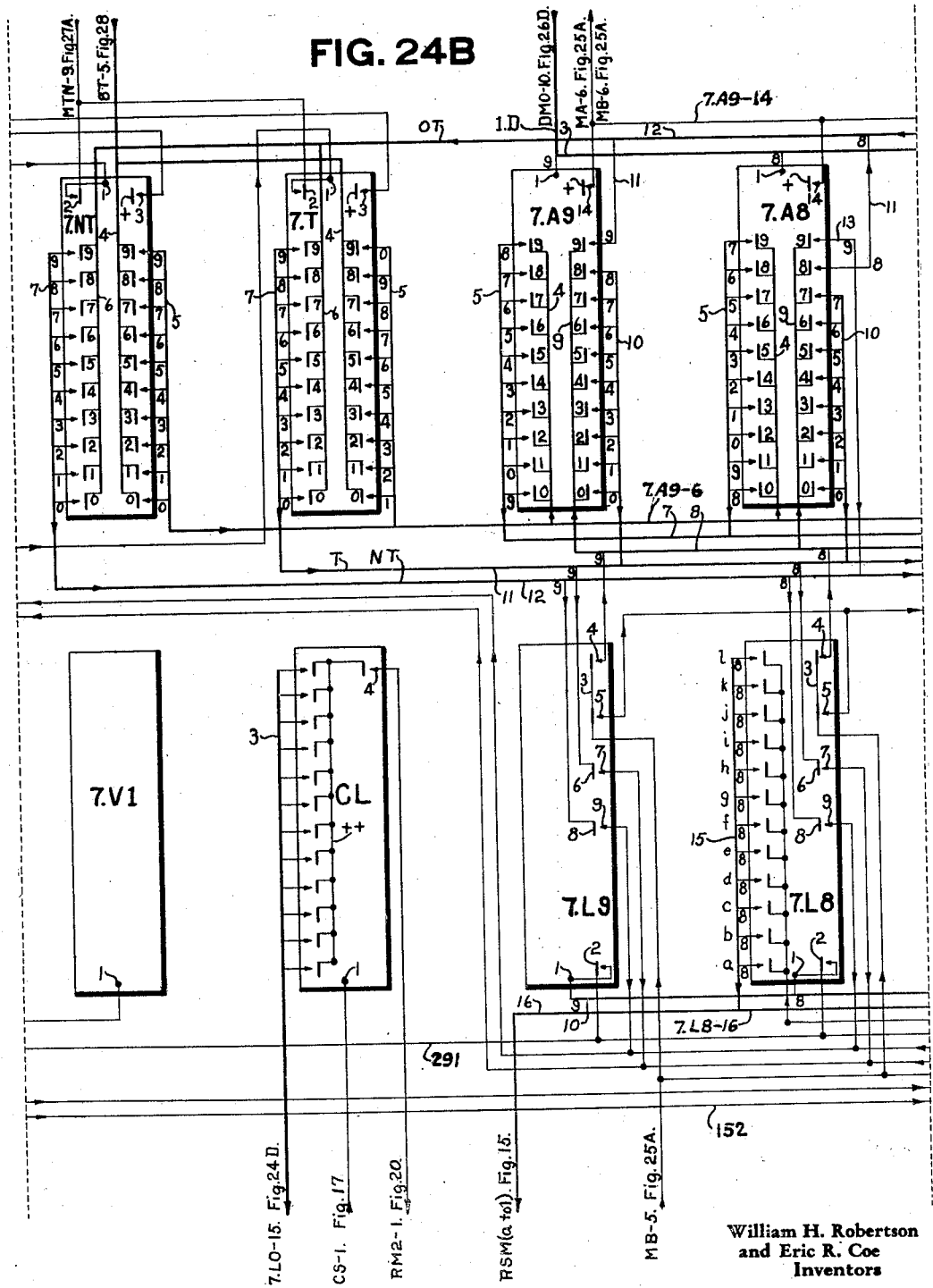

Oct. 26, 1943.   W. H. ROBERTSON ET AL   2,332,755
ACCOUNTING MACHINE
Filed April 27, 1940        34 Sheets-Sheet 19

William H. Robertson
and Eric R. Coe
Inventors

By Karl Benst
Their Attorney

Oct. 26, 1943.  W. H. ROBERTSON ET AL  2,332,755
ACCOUNTING MACHINE
Filed April 27, 1940   34 Sheets-Sheet 20

William H. Robertson
and Eric R. Coe
Inventors

By *Earl Beust*

Their Attorney

Oct. 26, 1943.  W. H. ROBERTSON ET AL  2,332,755
ACCOUNTING MACHINE
Filed April 27, 1940   34 Sheets-Sheet 21
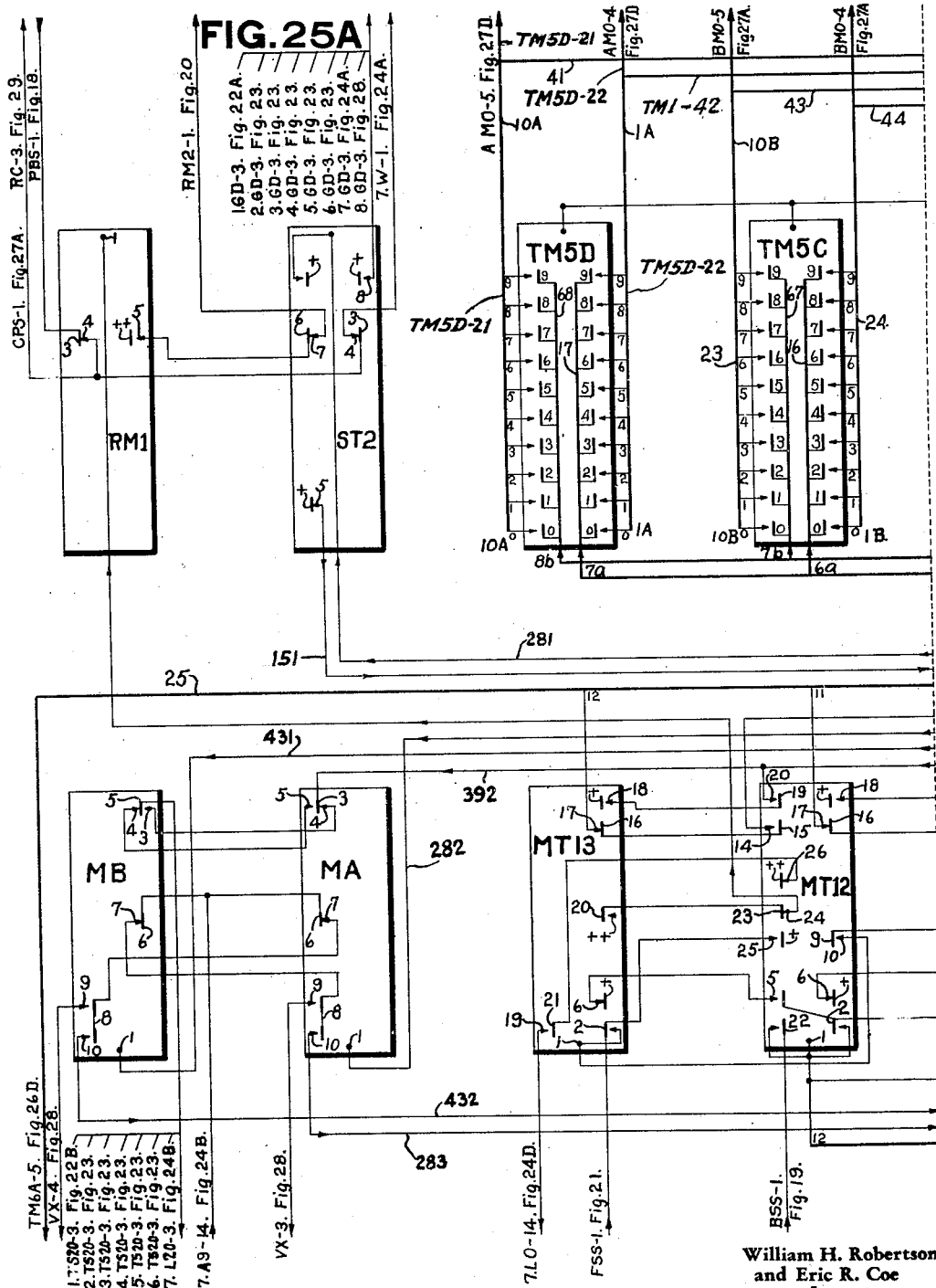
William H. Robertson
and Eric R. Coe
Inventors
By Earl Beust
Their Attorney

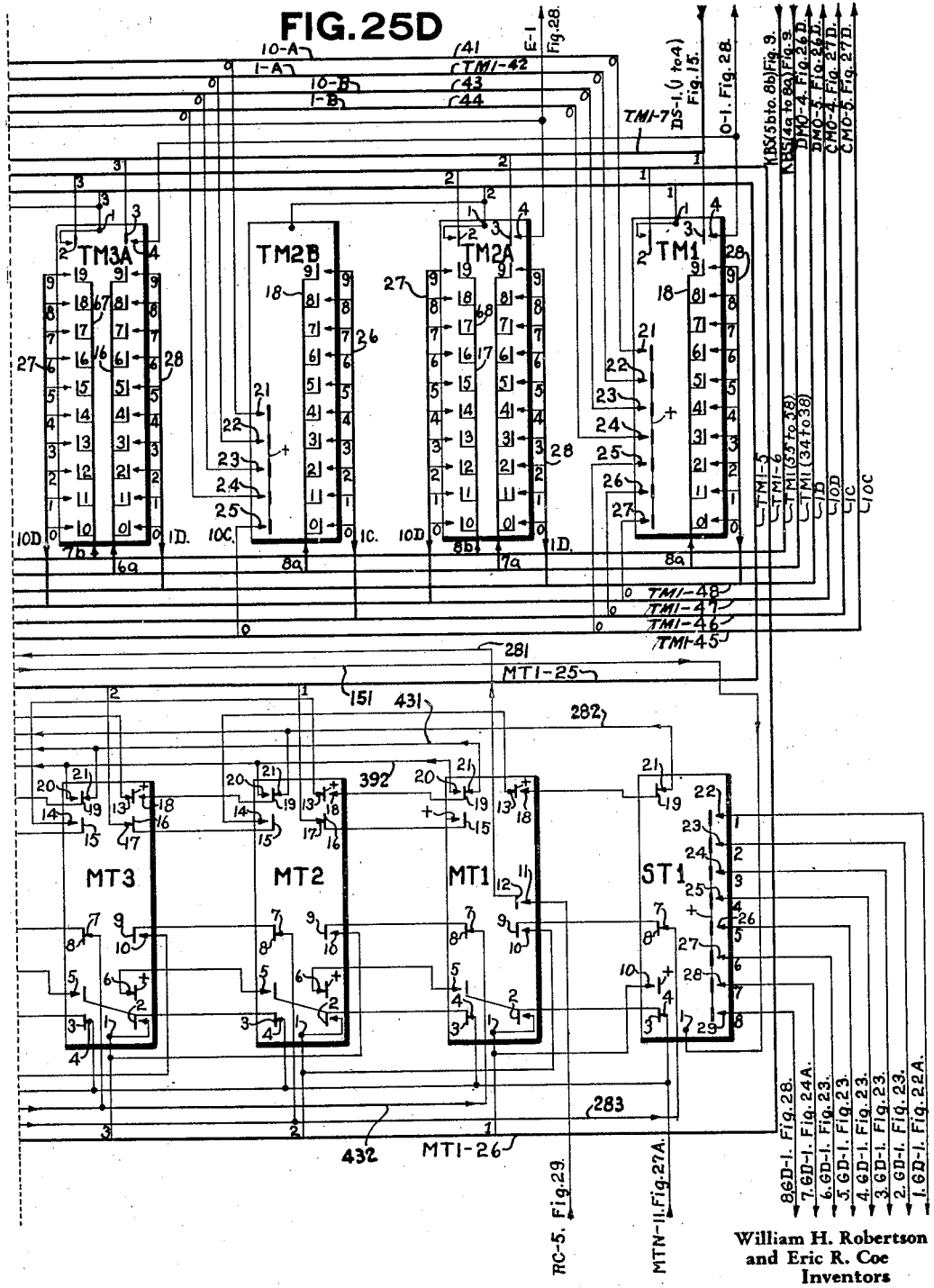

Oct. 26, 1943.  W. H. ROBERTSON ET AL  2,332,755
ACCOUNTING MACHINE
Filed April 27, 1940  34 Sheets-Sheet 25

William H. Robertson
and Eric R. Coe
Inventors

By Carl Benst
Their Attorney

Oct. 26, 1943.   W. H. ROBERTSON ET AL   2,332,755
ACCOUNTING·MACHINE
Filed April 27, 1940   34 Sheets-Sheet 27

William H. Robertson
and Eric R. Coe
Inventors

By *Pearl Beust*

Their Attorney

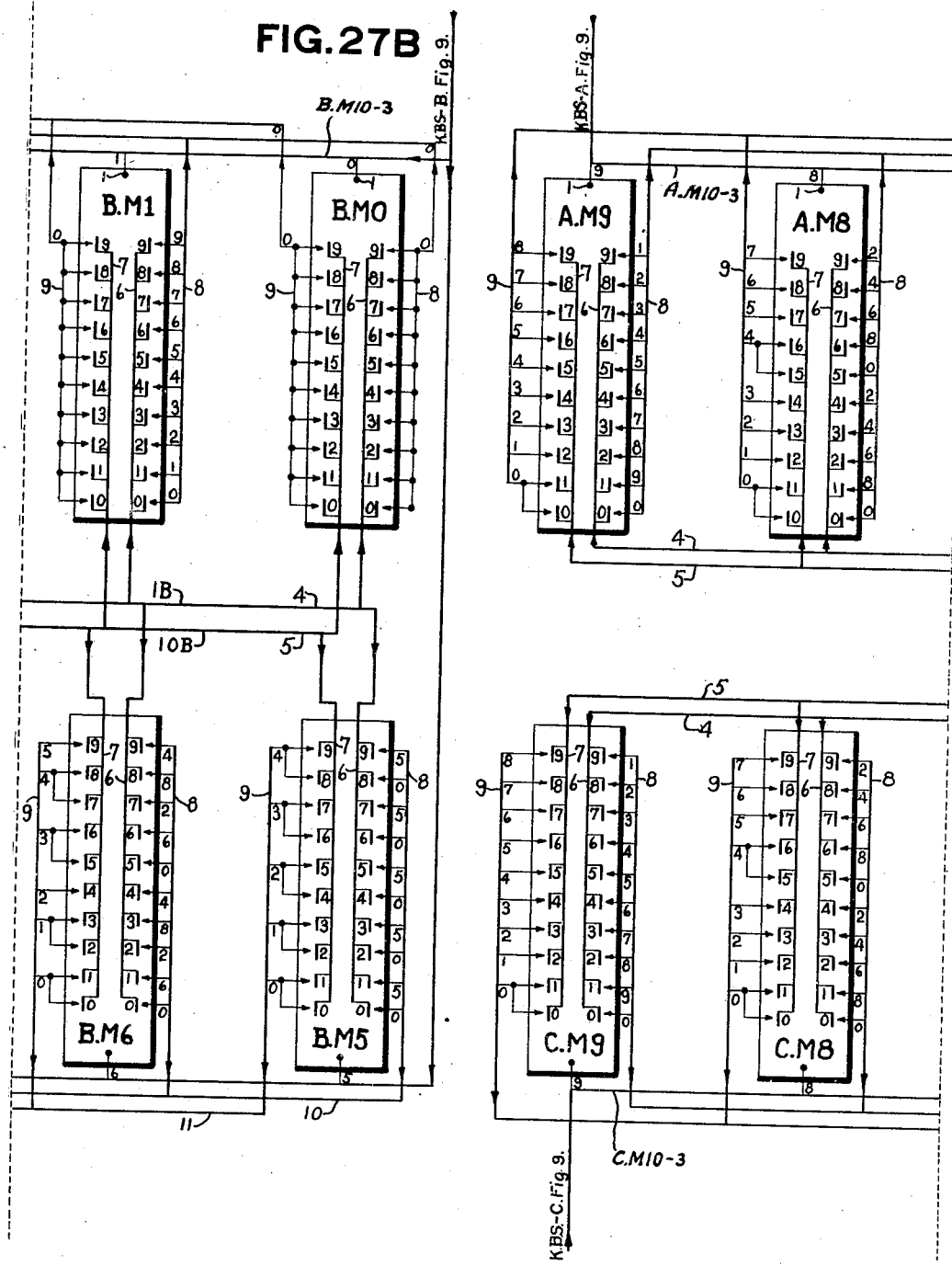

Oct. 26, 1943.   W. H. ROBERTSON ET AL   2,332,755
ACCOUNTING MACHINE
Filed April 27, 1940   34 Sheets-Sheet 31

William H. Robertson
and Eric R. Coe
Inventors

By Earl Beust
Their Attorney

William H. Robertson
and Eric R. Coe
Inventors

By *Earl Brust*
Their Attorney

Oct. 26, 1943.   W. H. ROBERTSON ET AL   2,332,755
ACCOUNTING MACHINE
Filed April 27, 1940   34 Sheets-Sheet 34

FIG. 33

John Doe – Distributors.
4 JOHN ST., ANYWHERE.

SOLD TO
RICHARD ROE
6 JONES ST.
ANYWHERE.

Invoice No. 1012.

| Description. | Unit Designation. | Unit Quantity. | Unit Price. | Quantity Price. | Balance. |
|---|---|---|---|---|---|
| TIES | EA. | 100. | 1.50 | 150.00 | |
| HANDKERCHIEFS. | DOZ. | 12 | 2.50 | 30.00 | |
| | | | | 180.00 | |
| DISCOUNT 40. PC. | | | | 72.00 | |
| | | | | | 108.00 |

— Printed in Red.

FIG. 34

John Doe – Distributors

SOLD TO
RICHARD ROE.
6 JONES ST.
ANYWHERE.

| Description. | Unit Designation. | Unit Quantity. | Unit Price. | Quantity Price | Balance. |
|---|---|---|---|---|---|
| TIES | EA. | 100 | 1.50 | 150.00 | |
| HANDKERCHIEFS. | DOZ. | 12 | 2.50 | 30.00 | |
| | | | | 180.00 | |
| DISCOUNTS. 75,50,20.PC. | | | | | 18.00 |

FIG. 35

John Doe – Distributors

SOLD TO
RICHARD ROE.
6 JONES ST.
ANYWHERE.

| Description | Unit Designation | Unit Quantity. | Unit Price. | Quantity Price | Balance |
|---|---|---|---|---|---|
| TIES | EA. | 100 | 1.50 | 150.00 | |
| HANDKERCHIEFS. | DOZ. | 12 | 2.50 | 30.00 | |
| | | | | 180.00 | |
| Discount 40.PC. | | | | 36.00 | 108.00 |
| WOOL SOCKS | PR. | 144 | .25 | | |
| EXPRESS | | | | 5.50 | |
| | | | | | 149.50 |
| BY CHECK. | | | | 100.00 | |
| | | | | | 49.50 |

— Printed in Red.

William H. Robertson
and Eric R. Coe
Inventors

By Pearl Beust
Their Attorney

Patented Oct. 26, 1943

2,332,755

UNITED STATES PATENT OFFICE 2,332,755

ACCOUNTING MACHINE

William H. Robertson and Eric R. Coe, Dayton, Ohio, assignors to The National Cash Register Company, Dayton, Ohio, a corporation of Maryland Application April 27, 1940, Serial No. 332,010

16 Claims. (Cl. 235—60)

The subject of this invention is a multiplying machine, which is a combination of a standard type of mechanical accounting machine and an electrical multiplying attachment, of a type similar to that disclosed in Letters Patent of the United States Nos. 1,876,293 to 1,876,296 inclusive, issued September 6, 1932, to Rolf Hofgaard, and the co-pending United States application, Serial Number 220,495, which was filed July 21, 1938, by Hofgaard and became Patent No. 2,262,253 on November 11, 1941, to which patents reference may be had for all the details of construction and operation which it is believed unnecessary to cover minutely in the following specification.

Broadly, it is an object of the present invention to provide means whereby a mechanical accounting machine may be combined with an electrical multiplying device.

Another object is to combine a mechanical accounting or calculating machine with an electrical multiplying device in such a manner that the mechanical calculating machine controls the entering of the multiplication factors in the electrical multiplying device and the electrical multiplying device controls the printing of the product by the mechanical calculating machine.

Another object is the provision of means for combining a mechanical calculating and printing machine and an electrical multiplying device in such a manner that the mechanical calculating machine controls the entering of the multiplication factors in the electrical multiplying device and the latter controls the transfer of the product to the mechanical calculating machine and the printing of said product by said mechanical calculating machine.

Another object is to supply a novel arrangement of switches and controlling and operating means therefor for transmitting multiplication factors from a mechanical accounting machine to an electrical multiplying device.

Still another object is to provide a multiplying machine, comprising interconnected mechanical and electrical units, with means for controlling the transferring of amounts from one unit to the other and vice versa.

A further object is the provision of means to automatically depress the Non-Add key at the beginning of multiplying operations.

Another object is to provide a multiplying machine, comprising a mechanical factor-entering and product printing device and an electrical multiplying device connected thereto for the solution of multiplication problems.

Still another object is to provide means for combining a mechanical factor-entering and product printing device with an electrical multiplying device, in such a manner that factors set up on the former will be transferred to the latter for multiplication, and the product formed in the electrical multiplying device will be transferred to the mechanical factor-entering and product-printing device for printing and further computation thereby.

A further object is the provision of means to synchronize and control the operation of a combined mechanical factor-entering and product printing device, and an electrical multiplying device, so that factors entered in the electrical multiplying device by the mechanical factor-entering and product printing device will be multiplied thereby, and the product thus obtained will be returned to the mechanical factor-entering and product printing device for printing and further computation thereby.

A still further object is to provide a multiplying machine with means to effect an automatic printing cycle, after multiplication is completed, to cause the product to be printed.

Another object of the present invention is to provide non-transfer relays, in the addition groups of an electrical multiplying device, and controlling relays therefor, to insure that failure of a transfer impulse cannot be incorrectly completed as a non-transfer.

With these and incidental objects in view, the invention includes certain novel features of construction and combinations of parts, the essential elements of which are set forth in appended claims, and a preferred form or embodiment of which is hereinafter described with reference to the drawings which accompany and form a part of this specification.

In the drawings:

Fig. 3 is a sectional view of the mechanical portion of the machine, taken just to the right of one of the amount banks.

Figure 4A:
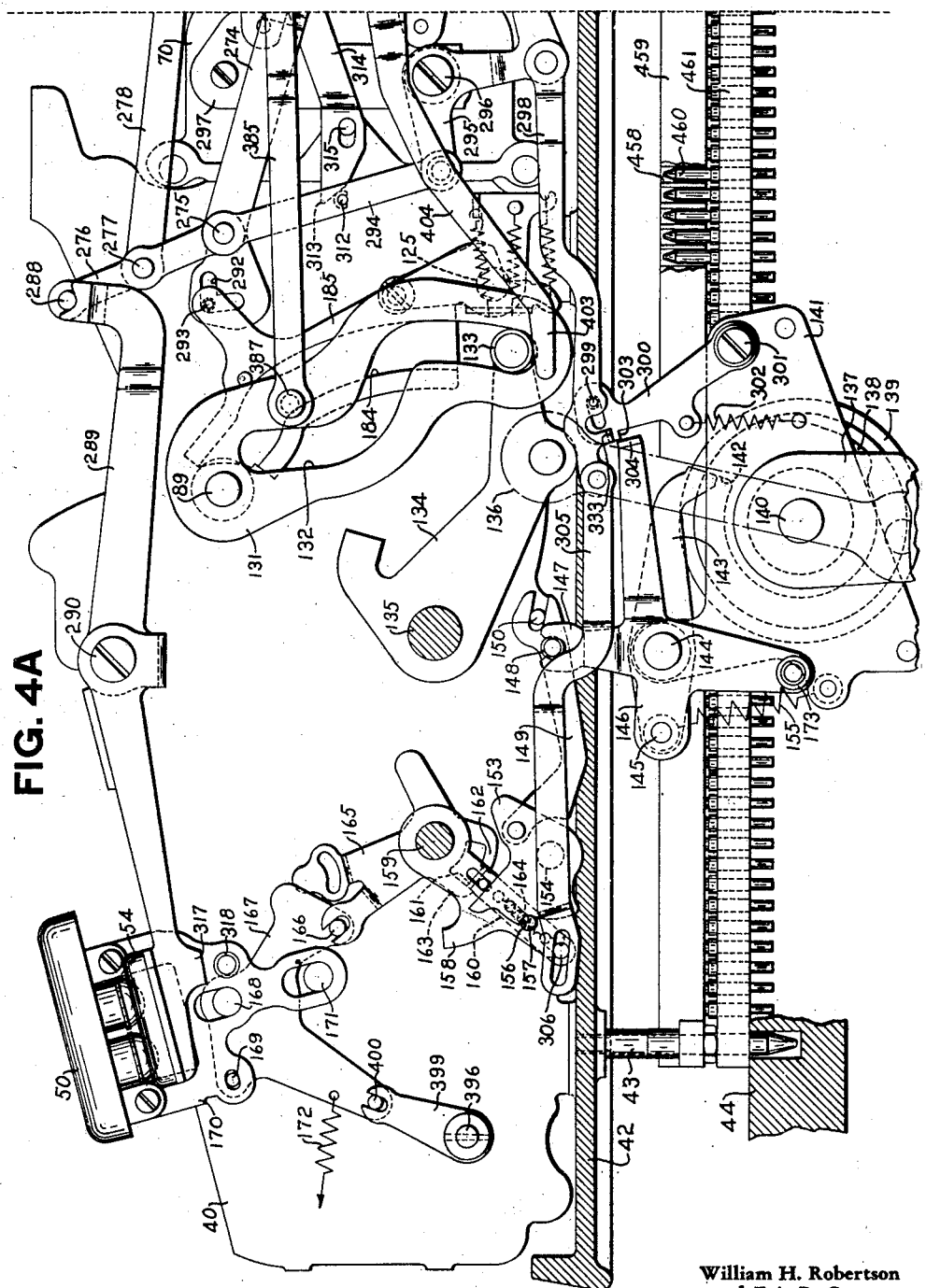

Figs. 4A and 4B together constitute a right side elevation of the machine, with the framework removed, showing in particular the machine starting mechanism and one denominational order of the control switches for entering the multiplication factors in the electrical multiplying attachment and the rack stop magnets for controlling printing of the product.

Figs. 5A and 5B together constitute a left side elevation of the mechanical portion of the machine, with the framework removed, showing in particular the totalizer engaging mechanism, the decimal slide for the discarding of surplus digits in the product, and the solenoid for initiating the product printing cycle of the machine.

Figs. 6A and 6B together form a plan view of parts of the mechanical portion of the machine.

Fig. 7 is a fragmentary end view, as observed from the back of the machine, showing in particular the factor entering switches and the rack stop magnets.

Fig. 8 is a detail view of the starting switch PBS, for the multiplying attachment.

Fig. 9 is a diagram of the connections of the keyboard switches KBS, for entering the multiplier and multiplicand in the electrical multiplying device.

Figs. 10, 11, 12, 13 and 14 illustrate the conventional representation of wires, cables and relays used in the diagrams throughout the specification.

Fig. 10 shows one method of representing a cable or a bundle of wires.

Fig. 11 shows a relay with wires and cables leading therefrom.

Fig. 12 shows another method of representing a cable or bundle of wires.

Fig. 13 represents wires which cross, but which are not electrically connected.

Fig. 14 represents wires which are electrically connected.

Figs. 15 to 21 inclusive, together with Fig. 9, show the wiring of the electrical parts carried by the mechanical portion of the machine, as follows:

Fig. 15 shows the connections of the rack stop magnets RSM, for transferring the product to the mechanical portion of the machine, for printing and other operations.

Fig. 16 shows the connections of the decimal discarding switch DS.

Fig. 17 shows the connections of the product register clearing switch CS.

Fig. 18 shows the connections of the starting switch PBS.

Fig. 19 shows the connections of the control switch BSS, for the printing cycle solenoid.

Fig. 20 shows the connections of the solenoid RM2, for initiating the product printing cycle.

Fig. 21 shows the connections of the control switch, which prevents premature release of the rack stop magnets and the timing relays.

Figure 22C:
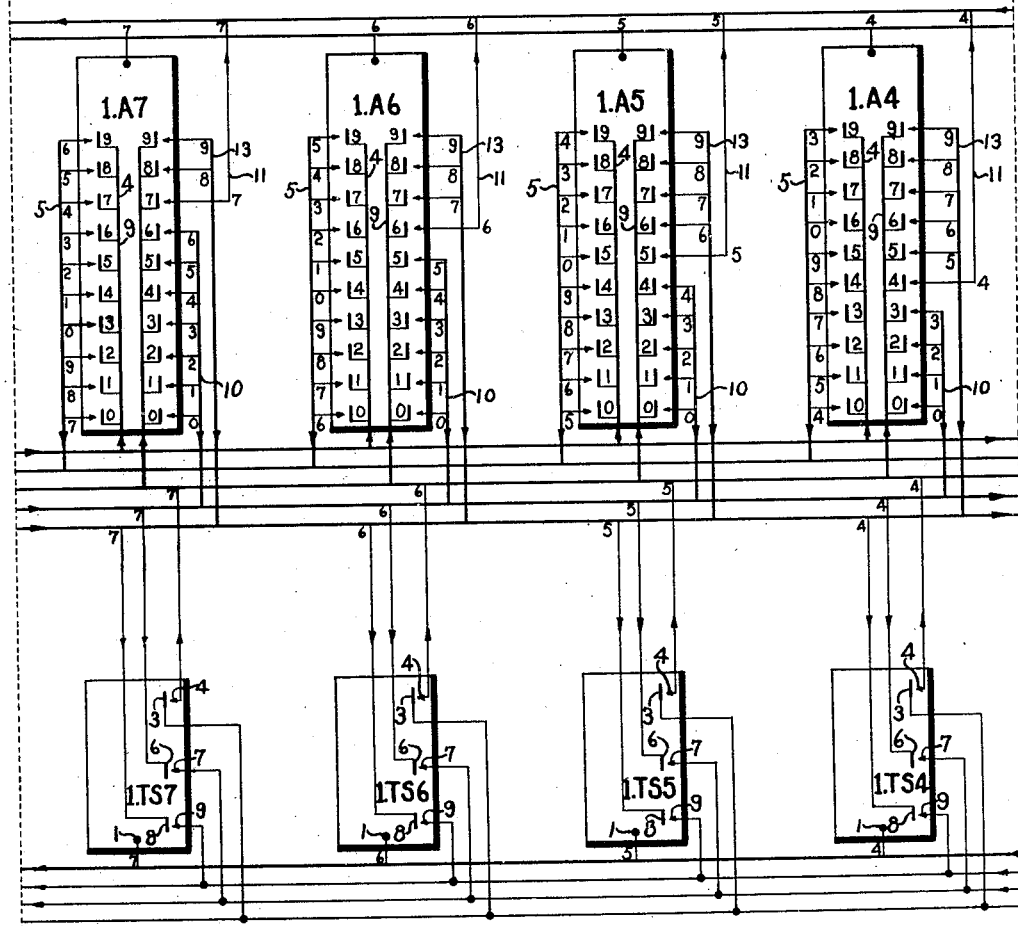
Figure 22D:
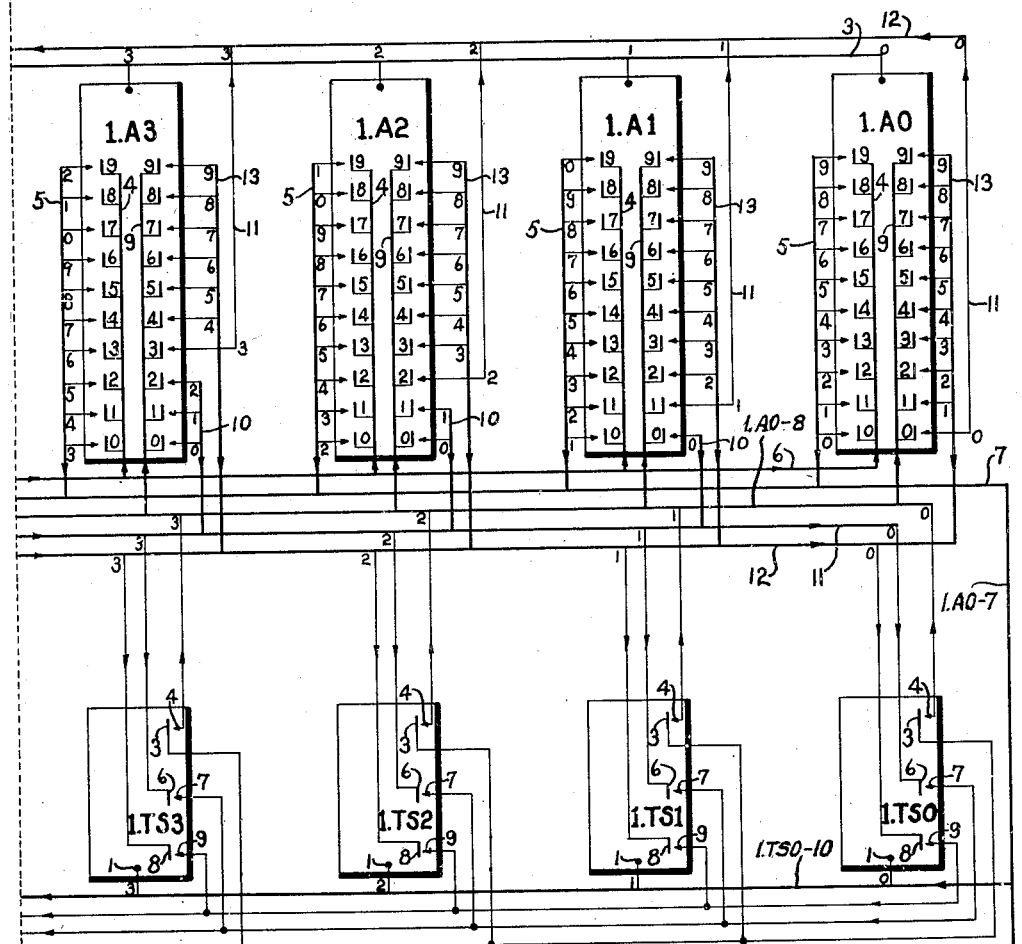
Figure 24C:
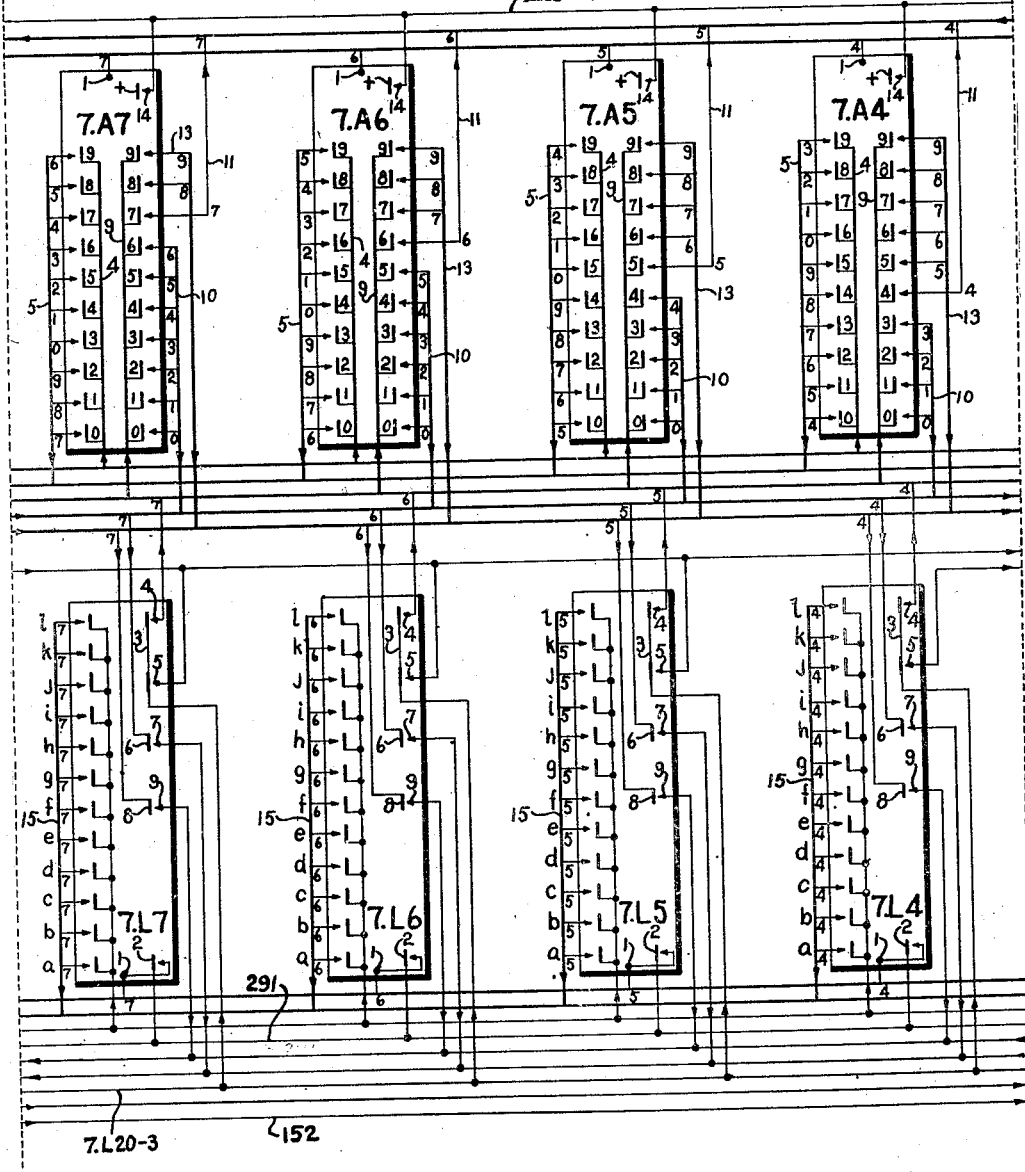
Figure 24D:
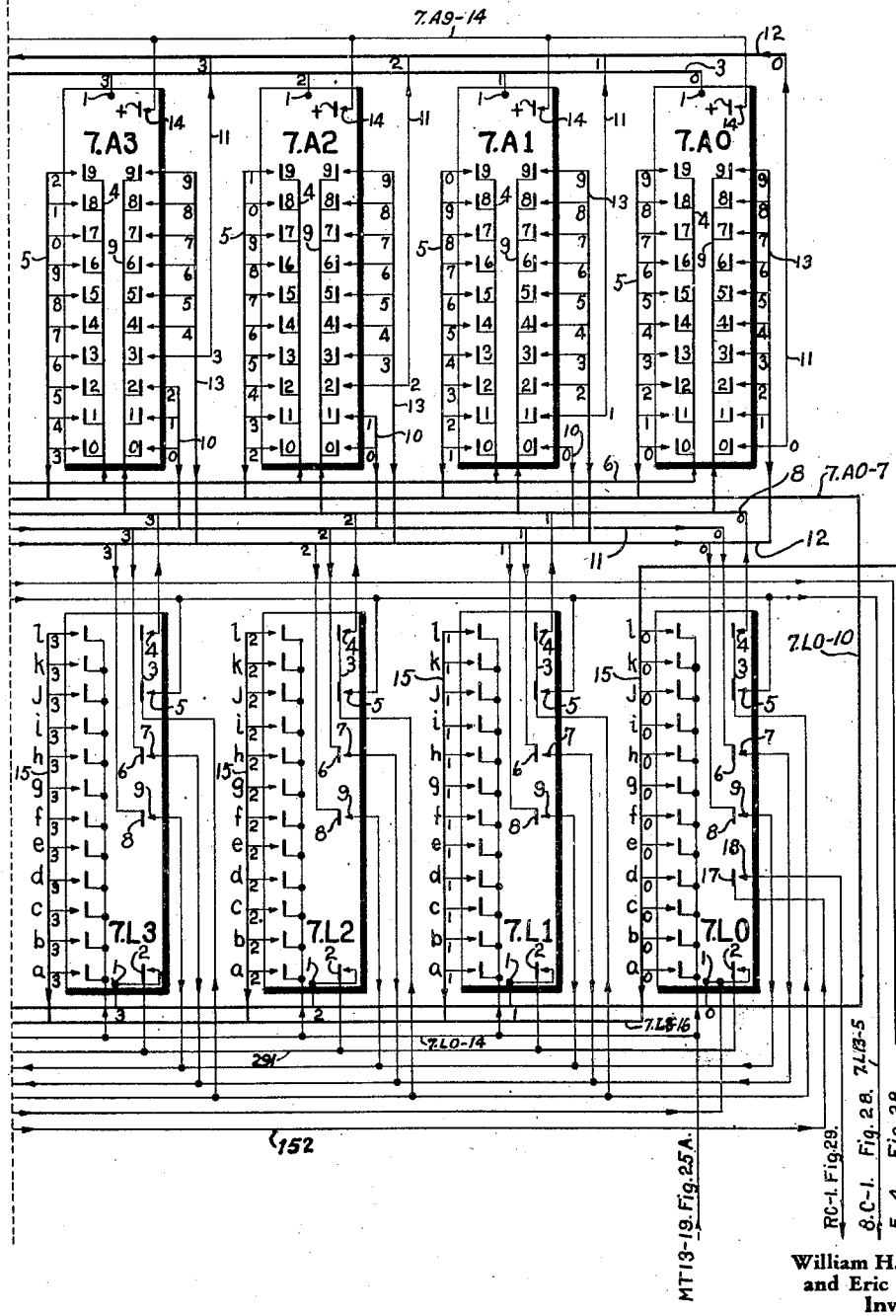

Fig. 22A is a diagram of the transfer and non-transfer controlling and indication relays, and together with Figs. 22B to 22D, constitutes a complete showing of the connections of all the relays of the #1 addition group.

Fig. 23 is a schematic showing of the external connections of the relays of the #2 to #6 addition groups, which are in every respect identical to the #1 addition group.

Figs. 24A to 24D inclusive show the connections of the #7 group of addition relays, and also show the connections of the relays of the product register.

Figs. 25A to 25D together show the wiring of some of the TM or pairing relays and also show the wiring of the MT or timing chain relays, and other controlling relays, for the pairing relays.

Figs. 26A to 26D together show the remainder of the pairing relays and also one group of the multiplication relays D.M.

Figs. 27A to 27D together show the three remaining groups of multiplication relays A.M., B.M. and C.M., the general holding relay MTN, and the plus control switch CPS.

Figure 28:
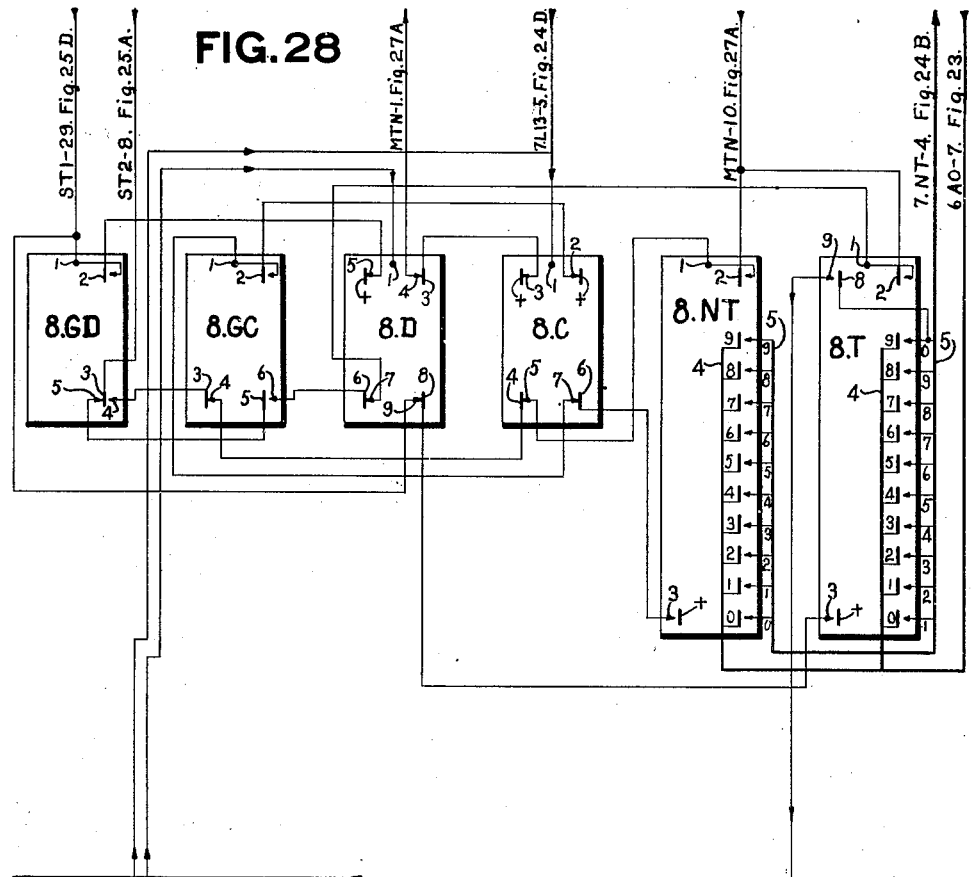

Fig. 28 shows the wiring of the transfer and non-transfer discarding relays and the indication and controlling relays associated therewith.

Figure 29:
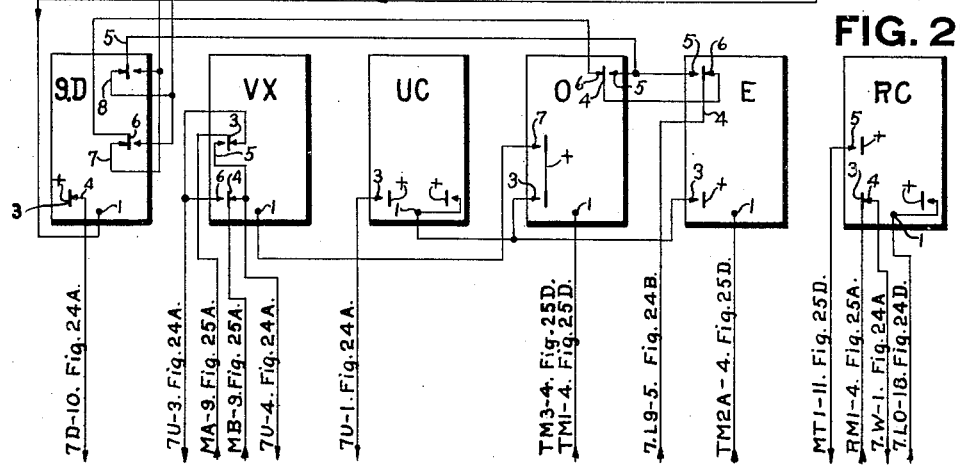

Fig. 29 shows the connections of the reset control relay RC.

Fig. 30 is a detail view of the multiplication key disabling mechanism.

Fig. 31 is a detail view of a part of the mechanism for controlling the non-add key.

Figs. 32, 33, 34 and 35 are fragmentary facsimiles of different types of statements or bills that may be prepared on the machine of this invention and illustrate some of the applications of said machine to various business problems.

GENERAL DESCRIPTION

The present invention relates to a combined electrical and mechanical calculating machine, in which the mechanical portion of the machine is used for all calculations with the exception of multiplication, which is carried on in the electrical portion of the machine, the mechanical portion of said machine being used for the entering of the multiplicand and multiplier in the electrical portion, and for the printing of the complete product, after multiplication is completed.

The mechanical portion of the machine is of a well known type and is fully disclosed in the following United States patents; Nos. 1,197,276 and 1,197,278, issued September 5, 1916, to Halcolm Ellis; No. 1,203,863 issued November 7, 1916, also to Ellis; No. 2,038,717, issued April 28, 1936, to R. A. Christian; No. 2,079,355, issued May 4, 1397, to Charles L. Lee; and No. 2,082,098, issued June 1, 1937, to R. A. Christian.

The electrical multiplying portion of the machine is an adaptation of a well known type the basic principles of which are fully set forth in the aforementioned United States patents, No. 1,876,294, No. 1,876,296, and No. 2,262,235, all of which were to Rolf Hofgaard.

Many of the conventions and details of construction which are fully disclosed in the above mentioned patents have been omitted in the present application, as reference may be had to these patents for a complete description thereof.

There are numerous ways in which a machine of the type disclosed in this invention may be used in the business world. A specific example is, any merchandising business in which quantity is multiplied by price, for example, any wholesale merchant or any brokerage firm. Likewise said machine may be profitably used by any large merchandising establishment in the taking of inventory.

In the present machine the product obtained for multiplication is usually stored in one or more of the totalizers of the mechanical portion of the machine, after which various types of transactions may be carried on in relation to said product, for example, debits, such as freight, unpaid balance, etc. may be added to said product; or credits, such as cash payments, returned goods, etc., may be subtracted from said product; or simple or chain discounts may be subtracted from the product and a balance arrived at. Several such examples of use are shown in Figs. 32 to 35 and will be explained later.

The mechanical portion of the machine of this invention is provided with a laterally shiftable traveling carriage for supporting and presenting record material to the printing means of said machine and said machine is likewise provided with a typewriter attachment for typing various data of a descriptive or other nature, on the record material.

After making sure the machine is clear and that the traveling carriage is in its extreme right-hand or starting position, the operator first types in a description of the goods in the first or Description column of the record material, after which the traveling carriage is moved to the proper columnar position. Next, upon the split keyboard of the mechanical unit, the operator sets up the quantity, or multiplier and the price or multiplicand, after which the decimal slide is positioned to point off the multiplier at the proper place, and a multiplying operation is initiated by depressing the multiplication key.

For the sake of clearness and simplicity it may be best to explain that the machine effects three cycles of movement during a multiplying operation, first, a mechanical or factor-entering cycle, second an electrical or multiplying cycle, and third, a final mechanical cycle, in which the complete product is entered in the mechanical unit and simultaneously printed upon the record material.

During the first cycle the quantity and price are printed in their respective columns of the record material and simultaneously transmitted to the electrical multiplying unit, after which the mechanical portion of the machine comes to rest. However, the electrical unit of the machine continues to function through the second cycle without interruption until a complete product is arrived at, after which said electrical unit causes the third or final cycle of the machine to be automatically initiated, in which the complete product is transferred to the mechanical portion of the machine to be printed thereby in the proper column of the record material, and to be entered in one or more, as desired, of the totalizers of said mechanical portion.

It is believed that the above simple explanation of multiplication will be sufficient for the present, as a more complete explanation will be given later herein in connection with a description of the mode of operation.

Each denominational row of multiplicand and multiplier keys has associated therewith a horizontally shiftable actuator rack. These denominational actuator racks are adapted to be positioned under control of any depressed keys, in their respective orders, to the values of said depressed keys. Positioning of the actuator racks causes one of several projections on an extension of each of them to be positioned in relation to a plurality of corresponding keyboard switch members mounted in a vertically shiftable framework located at the rearward part of the machine, said keyboard switch members corresponding in values to the various multiplicand and multiplier keys.

After the actuator racks have been positioned, in proportion to the depressed multiplicand and multiplier keys, the keyboard switch framework is shifted downwardly, causing one of the several projections on each of said actuator racks to be engaged by a downwardly extending portion of said key switch members corresponding to the depressed keys. This displaces the key switch members corresponding to the depressed keys, and they are latched in their displaced positions, whereupon return movement upwardly of the keyboard switch framework causes said switch members to be forced between the yieldable prongs of the associated switch elements to prepare circuits corresponding to each of the depressed multiplicand and multiplier keys.

Near the end of the first or factor-entering cycle of the machine the electrical multiplying unit is rendered operative and the keyboard switch members, corresponding to the depressed multiplicand and multiplier keys, remain latched in set positions during the entire multiplying cycle and are not released until the third or product printing cycle of the machine. However, the multiplicand and multiplier keys are released at the end of the first cycle.

The keyboard switch elements are connected to the electrical multiplying unit by means of a series of receptacles in the base of the machine, which engage corresponding plugs in a top plate of the cabinet containing the electrical multiplying unit, to make said mechanical unit and said multiplying unit readily separable from each other, if necessary.

In the present machine the keyboard has eight denominational rows of multiplicand keys and four denominational rows of multiplier keys. However, the number of rows of keys for the multiplicand and multiplier may be varied to meet the requirements of different business systems.

While the multiplying device has a capacity of eight digits in the multiplicand times four digits in the multiplier, it is believed that the operation of the device will be clear from the following problem, which is shown set up on the keyboard switches in Fig. 9:

```
    328 .55    multiplicand
     50 35     multiplier
    ───────
        25
       2 5
        40
       101 5
      1515
        24
      0600
      0900
        00
      0025
     0025
        40
        10
        15
       121 1    tens transfers
    ───────
    1654249 .25
```

There is a series of multiplication relays for each denominational order of the multiplier and each series consists of relays corresponding to the numerals 0 to 9 inclusive. Closing of the multiplier keyboard switches, as explained above, sets up a condition which later causes the relay in each denominational order of the multiplier, corresponding to the depressed multiplier key, to be energized and these relays remain energized during the remainder of the multiplying operation. Closing of the multiplicand keyboard switches sets up a condition which later causes the various digits of the multiplicand to be paired with the digits of the multiplier, through the energization of pairing relays corresponding to the various stages of the multiplication, and in this manner units and tens components of various partial products are formed. The units and tens components of the partial products thus formed, which have the same denominational significance in the final product, are accumulated column by column, beginning with the lowest order, and much in the same manner as one would add the components of the partial products by hand, and the right-hand component of this sum or the units digit obtained from this accumulation is stored in the corresponding relay of the product register, which, in the first pairing operation, will form the lowest order digit of the complete product. The addition of partial product components which have the same denominational significance in the final product is carried out by means of groups of addition relays. In the multiplying device having the capacity and operating in the manner explained above, the maximum number of partial product components which must be added in any stage of the multiplication is eight, so seven sets of addition relays must be provided, which, together with the input lines to the first set, can cause the simultaneous addition of eight components. Whenever, in any stage of the multiplication, there are less than eight components to be added, the pairing relays set up a zero control in the input lines to the first set and in any of the addition groups which are not controlled by a component value. Each addition group is provided with means to effect a tens carry, so that one or more tens carries may be included in the summation of partial product components of like denominational significance. This method of accumulating components of partial products is the same as that used in the above-mentioned Hofgaard Patent No. 2,262,235.

Each of the amount actuator racks, of the mechanical portion of the machine, has a series of graduated projections at the rearwardly disposed end thereof, which cooperate with corresponding rack stop bars, which are in turn actuated by rack stop magnets, of which there are nine for each denominational order, corresponding to the numerals 0 to 8 inclusive. As the actuator racks are permitted to travel their full distances rearwardly to the ninth position, it is unnecessary to provide rack stop magnets for this position.

After the complete product has been stored in the product register, a circuit is completed which causes the rack stop magnets corresponding to the denominational digits of said product to be energized to move the rack stops, controlled thereby, into the paths of the graduated projections on the actuator racks. After the rack stop bars have thus been positioned, the third cycle of operation is automatically initiated and during this cycle the actuators are positioned under control of the rack stop bars commensurate with the value of the digits of the product, after which the printing mechanism functions to print the complete product in the proper column of the record material supported by the platen of the traveling carriage. During the third or product printing cycle of the machine the product may be entered in one or more of the totalizers of the accounting machine, if desired.

In the present embodiment, the multiplicand keys are price keys, cents, dimes, dollars, etc., and as such have a fixed decimal place between the dimes and dollars, while the multiplier keys are intended primarily for use as quantity keys and as such have no fixed decimal place. However, the multiplier keys are provided with a decimal slide for locating the decimal point in its proper position in relation thereto. The decimal slide is in the form of a manually operable lever located just in front of the four rows of multiplier keys, where it is easily accessible to the operator.

In the present embodiment the product is generally in the nature of the price of a quantity of articles at so much each, so much per dozen, so much per gross, and so on. Therefore, it is unnecessary for said product to have over two decimal places, and as there are two fixed decimal places in the multiplicand, and as there may be four decimal places in the multiplier, the machine has been arranged to discard all decimals in the product except the units and tens of cents. The units of cents order has one added therein if the digit in the third decimal order is five or more, thus effecting what is termed "rounding off" the cents.

It is, therefore, readily understood, if there are two fixed decimal places in the multiplicand, that the position of the decimal slide will determine the number of digits to be discarded from the product. The method used in the present machine of discarding unwanted decimal digits involves rendering the product register inoperative until all unwanted digits are discarded. In other words, the product register does not begin to function for the storing of the product digits until all but the dimes and cents decimals have been discarded and the cents "rounded off" to the proper number.

In the following detailed description, the mechanism treated in a general way above, and which is pertinent to the present invention, will be fully described.

DETAILED DESCRIPTION

*Framework*

Figure 1:
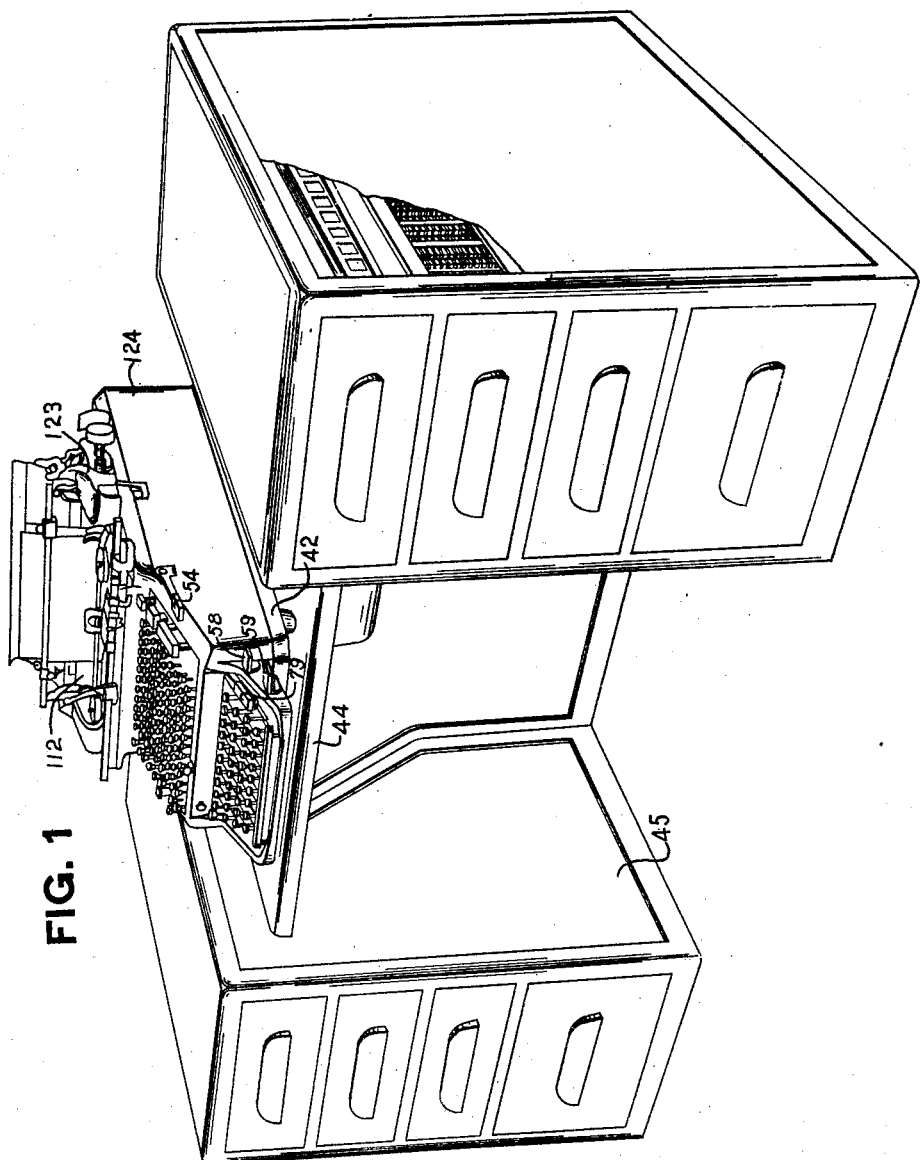
Fig. 1 is a perspective view of the complete machine, with a portion of one panel of the cabinet broken away to show a part of the relay mechanism of the electrical multiplying device.

Directing attention specifically to Figs. 1, 4A and B, 5A and B, and 6A and B, the mechanical portion of the machine embodying the instant invention is supported chiefly by main frames 40 and 41, which are rigidly supported on a base plate 42 and are maintained in fixed relationship to each other by various cross frames, bars and rods. Depending from the base 42 is a plurality of guide pins 43, adapted to engage corresponding holes in a top portion 44 of a desk-shaped cabinet 45 (Fig. 1) opposite ends of which form compartments for housing the electrical multiplying portion of the machine, to removably connect said mechanical and said electrical portions.

Other portions of the framework, for example, the framework which supports the keyboard switch mechanism, will be described later in conjunction with a description of that mechanism.

Figure 2:
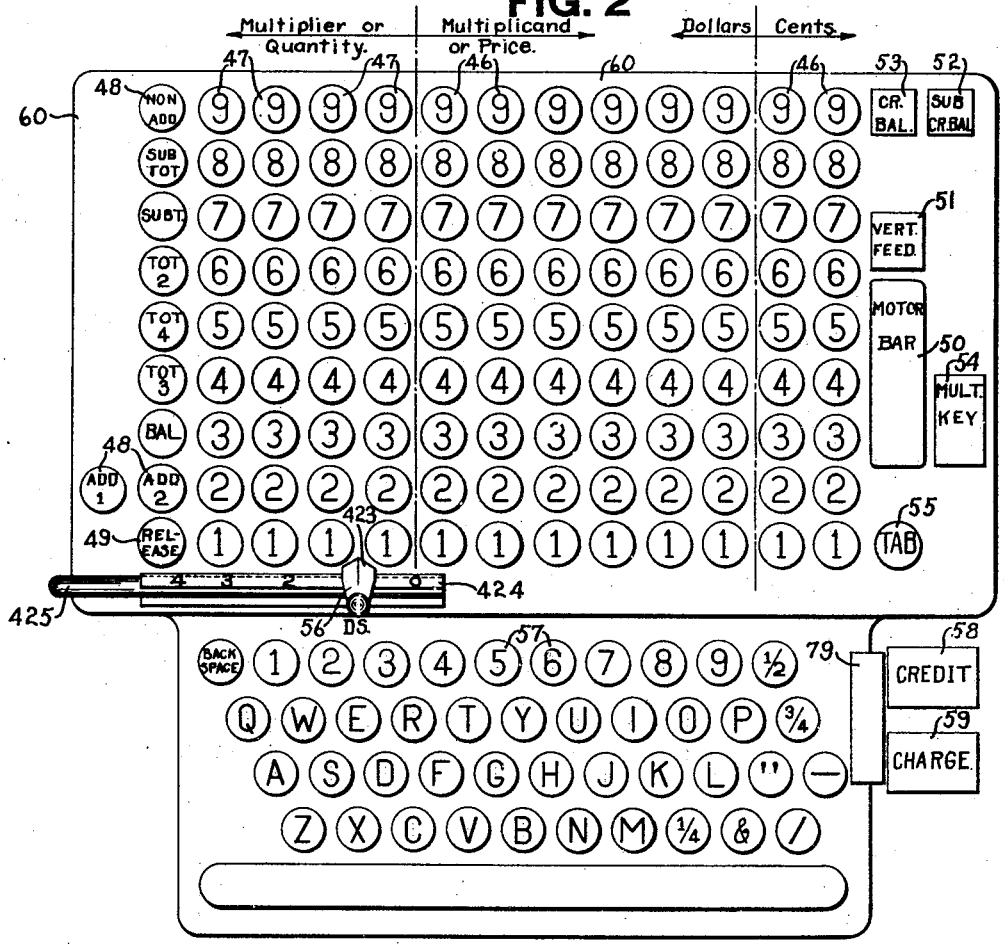
Fig. 2 is a plan view of the keyboard of the mechanical factor-entering portion of the machine.

By observing Fig. 2, which is a plan view of the keyboard of the machine chosen to illustrate this invention, it will be seen that there are eight rows of multiplicand keys 46 and four rows of multiplier keys 47, which are used for simultaneously setting up the multiplicand and the multiplier, which, in multiplying operations, are transmitted from said keyboard to the electrical multiplying unit for multiplication thereby.

With the exception of multiplying operations, all other types of operations are carried on in the mechanical portion of the machine, and in other than multiplying operations the keys 46 and 47 are used to set up amounts to be additively or subtractively entered in the totalizers of the mechanical portion of the machine.

Located at the left of the keyboard is a plurality of control keys 48 for controlling the selection and functions of the various totalizers of the machine. These keys include Non-Add, Sub-Total, Subtract, Total and Addition keys. In addition to the control keys 48, the functions of the various totalizers of the machine may be controlled by the traveling carriage, with which said machine is equipped, in tabulated positions thereof. A Release Key 49 is provided for releasing any of the keys 46, 47 or 48.

Situated at the right-hand side of the keyboard is a Motor Bar 50, for initiating operation of the machine. Located directly above the Motor Bar 50 is a Vertical Feed motor or starting bar 51 for initiating operation of the machine and for simultaneously causing the platen of the traveling carriage to be line-spaced. Located at the upper right-hand corner of the keyboard is a Sub-Credit Balance Key 52 and a Credit Balance Key 53. These keys are used respectively for initiating operations in which a sub-total or a total of the overdraft in the balance totalizer may be printed.

Located adjacent the Motor Bar 50 is a Multiplication Key 54, depression of which initiates a multiplying operation of three cycles, the first cycle of which is an operation of the mechanical portion of the machine, to transmit the multiplicand and multiplier from the keyboard to the electrical multiplying unit, and simultaneously record them on record material supported by the platen of the traveling carriage. The mechanical portion of the machine comes to rest after the first cycle is completed and remains idle during the second or multiplying cycle, which continues without interruption and in which the electrical multiplying unit multiplies the multiplicand by the multiplier to obtain a product, and in the third cycle the mechanical portion of the machine is automatically released for a second operation in which the product is transferred from the electrical multiplying unit to the printing means of the mechanical unit and printed thereby in the proper column of the record material. Situated in the lower right-hand corner of the accounting machine keyboard is a tabulating key 55, for manually tabulating the traveling carriage from one column to another.

Located beneath the four rows of multiplier keys 47 (Fig. 2) is a multiplier decimal slide 56 adapted to be moved in relation to said four rows of multiplier keys to point off the decimal places in the multiplier. The manner in which the decimal slide 56 controls the location of the decimal point and likewise controls the elimination or discarding of unwanted decimal digits will be explained later herein in connection with the electrical multiplying unit.

Located just in front of the accounting machine keyboard (Fig. 2) is a full complement of typewriter keys 57 for typing data of a descriptive nature upon the record material. To the right of the typewriter keyboard is a Credit return bar 58 and a Charge return bar 59 for returning the traveling carriage to positions where the Credit and Charge columns of the record material, respectively, will be in alinement with the printing mechanism.

Also to the right of the typewriter keyboard is a tabulating bar 79 for the traveling carriage which cooperates with a different set of stops from those with which the key 55 cooperates to provide a greater selection of tabulated positions of said traveling carriage.

*Keyboard mechanism*

Inasmuch as the different multiplicand and multiplier key banks and their associated mechanisms are similar in every respect, it is believed that description of one of such key banks, as shown in Fig. 3, will be sufficient for the purpose of this specification.

The keyboard framework (Figs. 2 and 3) comprises a top plate 60 and a partition plate 61 for each row of keys, said partition plates being held in proper relation to each other by slotted bars 62 and 63, which are in turn secured to the top plate 60 to form a unitary assembly of the parts of the keyboard framework. Downward extensions of the partition plates 61 have slots therein which engage their respective annular grooves in cross rods 64 and 65, supported by the frames 40 and 41, to locate the keyboard assembly in proper relation to the actuators of the accounting machine.

The upper ends of the keys 46 extend through openings in the plate 60 and are retained against lateral displacement by bent-over ears on the partition plate 61, as shown in Fig. 6A, and by studs 66 (Fig. 3) in the stems of each of the keys 46, in cooperation with vertical slots in the partition plate 61. A bar (not shown) traverses the lower ends of the stems of the keys 46 and is secured to the partition plate 61 to retain the studs 66 in their respective slots. The studs 66 in the keys 1 to 8, of the bank shown in Fig. 3, are adapted to cooperate with their respective graduated steps 67 on the top surface of an actuator rack 68, for this particular bank, mounted for horizonal sliding movement by a notched lower surface thereof in cooperation with a corresponding slot in the flat portion of the bar 64 and by a slot in the rearward end of said rack, in cooperation with a grooved bar 69 supported by the main frames 40 and 41 and a totalizer framework 70 secured to said main frames 40 and 41. The stud 66 of the "9" key 46 does not have a corresponding step 67 on the actuator 68, but depression of this key merely disengages the zero stop pawl from said actuator to permit said actuator to move the full distance rearwardly to its ninth position, which position is determined by a shoulder 71 on said actuator contacting the rod 64.

Each of the keys 46 has a pin 72, which extends through a vertical slot in the plate 61 and cooperates with the angular nose of a hook 73 formed in an opening in a detent 74. Each of the pins 72 is likewise adapted to cooperate with a corresponding angular camming surface 75 formed in an opening of a control plate 76, a portion of which is broken away to better show the detent 74. The detent 74, and the control plate 76 are mounted for horizontal shifting movement by means of two sets of rollers 80 on four pins 77 secured in the plate 61. The detent 74 and the control plate 76 are maintained in proper side-spaced relationship to each other and to the plate 61 by spacing washers carried by the studs 77 and interspersed between said plate 61 and said detent 74, and between said detent 74 and said control plate 76, said spacing washers and the rollers 80 being retained on their respective studs 77 by means of clips secured in annular grooves in the ends of said studs 77. A spring 78, tensioned between the detent 74 and the control plate 76, urges said detent and said plate forwardly and rearwardly, respectively, to normally maintain the camming surfaces thereof in contact with the pins 72.

The actuator 68 carries a zero stop block 81, which is normally engaged by the hook of a zero stop pawl 82 pivotally mounted on a shaft 83 supported in the keyboard framework. A bent-over ear 84 on the upper end of the zero stop pawl 82 is normally maintained in contact with the forward end of the control plate 76 by a spring 85, tensioned between said bent-over ear and said control plate.

The keys 46 are urged by springs (not shown) to undepressed positions as here shown, and depression of any one of said keys causes the pin 72 therein, in cooperation with the camming surface on the hook 73, to cam the detent 74 rearwardly against the action of the spring 78 until the hook 73 by-passes a flat surface on the top of said pin 72, whereupon the spring 78 returns the detent a slight distance forwardly to latch the key in depressed position. Simultaneously the pin 72, in cooperation with the camming surface 75 on the control plate 76, shifts said control plate forwardly, against the action of the spring 78, to rock the zero stop pawl 82, for this particular bank, counterclockwise out of engagement with the block 81 to free the actuator 68 for horizontal shifting movement. Likewise, depression of one of the keys 46 moves the stud 66 in the lower end thereof into the path of the corresponding step 67 on the actuator 68.

As previously explained, the stud 66 (Fig. 3) in the "9" key has no corresponding step 67 on the actuator 68. However, depressing the "9" key releases the zero stop pawl 82 in the manner explained above and permits the actuator 67, under influence of mechanism later to be described, to move full distance rearwardly until stopped in its ninth position by the shoulder 71 contacting the rod 64.

*Actuator and printing mechanism*

The actuator 68 (Fig. 3) has a vertical slot 86 through which extends a stud 87 fast in a printer control segment 88 free on a shaft 89 journaled in the frames 40 and 41. A spring 90, tensioned between the segment 88 and a leading frame bar 91, normally maintains a portion 92 of said segment 88 in yielding engagement with said leading frame bar 91. Opposite ends of the bar 91 are connected to similar arms 93, only one here shown, secured on the shaft 89.

Movement of the segment 88 is transmitted to a printing sector 96, for this particular denomination, by a link 95, which is pivotally connected between said sector 96 and an extending arm 94 of the segment 88. The sector 96 is fulcrumed on an operating arm 97 free on a shaft 98 journaled in the printer framework. Associated with the printer arm 97 is an antirebound and control plate 99 free on the shaft 98 and slotted to receive a stud 100 fast in said arm 97. A pawl 101, pivotally mounted on the arm 97, has a tooth which engages a corresponding tooth on the plate 99, and an extension which engages a hub portion of said plate. A spring 102, tensioned between said pawl and a spring bracket 103, urges said pawl clockwise to maintain a resilient connection between the plate 99 and the arm 97, and at the same time urges said arm and the printing sector 96 in a clockwise direction.

The leading frame, comprising the shaft 89, arms 93, and bar 91, (Fig. 3) is rocked first counterclockwise and then back to normal position a fixed degree of movement each machine operation, by mechanism presently to be described. The counterclockwise movement of said leading frame, by means of the spring 90, causes the segment 88 to move in unison therewith, carrying the actuator rack 68 rearwardly until one of the steps 67 thereon engages the stud 66 of the depressed key 46 to position said actuator 68 and the printing sector 96 in proportion to the depressed key 46. After the actuator 68 has thus been positioned, the leading frame 91 completes its counterclockwise movement, flexing the spring 90.

Initial movement counterclockwise of the segment 88 causes a stud 104 in an extending arm thereof, in cooperation with an arcuate surface on a zero printing control pawl 105, to rock said pawl counterclockwise to disengage a tooth on the upper end thereof from a corresponding tooth 106 on the plate 99 to free said plate and the arm 97 for printing movement. The zero printing control pawl 105, in the well known manner, disengages all lower order control pawls 105 from their corresponding plates 99 so that the zeros in the lower denominations will be printed. A rebound absorbing surface 107 on the plate 99 cooperates with a rod 108, supported between similar arms 109 secured on the printer shaft 98, which shaft is rocked first clockwise and back to normal position in the well known manner set out in the patents referred to hereinbefore.

When the shafts 89 and 98 (Fig. 3) reach the terminus of their initial movements counterclockwise and clockwise, respectively, a printer release trigger 110, pivoted in the printer framework, is rocked counterclockwise to disengage a bent-over retaining surface on the upper end thereof from a tooth 111 on the plate 99, to release said plate and the arm 97 to the action of the spring 102 to cause the printing sector 96 to force the inking ribbon and the record material into contact with a platen roll 112 to imprint the value of the depressed key 46 upon said record material. Just before the printing sector 96 comes in contact with the platen 112 the surface 107 on the plate 99 yieldingly engages the rod 108 to prevent the sector 96 from rebounding, after the impression has been made, and smudging or blurring said impression. After the segment 88 has been positioned, as explained above, an aliner 113 fast on a shaft 125, journaled in the frames 40 and 41, is rocked clockwise into engagement with one of a series of tooth spaces 114 to secure said segment and connected parts against displacement during the printing operation.

*Key locking and releasing mechanism*

At the beginning of a machine operation a bar 115 (Fig. 3) mounted in a slot in a shaft 116 journaled in the keyboard framework, is rocked counterclockwise into the path of a projection 117 of the detent 74 to obstruct rearward movement of said detent to lock the depressed key 46 against release and to lock the undepressed keys in this row against depression. After printing has been effected, the shaft 116 and the bar 115 are rocked clockwise to normal positions, as here shown, so that the depressed key 46 may be released.

After the bar 115 has been rocked to normal or ineffective position, a shaft 118, journaled in the keyboard framework, and a release arm 119, for this particular order, secured to said shaft, are rocked first counterclockwise and back to normal position in a manner to be described later. Initial movement counterclockwise of the arm 119 causes a stud 120 therein, in cooperation with camming surfaces on upwardly extending projections 121 and 122 on the detent 74 and control plate 76, respectively, to shift said detent and said control plate rearwardly and forwardly, respectively, against the tension of the spring 78. Rearward movement of the detent 74 disengages the hook 73 thereof from the pin 72 of the depressed key 46 to permit said key to be spring returned upwardly to normal position, as here shown.

As previously explained, depression of one of the keys 46 shifts the control plate 76 forwardly to disengage the zero stop pawl 82, and under this condition movement of the arm 119 has no effect upon said plate. However in total and sub-total operations, when no key 46 is depressed, the control plate is shifted, as explained above, to disengage the zero stop pawl 82 so that the actuator 68 is free to move rearwardly and be positioned under control of the corresponding wheel of the selected totalizer in the usual manner.

Return movement clockwise of the shaft 118, arm 119 and stud 120 permits the spring 78 to return the detent 74 and control plate 76 to normal positions, as here shown. After printing has been effected, return movement counterclockwise of the shaft 98 (Fig. 3) and the rod 108 causes said rod, in cooperation with the surface 107, to return the plate 99, arm 97 and printing sector 96 to normal positions, where the pawl 105 reengages the tooth 106 and the release trigger 110 reengages the tooth 111, as here shown.

The trigger 110 is released immediately after the leading frame 93 has completed its initial movement counterclockwise, and immediately after the printing stroke is finished the aliner 113 is rocked out of engagement with the segment 88 to permit the bar 91 to pick up said segment and return it and its associated actuator 68 forwardly to normal position where the block 81 is reengaged by the zero latch 82, as here shown.

The platen 112 (Figs. 1 and 3) is mounted in a framework 123 supported for lateral shifting movement upon a machine case 124, which encloses the mechanism of the machine. The platen 112 is of the throat-opening type and is adapted to be moved from printing position to front feeding position to facilitate the insertion and removal of record material at the front of said platen.

Totalizers

As presently constructed, the machine embodying this invention has four totalizer lines numbered 1 to 4, respectively, (Fig. 3) arranged in vertical pairs at the rear of the machine. The No. 1 and No. 2 totalizers are mounted in the totalizer framework 70 while the No. 3 and No. 4 totalizers are mounted in a framework 127 connected to the framework 70 by two side plates 128, only one here shown. The wheels of the No. 1 totalizer are adapted to be actuated by gear teeth on the upper edge of the actuator 68, while the wheels of the No. 2 totalizer are adapted to be actuated by teeth on the lower edge of said actuator. The wheels of the No. 3 and No. 4 totalizers are adapted to be actuated by teeth on the upper and lower surfaces, respectively, of an extension rack 129 secured to the rearward end of the actuator 68 and guided in its reciprocating movement by a slot therein in cooperation with matched grooves in the top and bottom surfaces of a bar 130 supported by the frame 127.

The No. 1 totalizer is an Add-Subtract or Balance totalizer, while the other totalizers are adding totalizers. The balance totalizer is provided with a dual transfer mechanism which is normally in adding position but, upon conditioning of the machine for subtract operation, is shifted to subtract position. The other totalizers, however, are provided with but a single transfer mechanism which functions in adding operations. The keys 46 and 47 (Figs. 2 and 3) in addition to being used for setting up the multiplicand and multiplier in multiplying operations, are also used for setting up amounts in adding and subtracting operations in which the electrical multiplying unit does not function, inasmuch as such operations are effected entirely by the mechanical portion of the machine. The manner in which the multiplicand and multiplier are transmitted to the electrical multiplying unit will be explained later herein.

As previously explained, the totalizers are selected for adding operation by means of selecting tappets located in columnar positions of the traveling carriage, and in addition the Nos. 1 and 2 totalizers may be selected for addition by using the Nos. 1 and 2 add keys 48 (Fig. 2). The totalizers are selected for other operations by using the other control keys 48. This is the usual procedure; however, tappets may be arranged on the traveling carriage to select any of the totalizers for any type of operation, if desired.

Adding operations

In adding operations the wheels of the selected totalizer or totalizers are engaged with the actuators 68 or the extensions 129, after said actuators and said extensions have completed their initial movement rearwardly and have been positioned under control of the depressed keys 46 and 47. Return movement forwardly of the actuators 68 and the extensions 129 rotate the selected totalizer wheels in proportion to the value of the depressed keys 46 and 47 to add in said wheels the amount set up on said keys. If, during this addition, any of the wheels of the selected totalizer pass through zero, the transfer mechanism causes one to be added in the next higher order wheel. After the actuators 68 complete their return movements forwardly the wheels of the selected totalizer are disengaged therefrom.

Subtract operations

In subtract operations the wheels of the #1 or Balance totalizer are engaged with the actuators 68 prior to their initial movement rearwardly and such movement of said actuators reversely rotates the wheels in proportion to the value of the depressed keys 46 and 47 to subtract therefrom the amount set up on said keys. Prior to return movement forwardly of the actuators 68 the wheels of the #1 totalizer are disengaged therefrom.

Sub-total and total-taking operations

In sub-total and total-taking or printing operations the wheels of the selected totalizer are engaged with the actuators 68 or the extensions 129, prior to initial movement thereof. Initial movement rearwardly of the actuators 68 reversely rotates the totalizer wheels to zero position, which position is determined by either of two diametrically opposed teeth on tripping cams integral with said wheels, coming in contact with their respective add transfer trip pawls. This positions the actuators 68 and the printing sectors 96 in proportion to the amount standing on the totalizer wheels, and operation of the printing mechanism causes this amount to be printed upon the record material.

In total printing operations the wheels of the selected totalizer are disengaged from the actuators 68 prior to their return movement forwardly, and consequently said wheels remain in a zeroized condition. In sub-total printing operations the selected totalizer wheels remain in engagement with the actuators 68 during their return movement forwardly and are consequently restored to their original positions.

In sub-total and total-printing operations the key release shaft 118 (Figs. 3 and 5A) and the rod 120 are actuated at the beginning of machine operation to release any inadvertently depressed keys 46 and 47 and to release all the zero stop pawls 82 so that the actuators 68 are free to be positioned under control of the wheels of the selected totalizer.

Depression of the Non-Add key 48 (Figs. 2 and 5A) renders mechanism effective which prevents any of the totalizers from being engaged with the actuators 68 in adding time. This is helpful when the keys 46 and 47 (Fig. 2) are used only as printing keys or when said keys are used for setting up a multiplicand and a multiplier, which are to be entered simultaneously in the multiplying unit. Therefore, in multiplying operations it is necessary to provide means for controlling the operation of the Non-Add key and such controlling mechanism will be described later herein in connection with the multiplying unit.

As previously explained, in the last cycle of a multiplying operation the complete product is transferred from the multiplying unit to the actuators 68 (Fig. 3) of the accounting machine, so that said product may be printed on record material supported by the platen roll, and, if desired, entered in one or more of the totalizers of the machine. This product printing cycle is effected automatically after the complete product has been formed in the multiplying unit, and at the beginning of said automatic cycle the key release shaft 118 (Figs. 3 and 5A) is operated to release any inadvertently depressed keys 46 or 47 and to release the zero stop pawls 82 so that the actuators 68 are free to be positioned in proportion to the product. In order to maintain continuity of the description, this mechanism will be described later in connection with the electrical multiplying unit.

*Operating mechanism*

It will be recalled that the leading frame shaft 89 (Figs. 3 and 4A) receives a complete excursion of movement each machine operation, the first movement being counterclockwise, and this excursion of said shaft is effected by mechanism shown in Fig. 4A and now to be described.

Secured on the right-hand end of the shaft 89 is a cam plate 131 having therein a cam slot 132 which coacts with a roller 133 on the right-hand end of a lever 134 secured on a main shaft 135 journaled in the frames 40 and 41. A link 136 operatively connects the lever 134 to a clutch cam 137 secured to a clutch driven member 138, which together with its associated clutch driving member 139 is pivotally mounted on a stud 140 fast in a plate 141 secured to the motor framework (not shown), which is in turn secured to the machine base 42. The clutch driving member 139 is connected to a conventional type of electric driving motor by means of teeth on the periphery of the driving member cooperating with a helical gear which is secured to the armature shaft of the motor. Further explanation of the operating motor is deemed unnecessary as this motor is well known in the art and is fully disclosed in prior patents.

The clutch driven member 138 has an abrupt surface or shoulder 142 thereon, which cooperates with the end of a clutch stop and release lever 143, free on a stud 144 in the plate 141. A stud 145 connects the lever 143 to a restoring lever 146, also free on the stud 144, and having an upward extension 147 which is bifurcated to embrace a stud 148 in a pitman 149. The right-hand end of the pitman 149 (Fig. 4A) is slotted to receive a stationary stud 150 in the frame 40, and the left-hand end of said pitman is pivoted to a clutch latch plate 153 free on a stud 154 in the frame 40. A spring 155, tensioned between the stud 145 and the plate 141, urges the levers 143 and 146 counterclockwise, which movement is transmitted by the pitman 149 to the latch plate 153. However, when the machine is at rest a shoulder 156 on the plate 153, in cooperation with a stud 157 in an arm 158 free on a stud 159 in the frame 40, prevents such movement of said parts and retains them in the positions here shown, where the lever 143 obstructs counterclockwise engaging movement of the clutch driven member 138.

Shiftably mounted on the arm 158 (Fig. 4A) is a slide 160 having a bent-over ear 161 which is normally held between fingers 162 and 163 of an arm 165 free on the stud 159, by a spring 164 tensioned between said slide 160 and a stud in the arm 158. The ear 161, in cooperation with the fingers 162 and 163 (Fig. 4A) normally maintains an operating connection between the arms 158 and 165. An extension of the arm 165 is bifurcated to embrace a stud 166 in a motor bar lever 167 free on a stud 168 in the frame 40. The lever 167 carries a stud 169 which engages a slot in a motor bar plate 170 having two upward extensions which protrude through openings in the keyboard plate 60 (Fig. 2) and which are secured to two downward extensions of the release or motor bar 50. The plate 170 is mounted for linear displacement by means of two alined slots therein, in cooperation with the stud 168 and a similar stud 171 in the frame 40. A spring 172 urges the plate 167 clockwise to normally maintain the motor bar 50 in undepressed position and the stud 157 in engagement with the shoulder 156, to retain the motor clutch disengaged.

Depressing the motor bar 50 rocks the plate 167 counterclockwise, against the action of the spring 172, and said plate in turn rocks the lever 165 clockwise, which, by means of the fingers 162 and 163, in cooperation with the ear 161, carries the arm 158 clockwise in unison therewith to disengage the stud 157 from the shoulder 156 to free the lever 153 and connected parts to the action of the spring 155, which immediately rocks the clutch release lever 143 out of engagement with the shoulder 142 on the clutch driven member. This causes the clutch driven member to be immediately connected to the clutch driving member and simultaneously switches on the electric current to the operating motor, whereupon said motor revolves the clutch driving member 139, the driven member 138 and the clutch cam 137 in a counter-clockwise direction.

After the clutch driven member 138 has completed one revolution, the cam 137 engages a roller 173 (Fig. 4A) mounted on a downward extension of the lever 146, and restores said lever, and the clutch release lever 143, clockwise into the path of the shoulder 142. This obstructs further movement of the clutch driven member 138 and disengages said member from the clutch driving member 139. During the counter-clockwise revolution of the clutch driven member 138 and the cam 137, the link 136 drives the operating lever 134 and the main shaft 135 first counter-clockwise and back to normal position as here shown, to effect one operation of the machine.

Upon the oscillation of the lever 134, the roller 133, in cooperation with the cam slot 132, rocks the arm 131, shaft 89 and the leading frame 91 (Figs. 3 and 4A) first counter-clockwise and back to normal position, in the manner explained earlier herein, to control the movements of the actuators 68 during the different types of machine operations.

The aliner shaft 125 (Fig. 3) and the aliner 113 are driven by a roller mounted on the same stud as the roller 133 (Fig. 4A) but on the opposite side of the lever 134, in cooperation with a cam groove 184 in an arm 185 flexibly connected to said shaft 125 to prevent injury to the mechanism in case the aliner 113 stumbles on the teeth 114. Near the end of the counterclockwise movement of the lever 134, the roller on the lever 134, cooperating with the cam groove 184, rocks the arm 185, shaft 125, and aliner 113 clockwise, to engage said liner with the tooth spaces 114 of the segments 88, to secure the actuators 68 and the printing sectors 96 in set positions, while printing is being effected. After printing has been completed, return movement clockwise of the lever 134 disengages the aliner 113 from the tooth spaces 114 of the segments 88 and returns said aliner to the position shown in Fig. 3.

Connections between the lever 134 (Figs. 3 and 4A) and the printer shaft 98, not here shown but fully disclosed in the patents referred to hereinbefore, operate the printing mechanism in the manner explained above.

*Totalizer engaging mechanism*

As will be seen by observing Figs. 5A and 5B, the main shaft 135 also drives the totalizer engaging mechanism, in the manner now to be described.

Secured on the left-hand end of the shaft 135 are totalizer engaging plates 174 and 175 and said plate 174 has pivotally mounted thereon totalizer engaging levers 176 and 177 connected by links 178 and 179 to totalizer engaging arms 180 and 181, secured respectively, on totalizer engaging shafts 182 and 183, for the #3 and #4 totalizers, journaled in the frame 127.

The totalizer engaging plate 175, for the #1 and #2 totalizers, is identical in outline with the plate 174 and is located in horizontal alinement therewith. The totalizer engaging plate 175 pivotally supports totalizer engaging levers 187 and 188, identical in outline with their corresponding engaging levers 176 and 177, and located in horizontal alinement therewith. The levers 187 and 188 are connected by links 189 and 190 to totalizer engaging arms 191 and 192, secured respectively, on totalizer engaging shafts 193 and 194, for the #1 and #2 totalizer lines, journaled in the frame 70.

Inasmuch as the engaging mechanisms for all the totalizers function exactly alike, it is believed that an explanation of the engaging mechanism in connection with the #3 totalizer will be sufficient.

Each of the totalizer lines is mounted in a rockable framework, as shown in connection with the #3 totalizer line (Fig. 3), comprising a series of arms 195, only one here shown, pivotally supported by a shaft 196 journaled in the framework 127. Rollers on opposite ends of the #3 totalizer shaft engage similar cam slots in two totalizer engaging cams 197 (only one shown) secured on the engaging shaft 182.

The engaging lever 176 (Figs. 5A and 5B), for the No. 3 totalizer, has pivotally mounted on the upper end thereof an add-engaging pawl 198 spring-urged counter-clockwise into engagement with a stop stud 199 in said lever 176. An upward extension of the pawl 198 cooperates with a stud 200 in a #3 totalizer non-add control lever 201 pivoted on a stud 202 carried by an auxiliary frame 203 secured by a plurality of studs 204 to the left frame 41. The stud 200 is embraced by the bifurcated upper end of a pitman 205, the lower end of which is pivoted on one arm of a lever 206 in turn fulcrumed on one of the studs 204. The other arm of the lever 206 has a bent-over portion 207 adapted to be engaged by a rounded nose 208 of the engaging plate 174, for the #3 and #4 totalizers, to restore the non-add lever 201 to home position and hold it in such position when the machine is at rest, in a manner and for a purpose presently to be described.

The extreme downward end of the non-add lever 201 forms a shoulder which cooperates with a rearwardly disposed end of an add control pawl 209 pivoted on a stud 210 in the auxiliary frame 203, and connected by a hanging bar 211 to a #3 hanging bar lever which is adapted to cooperate with corresponding camming lugs on control blocks located on the traveling carriage in relation to columnar positions thereof.

For a more complete description of the details of the totalizer engaging mechanism, reference may be had to the Lee Patent No. 2,079,355.

Initial movement clockwise of the engaging plate 174 (Fig. 5A) removes the nose 208 from the bent-over portion 207 of the lever 206 thereby releasing the non-add lever 201 to the action of a spring, which urges said lever counter-clockwise to engage the shoulder on the lower end thereof with the end of the pawl 209, when the #3 totalizer has not been selected for addition and said pawl 209 is in the position here shown. Continued movement of the plate 174 rocks the engaging lever 176 counter-clockwise in relation thereto, causing the upward extension of the pawl 198 to engage the stud 200, thus rocking said pawl clockwise to move a downward extension 212 thereof out of the path of a square stud 213 carried by the engaging plate 174. In this case no engaging movement is imparted to the link 178, arm 180 and shaft 182, consequently the wheels of the #3 totalizer remain disengaged from the extensions 129 of the actuators 68.

Tabulating the traveling carriage to the proper columnar position causes the add camming lug, for the #3 totalizer on the control block, to rock the hanging bar lever to lift the hanging bar 211 to rock the pawl 209 counter-clockwise to move the projecting tooth thereof out of the path of the shoulder on the non-add lever 201. Then initial movement clockwise (Fig. 5A) of the engaging plate 174 permits the lever 201 to be rocked counter-clockwise by a spring to move the stud 200, carried thereby, out of the path of the upward extension of the pawl 198, to permit the downward extension 212 of said pawl to engage the stud 213 to terminate relative movement of the engaging lever 176 in relation to the plate 174 and to cause said lever to move in unison with said plate, which, by means of the link 178, rocks the engaging arm 180 and the shaft 182 counter-clockwise. Counter-clockwise movement of the shaft 182, as viewed in Fig. 5B, and clockwise movement of said shaft, as viewed in Fig. 3, causes the totalizer engaging cams 197 to rock the totalizer framework 195 counter-clockwise to engage the wheels of the #3 totalizer with the teeth in their corresponding extensions 129, after said extensions and the actuator racks 68 have completed their initial movements rearwardly. Return movement forwardly of said actuators and said extensions rotates the wheels of the #3 totalizer in proportion to the depressed keys 46 and 47, as explained earlier herein.

Return movement counter-clockwise of the engaging plate 174 (Fig. 5A) causes a square stud 221 in a curved extension thereof to engage the lever 176 to terminate relative movement of said lever and to cause said lever to move in unison with said plate 174. This movement of the lever 176, by means of the link 178, rocks the arm 180 and the shaft 182 clockwise, as viewed in Fig. 5B and counter-clockwise as viewed in Fig. 3, to disengage the wheels of the #3 totalizer from the extensions 129, after said extensions and the actuators 68 have completed their return movements forwardly.

*Non-add control of totalizer engaging mechanism*

Depressing the Non-Add key 48 (Figs 2 and 5A) causes an obstruction to be moved into the path of the non-add lever 201, to prevent counter-clockwise movement of said lever when the nose 208 of the plate 174 moves out of engagement with the bent-over portion 207 of the lever 206, thereby preventing engagement of the wheels of the #3 totalizer with the actuator extensions even though the pawl 209 has been moved out of the path of said non-add lever 201 in the manner explained above.

Depressing the Non-Add key 48 moves a notch 222 therein opposite a bent-over ear 214 of a non-add lever 215 for the #1 and #2 totalizers, thereby releasing said lever to the action of a spring 216, which urges said ear 214 into the notch 222 to rock said lever clockwise. The bent-over ear 214 carries a stud 217 which is engaged by a slot in a bent-over portion 218 of a #3 and #4 non-add lever 219 pivoted on a stud 220 in the auxiliary frame 203 and consequently said non-add lever 219 rocks clockwise in unison with the lever 215. Clockwise movement of the lever 219 moves a shoulder 224 thereof into the path of a bent-over ear 225 on a projection of the non-add lever 201, to obstruct counterclockwise movement of said lever irrespective of whether or not the pawl 209 has been moved to ineffective position, in the manner explained previously.

An extension of the lever 219 moves into the path of the non-add lever for the #4 totalizer and obstructs counter-clockwise movement of said lever, and a shoulder and extension on the lever 215 likewise obstructs counter-clockwise movement of the non-add lever for the #1 and #2 totalizers, respectively, in exactly the same manner as explained for the #3 non-add lever 201. Near the end of an adding operation, return movement counter-clockwise (Fig. 5A) of the engaging plate 174 restores the pitman 205 and the lever 201 to the positions here shown to permit the pawl 209 to move into the path of the shoulder on said lever 201. However, the lever 206 and the pitman 205 retain said shoulder a slight distance away from the end of the pawl 209 so that said pawl may be easily disengaged when the traveling carriage is tabulated to a particular columnar position, to select the No. 3 totalizer for addition.

Further control of the non-adding mechanism is effected automatically during multiplying operations and will be explained later.

As the mechanism for controlling the engaging and disengaging of the various totalizers in total and sub-total operations is not pertinent to the present invention it has not been illustrated or described herein. However, reference may be had to the Lee Patent #2,079,355 and to the Christian Patent #1,939,804, for a complete disclosure of this mechanism. Likewise, the mechanism for controlling the engaging and disengaging of the Balance or No. 1 totalizer in subtracting operations has not been shown or described in the present application but is fully disclosed in the above patents.

*Key release operating mechanism*

The main shaft 135 (Figs. 3 and 5A) controls the rocking of the key release shaft 118 to release the depressed keys 46 and 47, in the manner explained earlier herein, at the end of the first mechanical cycle of a multiplying operation and at the beginning of the second mechanical cycle of a multiplying operation, at the end of adding and subtracting operations, and at the beginning of total and sub-total taking operations.

Secured on the left-hand end of the key release shaft 118 (Fig. 5A) is an arm 226 having a slot in the lower end thereof which engages a stud 227 in an upward extension of a slide 228 shiftably mounted on the frame 41 by means of slots therein, in cooperation with studs 229 and 230 in said frame 41. Pivoted on the slide 228 is a key release latch 231 spring-urged counter-clockwise to normally maintain a flat surface on a hook 232 thereof, in contact with a roller 233 carried by a key release plate 234, secured on the main shaft 135.

The roller 233 and the latch 231 control the shifting of the slide 228 and the movement of the key release shaft 118 in adding, non-adding, and subtracting operations, and also control the movement of said shaft during the first mechanical cycle of a multiplying operation.

Initial movement clockwise of the main shaft 135 and the plate 234 (Fig. 5A) cause the roller 233 to move beyond the hook 232, whereupon the latch 231 is spring-urged counter-clockwise to move said hook into the path of said roller. After printing has been effected, return movement counter-clockwise of the shaft 135 and plate 234 causes the roller 233, in cooperation with the latch 231, to shift the slide 228 rearwardly against the action of a spring (not shown) to rock the arm 226 and key release shaft 118 clockwise, as viewed in Fig. 5A and counter-clockwise as viewed in Fig. 3, to shift the locking detents 74 rearwardly to release the depressed keys 46 and 47 in the manner explained earlier herein.

Continued movement rearwardly of the latch 231 and slide 228, after the keys have been released, causes an upward extension 223 of said latch to engage a stud 249 in the frame 41 to rock the hook 232 out of engagement with the roller 233 to permit the slide 228 and the shaft 118 to be spring-returned to normal positions.

In sub-total taking operations, total operations, and in the last mechanical cycle of a multiplying operation it is necessary to impart releasing movement to the shaft 118 at the beginning of such operations, as explained earlier herein, to release any inadvertently depressed keys 46 or 47, so that such depressed keys will not interfere with initial movement rearwardly of the actuators 68 (Fig. 3) thereby preventing said actuators from being positioned by the wheels of the totalizer in which a sub-total taking or total-taking operation is being performed or thereby to preventing said actuators from being positioned by the product stop bars during the last mechanical cycle of a multiplying operation.

The plate 234 (Fig. 5A) carries a roller 235, which cooperates with a camming surface 236 on an arm 237 pivoted at 238 to the frame 41. The arm 237 has mounted on the lower end thereof a roller 239 adapted to cooperate with a hook 240 formed on one end of a lever 241 pivoted at 242 to a downward extension of the slide 228. A spring (not shown) urges the lever 241 clockwise to normally maintain an extension 243 thereof in contact with a stud 244 in a total control bar 245 pivotally connected to the lower end of a lever 246, in turn pivoted on a stud in the frame 41. A spring 247 urges the bar 245 clockwise to normally maintain a finished surface on the upper edge thereof in contact with a collar 248 of the stud 230.

Depressing any of the Total keys 48 (Fig. 2) rocks the bar 245 downwardly, in the manner explained in the patents referred to hereinbefore, and also in the copending application of Paul H. Williams, Serial Number 97,547, which was filed August 24, 1936, and was issued on November 18, 1941, as Patent No. 2,263,479, to retract the stud 244 from the extension of the lever 241 to release said lever to the action of its spring, which rocks said lever clockwise to engage the hook 240 thereof with the roller 239. Initial movement clockwise of the plate 234 causes the roller 235, in cooperation with the surface 236, to rock the arm 237 clockwise, against the action of the spring 239, to shift the slide 228 rearwardly to rock the key release shaft 118 clockwise, as viewed in Fig. 5A, to release any depressed keys 46 or 47 prior to initial movement rearwardly of the actuators 68.

By observing Fig. 3 it will also be seen that this initial movement of the key release shaft 118 also shifts the control plates 76 forwardly to release the zero stop pawls 82, so that the actuators 68 are free to move rearwardly with the leading frame 91.

FACTOR ENTERING AND PRODUCT PRINTING MECHANISMS

*Framework for factor entering and product printing mechanisms*

A plurality of factor or keyboard switches corresponding to the factor keys 46 and 47 are provided for transferring the multiplicand and multiplier from the accounting machine to the electrical multiplying unit. The actuators 68, under influence of the depressed keys 46 and 47, select the switches corresponding to said depressed keys, during the factor entering cycle. The contact members of the switches are mounted in a shiftable framework, which, after said switches have been selected, is shifted downwardly then upwardly to close the selected switches and to simultaneously close a switch for starting the multiplying cycle of the electrical multiplying unit.

Likewise a plurality of denominational sets of rack stop magnets, each set corresponding to the various numerical positions of the corresponding actuator rack 68, are provided for transferring the product from the electrical multiplying unit to the accounting machine for printing and storing thereby. After the product has been formed, by the electrical multiplying unit, the rack stop magnets, corresponding to the digits of said product, are energized and during the product printing cycle control the positioning of the actuator racks 68 and the printing mechanism in proportion thereto.

The rack stop magnets and the shiftable framework for the keyboard switches are supported by a framework comprising right and left plates 251 and 252 (Figs. 4B, 5B, 6B and 7), secured to the base 42 and further supported by a rack stop guide plate 253 and parallel cross plates 254 and 255, which support the rack stop magnet assemblies. The plates 251 and 252 are further held in fixed relation to each other by tie bars 256 and 257 and switch terminal bars 258 mounted between said tie bars 256 and 257.

The keyboard switch operating mechanism comprises a shiftable framework 250 having a U-shaped bar 259 (Figs. 5B, 6B and 7) for each of the rows of keys 46 and 47, each of said U-shaped bars having a bent-over ear 260 on each end, secured respectively by screws 261 and their associated nuts, to the cross bars 262 and 263. Opposite ends of the cross bars 262 and 263 are bent at right angles thereto to form legs, and the legs thus formed on the bar 262 have secured thereto upwardly extending arms 264 (Figs. 4B and 5B) and the legs thus formed on the bar 263 have secured thereto similar upwardly extending arms 265.

The right-hand arms 264 and 265 of the shiftable framework (Fig. 4B) are connected, respectively, to rearwardly extending arms of bell cranks 266 and 267, secured respectively on shafts 268 and 269, journaled in the side plates 251 and 252. The arms 264 and 265, on the left-hand ends of the bars 262 and 263 (Fig. 5B) are connected, respectively, to rearwardly extending cranks 270 and 271, secured respectively to the shafts 268 and 269.

From the foregoing description, and by referring to the drawings, it can readily be seen that the keyboard switch framework 250 is supported for parallel up and down movement by the cranks 266 and 270 and the shaft 268, and by the cranks 267 and 271 and the shaft 269. The shafts 268 and 269 (Fig. 4B) are connected for parallel movement by a link 272 connected between the upwardly extending arms of the bell cranks 266 and 267.

Fast on the right-hand end of the shaft 268 (Figs. 4A and 4B) is a crank 273 to which is pivotally connected the rearward end of a link 274 pivotally connected at 275 to a link 276 in turn pivotally connected at 277 to the forward end of a link 278. The rearward end of the link 278 is slotted to embrace a stud 280 (Fig. 30) in the downwardly extending arm of a crank 284, secured on the right-hand end of a shaft 285 journaled in the upwardly extending ears of the plates 251 and 252 (Fig. 7). A spring 286 (Fig. 4B) tensioned between a stud in the link 278 and a stud 287 in a projecting ear of the plate 251, urges said link 278 forwardly to normally maintain the rearwardly disposed end of the slot therein in contact with the stud 280.

Multiplication key and associated mechanism

As previously explained, the multiplication key 54 (Figs. 2 and 4A) is used to initiate a multiplying operation. Obviously it is necessary to form certain connections between the accounting machine and the factor-entering mechanism at the beginning of a multiplying operation, and this is effected by depression of the multiplication key 54, as will now be explained.

In the upper end of the link 276 is a stud 288 normally engaged by a notch in an upturned portion of an extension 289 of the Multiplication key 54, which key is pivoted on a stud 290 secured in the frame 40 and provided with a convenient fingerpiece for the manipulation thereof. The forward end of the link 274 (Figs. 4A and 4B) has an inverted L-shaped slot 292 therein, which cooperates with a stud 293 in an extension of the arm 185. A link 294 pivotally connects the link 274 to one arm of a bell crank 295 free on a stud 296 in a plate 297 secured to the totalizer frame 70.

The rearwardly disposed end of a link 298 is pivoted on a stud in a downwardly extending arm of the bell crank 295, while near the forward end of said link is a stud 299 which engages a slot in a clutch lever latch arm 300, turnably supported by a stud 301 in the plate 141 and urged counterclockwise by a spring 302 to engage a latching surface 303 thereof with a bent-over ear 304 of the clutch lever 146 in multiplying operations as will be described presently. The rearward end of a link 305 is loosely connected to the forward end of the link 298 and the forward end of said link 305 has a slot therein which engages a stud 306 in the releasing arm 158.

A link 307 (Fig. 4B) pivotally connects an extension of the bell crank 295 to an arm 308 secured on a non-add control shaft 309 one end of which is journaled in a bracket 310 secured to the right-hand totalizer connecting plate 128, and the other end of which is journaled in an upward extension of the left-hand plate 128 (Fig. 5B). A spring 311, connected between the link 307 and a stud 414 in the base 42, urges the bell crank 295 counterclockwise and the links 298 and 305 rearwardly, and as said spring is strong enough to overcome the action of the spring 302, the latching surface 303 of the arm 300 is normally maintained out of the path of the ear 304, as here shown, and in all except multiplying operations, has no influence whatever upon the lever 146 and the action of the clutch mechanism.

Depressing the Multiplication key 54 (Figs. 4A and 4B) lifts the links 276, 274 and 294 to move the downward branch of the slot 292, in said link 274, into engagement with the stud 293. Lifting of the link 294 causes the flat surface of a stud 312 thereon to by-pass a latching point 313 on a latch 314, the forward end of which is slotted to receive a stationary stud 315 in the frame 70, and the rearward end of which has a slot therein which engages the stud 280 in the bell crank 284. After the stud 312 is moved beyond the point 313, a spring 316, tensioned between a stud in the latch 314 and the stud 287, returns said latch forwardly to move the point 313 beneath the flat surface of the stud 312 to retain the downward branch of the slot 292 in engagement with the stud 293. The latch 314 likewise retains other parts, actuated by depression of the Multiplication key 54, in actuated positions until just before the last mechanical or product printing cycle, when said latch 314 is disengaged from the stud 312 in a manner presently to be described.

Lifting of the link 294 rocks the bell crank 295 clockwise, against the action of the spring 311, to shift the links 298 and 305 forwardly to permit the pawl 300 to move into yielding engagement with the ear 304 and to cause the rearward end of the slot in the link 305, to engage the stud 306 to rock the arm 158 clockwise to disengage the stud 157 from the surface 156 of the release lever 158, to release the machine for the first mechanical or factor entering cycle of a multiplying operation. A downwardly extending portion 317 of the Multiplication key 54, upon depression of said key, engages a stud 318 in the plate 170 to assist the link 305 in releasing the machine by depressing the Motor Bar 50.

As the link 305 moves forwardly, a bent over ear 333 thereon, which is normally out of the path of the ear 304 on the lever 146, as shown in Fig. 4A, moves into the path of said ear to prevent counterclockwise releasing movement of said lever 146 until the Multiplication key 54 is fully depressed. When the key 54 is fully depressed the ear 333 is positioned beyond the ear 304, and a recess in the link 305 is positioned opposite said ear 304 to provide clearance therefor, to permit releasing movement of the lever 146.

Near the end of the factor entering cycle the cam 137 (Fig. 4A) returns the lever 146 clockwise, slightly farther than is necessary, to insure that the surface 303, of the latch 300, latches over the ear 304, to obstruct releasing movement of the clutch levers 146 and 143, until the Multiplication key 54 is released at the beginning of the product printing cycle, as will be explained more in detail later.

Automatic non-add mechanism

As a rule it is desirable not to add either of the factors set up on the accounting machine keyboard in any of the accounting machine totalizers; therefore mechanism, which is normally effective during multiplying operations, is provided for automatically depressing the Non-Add key 48 (Figs. 2 and 5A) to accomplish this result.

Secured on the left-hand end of the shaft 309 (Figs. 5A and 5B) is an arm 319 to which is loosely connected one end of a link 320, the other end of which carries a stud 321, which cooperates with an L-shaped slot 322 in the upper end of a bell crank 323 pivoted on a stud 324 in the frame 203. A forward finger 325, of the bell crank 323, underlies a left-hand finger of a lever 326 (Fig. 31) pivoted near its center on a stud 327 in a bracket 328 secured to the frame 203. The right-hand end of said lever 326 overlies a stud 329 in the stem of the Non-Add key 48.

The stud 321, in the link 320, also extends through a slot in a rearwardly disposed arm of a manipulative control lever 330 pivoted on a stud 331 in the frame 203. An upward extension of the control lever 330 extends through an opening in the machine case 124 and a retaining lug 332, formed on said upward extension, in cooperation with two position holes in the machine case, yieldingly retains the control lever 330 in either of its two positions.

When the lever 330 is in its effective position, as shown in Fig. 5A, the stud 321 is retained in the downward branch of the L-shaped slot 322, consequently clockwise movement of the bell crank 295 (Figs. 4A and 4B), when the Multiplication key 54 is depressed, through the link 301 and arm 308 imparts similar movement to the shaft 309, as viewed in Fig. 4B, and counter-clockwise movement to said shaft, as viewed in Figs. 5A and 5B. This movement of the shaft 309, through the link 302, rocks the bell crank 323 counter-clockwise, which, by means of the lever 326, in cooperation with the stud 329, depresses the Non-Add key 48 to insure that the multiplier and multiplicand are not entered in any of the machine totalizers.

If for any reason it is desirable to render the automatic non-add mechanism ineffective, shifting the lever 330 from the position shown in Fig. 5A clockwise to its ineffective position, lifts the stud 321 out of the downward branch of the slot 322 and into alinement with the substantially horizontal branch of said slot so that counter-clockwise movement of the shaft 309 and the resulting rearward movement of the link 320, permits the stud 321 to move idly in the slot 322, without imparting any movement to the bell crank 323 or the Non-Add key 48.

*Shiftable framework for keyboard switches*

After the downward branch of the slot 292 (Figs. 4A and 4B) has been moved into cooperative relationship with the stud 293, by depression of the Multiplication key 54, as previously explained, initial movement counterclockwise of the lever 134 causes the stud 133, in cooperation with the cam slot 184, to rock the arm 185 clockwise, which in turn shifts the link 274 rearwardly to rock the shafts 268 and 269 clockwise to shift the keyboard switch member framework 250 downwardly to cause the switch members, corresponding to the depressed keys 46 and 47, to be latched in effective positions, as will be explained later.

Return movement clockwise of the lever 134 (Fig. 4A) returns the arm 185 forwardly or counter-clockwise to raise the framework 250 to cause the effective switch members to close circuits corresponding to the depressed keys 46 and 47, as will be described more fully further on. A spring 334 (Fig. 4B) tensioned between a stationary stud in the plate 251 and a stud in an arm 335 secured on the right-hand end of the shaft 269, urges said arm and said shaft counter-clockwise to assist in returning the framework 250 upwardly to normal position, which position is determined by one edge of the arm 335 engaging a stud 336 in the plate 251.

*Keyboard switch mechanism*

Inasmuch as the factor entering or keyboard switch mechanism is substantially duplicated in each denominational order, it is believed that a description of the mechanism for one such denominational order, as shown in Figs. 3 and 4A and 4B, will suffice.

Referring to Figs. 3 and 4B, secured to the rearwardly disposed end of the extension 129 of the rack 68 is an extension 337 having therein a horizontal slot, which straddles a bar 338, supported by the plates 251 and 252, and said extension being held against lateral displacement by opposed grooves in said bar. A reduced portion on the rearward end of the extension 337 fits snugly between opposed faces formed by the top and bottom members of a framework 339. Said reduced portion also is adapted to slide in opposed notches formed in adjacent bent-over portions of said top and bottom members of the framework 339. The framework 339 is supported between bent-over ears of the plates 251 and 252.

From the above description it is evident that the bar 338 and the framework 339, in cooperation with the horizontal slots in the extension 337 and the reduced portion of said extension, respectively, support said extension for horizontal reciprocating movement in unison with the extension 129 and actuator 68 for the particular denomination here shown.

Formed on the upper edge of the extension 337 are upturned projections 340, 341 and 342, adapted to cooperate with right-angle ears 343 formed on the reduced downwardly extending portion of keyboard switch contact members or plugs 344. There is a switch plug 344 for each of the keys 46 (1 to 9) (Fig. 3) and one for the zero position, which has no key.

The reduced downward portions of the plugs 343 fit in slots in the lower horizontal arm of the U or channel-shaped member 259, for this particular denomination, while the upper ends of said plugs fit in similar slots in the upper horizontal arm of said bar 259. The shoulder formed by the reduced portion of the plug 343 normally rests on the top surface of said lower horizontal arm. The upper ends of the plugs 344 carry contact buttons 345, said buttons being insulated from said plugs and adapted to be forced between the blades of stationary switch members 346 (Figs. 4B and 7), 347 and 348, to close a circuit between the plus side of the source of electrical energy and a digit line in each of cables as 8a and 8b corresponding to the value of the depressed key 46.

The cables 1a, 1b, 2a, 2b, etc., correspond to the different denominational orders of the multiplicand, and each cable contains ten digit lines, which are carried by the cables to the TM or pairing relays, where they are connected to other lines during a multiplying operation, as will be explained more fully later.

The banks of multiplier keys 47 (Figs. 2 and 7) have switches similar to those just described for the keys 46; however, instead of three connections the multiplier switches have only two connections for completing circuits between plus and the multiplication relays. The third connection for the multiplicand switches is used to provide separate circuits for right-hand and left-hand components of partial products and thus prevent feed-back circuits in the pairing relays. A wiring diagram of the multiplicand and multiplier switches is shown in Fig. 9.

Each of the switch plugs 344 carries a stud 349 adapted to cooperate with the angular nose of a corresponding hook 350 of a detent 351 mounted for horizontal sliding movement on the bar 259 by means of slots in said detent, in cooperation with studs 352 secured in said bar. The detent 351 has a vertical slot 353 in the rearward end thereof, through which extends a rod 454 supported by two similar arms 455 (Figs. 4B and 7) secured on a shaft 456 journaled in the frames 251 and 252. The rod 454 likewise extends through clearance openings in the bars 259 and plate 251, said openings in the bars 259 and the vertical slots 353 in the detents 351 permitting these parts to move down and up, with the frame 250, while said rod 454 remains stationary. A spring 457 (Fig. 4B) tensioned between the right-hand arm 455 and a stationary stud, urges said arm, its companion arm and the rod 454 clockwise to normally maintain the detent 351 in its forward position, as here shown.

The mechanism shown in Fig. 4B and described in connection with the mechanism of Fig. 3 is substantially duplicated in each denominational row of the multiplicand and the multiplier keys 46 and 47. The small numbers on the lower ends of the switch plugs 344 represent the numerical values of said plugs and the projection 340 is adapted to cooperate with the 0, 3, 6 and 9 switch plugs, the projection 341 with the 1, 4 and 7 plugs, and the projection 342 with the 2, 5 and 8 plugs.

When the extension 337 is positioned in proportion to the depressed key 46, as explained above in connection with Fig. 3, downward movement of the framework 250 causes the switch plugs 343 and the detent 351 to move downwardly in unison therewith until the bent-over ear 343 of the selected one of said switch plugs engages the projection 340, 341 or 342, corresponding to the depressed key 46. This obstructs downward movement of said plug whereas the framework 250 continues its downward movement, causing the stud 349 to cam the detent 351 rearwardly, against the action of the spring 457, until the latching surface on the hook 350 passes beyond a flat surface on the bottom of said stud 349 of the selected plug or contact member 344.

When the stud 349 moves beyond the hook 350, the spring 457 returns the detent 351 forwardly to latch the selected switch plug in its moved position, in relation to the shiftable framework 250. Return movement upwardly of the framework 250 causes the contact button 345, of the selected plug 344, to be forced between the flexible prongs of the switch blades 346, 347 and 348 (Figs. 4B and 7) to connect the plus supply terminal to the digit lines in related cables as 1a, 1b, according to the depressed key 46.

The switch blades 346, 347 and 248 (Figs. 4A and 4B) of the keyboard switches, are connected by wiring (not shown) to corresponding contact members (not shown) in holes 458 in an insulating panel 459 secured to the guide pins 43, which, it will be recalled, are in turn secured in the machine base 42. The contact members in the holes 458 have corresponding plugs 460 fast in an insulating panel 461 secured to the cabinet 44. The plugs 460 are in turn connected by wiring to the corresponding pairing or TM relays.

Inasmuch as all electrical connections between the accounting machine and the multiplying unit are formed by the plugs 460 and corresponding contact members, the accounting machine may be easily separated from the multiplying unit when necessary. The guide pins 43, in cooperation with the holes in the panel 461 and the cabinet 44, insure that the plugs 460 enter the corresponding holes in the panel 459, when the accounting machine is placed on the cabinet 44.

*Starting or pin board switch*

In the present machine, one terminal of all the relays is permanently connected to the negative side of the current supply source, and all controlling of the relays is effected by switches or contacts, which when operated complete a circuit from the plus side of the supply source to the other terminals of the relays being controlled. A magnetic switch mechanism, which will hereinafter be known as the CPS or control plus switch, forms a connection between the plus side of the supply source and all plus-load sources.

The control plus switch is normally open; however, a switch, which will hereinafter be termed the PBS or pin board switch, functions in unison with the keyboard switches, described above, to energize the control plus switch relay to cause the plus side of the current supply source to be connected to all the plus-load sources during the multiplying cycle. The pin board switch is well shown in Figs. 7 and 8, and will now be described in detail.

The pin board switch (PBS) comprises a stem portion or plug 354, which is mounted for vertical shifting movement in slots in the opposed arms of a U-shaped bracket 355 secured to the bar 259 for the highest denominational multiplier digit. The reduced lower end of the plug 354 forms a shoulder, which, when the machine is at rest, engages the bracket 355 to determine the normal disengaged position of said plug 354. The upper end of the plug 354 has mounted thereon, and insulated therefrom, a contact button 356, which is adapted to be forced between the resilient prongs 357 and 358 of the stationary portion of the pin board switch, said prongs being secured to the left plate 252 by screws 359. The switch prongs 357 and 358 are insulated from the plate 252. The plug 354 carries a pin 360, which cooperates with a hook 361 on a detent 362 mounted to slide horizontally, similar to the detent 351, by means of slots therein in cooperation with studs 363, in the bar 259. The rod 454 passes through a vertical slot in the detent 362 similar to the slot 353 in the detent 351 (Fig. 4B).

When the keyboard switch frame work 250 (Figs. 4B and 7) is shifted downwardly, near the middle of the factor entering cycle, movement of the pin board switch plug 354 (Fig. 8) in unison therewith is interrupted by a fixed stud 364 in the frame 252 and as said framework 250 moves in relation to said plug the stud 360, in cooperation with the angular nose of the hook 361, shifts the detent 362 rearwardly, against the action of the spring 457. When the stud 360 passes beyond the hook 361 the detent 362 is spring-returned forwardly to engage said hook 361 with the flat bottom portion of said stud 360 to latch the plug 354 in effective position. Return movement upwardly of the framework 250 causes the contact button 356 to be forced between the resilient prongs 357 and 358 to complete a circuit between the main plus supply and the control plus switch relay, whereupon energization of said relay causes the main plus supply to be connected to all plus demand sources. The functioning of the pin board switch will be explained more fully later.

After the multiplier and multiplicand have been entered in the electrical multiplying unit, the mechanical portion of the machine completes its first cycle without having any further effect on said multiplying unit.

*Rack stop magnets*

Multiplication starts immediately after the multiplicand and multiplier have been entered in the unit, and as multiplication progresses, the digits of the complete product, beginning with the lowest denominational order, are accumulated and locked in the relays of the product register. After all of the product digits have been locked in the product register, rack or actuator stop magnets, corresponding to the numerical values of said digits, are energized and upon operation move stops into the paths of corresponding graduated steps on the rearward extensions 337 (Fig. 4B) of the actuator racks 68. The rack stop magnets remain energized until after the product printing or second mechanical cycle has been completed.

After the rack stop magnets, corresponding to the numerical values of the different denominational digits of the product, have been energized, the timing chain relays of the multiplying unit cause an operation control solenoid to be energized, which immediately initiates the second or product printing cycle of the mechanical portion of the machine. Operation of the machine causes the actuators 68 (Figs. 3 and 4A and 4B) and their corresponding printing sectors 96 to be positioned in proportion to the complete product so that said product will be printed in the proper column of the record material carried by the platen roll 112.

Near the middle of the product printing cycle the detents 351 for the keyboard switch plugs 343 and the detent 362 (Fig. 8) for the pin board switch plug 354 are shifted rearwardly to disengage their respective hooks 350 and 361 from the pins 349 and 360, and to cause a camming surface on said detents to force said pins downwardly to open all closed multiplicand and multiplier switches and the pin board switch. These switches no longer need remain connected as the complete product has been arrived at and is now locked in the relays of the product register. Near the end of the product printing cycle, mechanism functions to release the control plus switch which in turn deenergizes the rack stop magnets so that the machine will be ready for the next multiplying operation, at the beginning of which the product register is cleared.

While there is a complete set of rack stop magnets for each denominational order of the product, the set of magnets shown in connection with the denominational order of the machine illustrated in Figs. 3, 4A and 4B and 7 will be described as an example of all such magnets.

The extension 337, which, as previously explained, is connected to the extension 129 in turn connected to the actuator rack 68, for this particular denomination, has on the bottom surface thereof a plurality of bent-over ears 365 arranged in the form of steps. The ears 365 are arranged to cooperate with corresponding upper ends of rack stop bars 366, the lower ends of which are slotted to receive one end of a rack stop magnet armature 367, the other end of said armature being hinged to one arm of a U-shaped frame 368 of a corresponding rack stop magnet 369 secured to the plates 254 or 255. The upper ends of the rack stop bars 366 are guided by slots in the plate 253 through which said bars extend.

Inasmuch as all the zero stop pawls 82 are released at the beginning of the product printing cycle of a multiplying operation, it is necessary to provide means for stopping the actuator 68 in zero position when a zero appears in the product. Referring to the representative denomination shown in Figs. 4A and 4B, when a zero appears in the product, the zero rack stop magnet 369 is energized and attracts its armature 367 to raise its bar 366 to move a forward extension 370 thereof into the path of the rearwardly disposed end of the extension 337 to retain said extension and the actuator 68 in zero positions, in order to print the zero of the product on the record material.

In a similar manner, when a digit from 1 to 8 is stored in the product register, the corresponding rack stop magnet is energized and moves its stop bar 366 upwardly into the path of the corresponding bent-over ear 365 on the extension 337 to position said extension, the actuator rack 68, and the printing sector 96 for this denomination, in proportion to the digit of the product.

It will be noted that there is no rack stop magnet 366 for the ninth position of the extension 337 and actuator 68. The reason for this is that when a "9" appears in the product the extension 337 and actuator 68 are permitted to move full distance rearwardly to ninth position, which position is determined by the shoulder 71 (Fig. 3) coming in contact with the support bar 64, the same as when the "9" key 46 is depressed.

*Initiation of product printing cycle*

After the complete product has been stored in the product register and the rack stop magnets 369, corresponding to the product, have been energized, an automatic operation of the machine is initiated by energization of a machine release solenoid 371 (Fig. 5B), otherwise referred to as solenoid RM2 supported by a U-shaped framework secured to the base 42. Energization and operation of the solenoid 371 causes its armature 372 to be forced rearwardly (Figs. 5B and 6B). Twin links 373 connect the armature 372 to a stud 374 in an arm 375 integral with a hub 376 free on a stud 377 in the totalizer frame 127, therefore rearward movement of said armature rocks said crank 375 and said hub 376 clockwise. The hub 376 connects the arm 375 to a bell crank 378, one arm of which is connected by a link 379 to a crank 380 fast on the left-hand end of the shaft 285. Consequently said bell crank and the shaft 285 rock clockwise in unison with the arm 375 against the action of a spring 381, tensioned between a stud 391 in the downward arm of the bell crank 378 and a stationary stud in the base plate 42.

This movement of the shaft 285, which is counter-clockwise as viewed in Figs. 4A and 4B, by means of a link 382 connecting the bell crank 284 to the forward end of a link 383, the rearward end of which link is pivoted on the rod 454, shifts said link 383 downwardly to engage a stud 384, in the forward end thereof, with a notch in one end of an operating link 385. The link 385 is shiftably mounted by means of a curved slot therein, in cooperation with a fixed stud 386 in the plate 128, and the forward end of said link is pivoted on a stud 387 in the cam arm 131.

Counter-clockwise movement of the shaft 285 and the bell crank 284, through the stud 280, shifts the latch 314 rearwardly, against the action of its spring, to disengage the point 313 thereof from the stud 312 to free the link 294 and mechanism connected thereto, to the action of the spring 311, which immediately rocks the bell crank 295 counter-clockwise to restore said bell crank and mechanism connected thereto to normal positions. Counter-clockwise movement of the bell crank 295 shifts the links 294 and 276 downwardly to move the horizontal portion of the L-shaped slot 292 opposite the stud 293, so that the framework 250 will remain stationary during the last mechanical or product printing cycle.

Counter-clockwise movement of the bell crank 284 likewise shifts the link 278 rearwardly, against the action of its spring 286, to rock the link 276 clockwise on its pivot 275, to move the stud 288 out of the path of the operating notch in the rearward extension 289 of the Multiplying key 54, so that unintentional depression of said key will have no effect upon the mechanism associated therewith during the product printing cycle of the machine.

Counter-clockwise return movement of the bell crank 295 (Figs. 4A and 4B) shifts the link 298 rearwardly to move the shoulder 303 out of the path of the bent-over ear 304, so that the machine may be released for the product printing cycle. Counter-clockwise movement of the bell crank 295, through the link 307 and arm 308, returns the shaft 309 counter-clockwise as viewed in Fig. 4B, and clockwise as viewed in Fig. 5B to restore the bell crank 323 and the lever 326, so that the Non-Add key 48 will be released at the beginning of the product printing cycle.

Ordinarily, the slot in the forward end of the link 305 (Fig. 4A) in cooperation with the stud 306, holds the stud 157 out of the path of the shoulder 156, until after the shoulder 303, of the retaining pawl 300, is rocked out of the path of the ear 304, and as a consequence the clutch levers 146 and 143 are free to move counter-clockwise under influence of the spring 155 to render the clutch mechanism effective, to operate the machine. However, there is a remote possibility that during disengaging of the latch 300 and the consequent movement rearwardly of the link 305, the stud 157 may engage the shoulder 156 sufficiently to prevent automatic operation of the machine and to insure that this does not occur, auxiliary means, operated by the release solenoid 371, rocks the lever 158 clockwise, in case it has been returned, to disengage the stud 157 from the shoulder 156.

Referring to Figs. 5A and 5B, the rearward end of a link 388 is free on the stud 391, while the forward end of said link is free on a stud 389 in a key release control plate 390, free on the stud 204. A link 394 pivotally connects the plate 390 to a lever 395, free on machine release shaft 396 journaled in the main frames 40 and 41. The lever 395 carries a stud 397 which co-operates with a finger 398 secured on the shaft 396. Secured on the right-hand end of the shaft 396 (Fig. 4A) is an arm 399, the upper end of which is slotted to receive a stud 400 in an arm of the lever 167.

Rearward movement of the armature 372 (Figs. 5A and 5B) when the solenoid 371 operates, shifts the link 388 rearwardly to rock the plate 390 clockwise, which movement, through the link 394, rocks the lever 395 counter-clockwise. Counter-clockwise movement of the lever 395, through the stud 397 and finger 398, rocks the shaft 396 counter-clockwise, as viewed in Fig. 5A and clockwise as viewed in Fig. 4A, which movement by means of the arm 399 rocks the lever 167 counter-clockwise to insure that the stud 157 does not reengage the shoulder 156 when the link 305 moves rearwardly to normal position, as explained above.

Clockwise movement of the plate 390 (Figs. 5A and 5B) under influence of the solenoid 371, causes a camming surface 401, on an extension thereof, in cooperation with a stud 402 in the lever 245, to rock said lever counter-clockwise against the action of its spring 247 to retract the stud 244 from the extension 243 of the lever 241. This permits said lever 241 to be spring-urged clockwise to engage the notch 240 therein with the roller 239 so that all depressed keys, including the multiplicand and multiplier keys 46 and 47 and the Non-Add key 48, will be released at the beginning of the product printing cycle.

Control switch for the release solenoid

A control switch 412 (Fig. 4B), also referred to as switch BSS, is provided for preventing operation of the release solenoid 371 prior to completion of the factor entering cycle of the accounting machine. This control switch is merely a safety precaution to prevent the release solenoid from functioning in case the machine stalls or is unusually slow in completing the factor entering cycle.

Directing attention to Figs. 4A and 4B, when the machine is at rest the roller 133, carried by the lever 134, normally engages a finger 403 of a lever 404 pivoted on a stud 405 in the right-hand plate 128, to normally maintain said lever in ineffective position, as here shown, against the action of a spring 406. Pivoted on the rearward end of the lever 404 is a switch arm 407 urged clockwise by a spring 408 to normally engage a collar on a stud 409 in said lever 404. The switch arm 407 carries a contact member 410 which is insulated therefrom and which is adapted to resiliently engage similar blades 411 of the switch 412 mounted on a bracket secured to the machine base 42.

When the lever 404 is in normal position, as here shown, the switch member 410 is disengaged from the blades 411; however, at the beginning of the factor entering cycle, or for that matter any mechanical cycle, counter-clockwise movement of the lever 134 (Fig. 4A) withdraws the roller 133 from the finger 403 to permit the spring 406 to rock the lever 404 clockwise to move the contact member 410 between the blades 411 of the switch 412 to complete a circuit from plus to the holding circuit of a relay MT 12 (Fig. 25A) which, upon operation, prevents operation of the release solenoid 371 so that said solenoid cannot function during the factor entering cycle. The switch 412 (BSS) functions in every mechanical cycle, but is effective only when the electrical multiplying unit is functioning.

Near the end of machine operation the roller 133 again engages the finger 403 to disengage the switch member 410 from between the blades 411 to break the holding circuit so that the release solenoid can function to initiate the product printing cycle of the machine. The clockwise movement of the lever 404 is limited by a hump 413 thereon contacting the top of the stud 414 in the base 42. The flexible construction of the switch arm 407 permits the lever 404 to move independently thereof during its initial movement clockwise, if for any reason this becomes necessary.

It is to be noted that energization of the release solenoid 371 (RM 2) can only take place after the relay MT 13 has been energized and the relay MT 12 has been released, to properly complete a multiplying cycle. If the multiplying cycle has not been properly completed the switch 412 (BSS) cannot, under any circumstances, cause energization of the release solenoid.

The switch 412 also functions during the last or product printing cycle of the accounting machine; however, this is of no importance as all circuits to the multiplying unit have been rendered ineffective by this time.

Control switch for the rack stop magnets

A control switch, also referred to as switch FSS (Fig. 4B), functions near the end of the product printing cycle to interrupt a holding circuit to the last relay (MT 13) of the timing chain, which relay, when released, causes release of the rack stop magnets 369 after printing of the product has been effected.

The initial movement clockwise of the lever 404 (Figs. 4A and 4B) near the beginning of the product printing cycle, causes a pawl 415, pivotally mounted thereon and urged clockwise by a spring 416, to normally maintain a stud 417 carried thereby in contact with a projecting surface on said lever 404, to by-pass a forward edge of a disengaging plate 418 integral with, but insulated from, one blade of the FSS switch 419. The one blade of the switch 419 has a contact point thereon which is normally in contact with a similar contact point on the other blade, said blades being mounted on a bracket 420, from which they are insulated, said bracket in turn being secured to the plate 251.

Return movement counter-clockwise of the lever 404, near the end of the product printing cycle, causes the tooth of the pawl 415 to engage the forward edge of the plate 418 to disconnect the contact points of the switch 419 to interrupt one of the holding circuits to the last timing chain relay MT 13. If the other holding circuit to MT 13 has been broken by this time, MT 13 is released and in turn releases the rack stop magnets 369. After the contacts of the switch 419 have been opened for a sufficient interval of time the tooth of the pawl 415 rides off the forward edge of the plate 418 to permit the contacts of said switch 419 to again engage each other.

The switch 419 also functions in the factor entering cycle of a multiplying operation; however, the operation of the electrical multiplying unit has not progressed sufficiently for this operation of the switch 419 to be of any effect whatever.

A clearing switch 421 (Figs. 5A and 17) also referred to as the CS switch is mounted on a bracket 422 secured to the auxiliary frame 203 by screws, and depression of said switch 421 completes a circuit to the clearing relay to cause the product register relays to be cleared whenever necessary or desirable.

Decimal point control slide

As explained previously herein, the principal use of the machine embodying this invention is to multiply the price of a unit of goods by the quantity or number of units. The eight rows of price or multiplicand keys 46 (Fig. 2) comprise two fixed decimal places in units and tens of cents while the four rows of quantity or multiplier keys 47 are provided with the decimal control slide 56 for placing the decimal point where desired in relation to these four rows of keys.

Inasmuch as the product is usually the price of so many articles at so much per article the product likewise has two fixed decimal places comprising units and tens of cents and all other unwanted decimals are discarded as the product is accumulated in the product register. If the digit in the highest order discarded has a numerical value of five or more, the value of the digit in the next higher order, that is the lowest order retained, is increased by one, to provide what is often referred to as "rounding-off" or "carry-over" of the decimals. The system used for discarding decimals in the present machine is to render the product register inoperative to accumulate the digits of the product until the unwanted decimals have been discarded. In other words, the product register does not begin to function for the storing of the digits of the product until all but two of the decimals in said product have been discarded or eliminated.

The decimal slide 56 (Figs. 2, 5A and 6A) also referred to as DS (Fig. 16) comprises a positioning pointer 423 having integral therewith a knob, for manipulating the decimal slide, and an extension which passes through a horizontal slot in a sleeve 424 secured to the machine case 124 (Figs. 2 and 5A) by spring clips and screws. The sleeve 424 is adapted to support one end of a tubular member 425, having a slot therein which coincides with the slot in said sleeve 424. The sleeve 424 is positioned directly at the forward end of the four rows of multiplier keys 47 and at right angles thereto so that the pointer 423, which represents the decimal point, may be positioned between any of the rows of said multiplier keys to point off the decimal places in the multiplier.

The tube 425 is formed so as to clear various parts of the machine, as shown in Figs. 5A and 5B, and is anchored in place by brackets 427 and 428 secured respectively to the auxiliary frame 203 and the totalizer frame 127. The rearwardly disposed end of the tube 425 is supported by a bracket 429 secured to the plate 252, and both the brackets 429 and 428 carry clamp nuts through which the tube 425 extends and is securely clamped in place thereby. The portion of the pointer 423 (Figs. 2, 5A and 5B) which extends through the matching slots in the sleeve 424 and the tube 425 is secured to one end of a flexible cable 430 sheathed in the tube 425 and having secured to the rearward end thereof a rod 431. The rod 431 is free in a bushing in a bracket 432, secured to the plate 252, and said rod has secured thereto a collar 433, which serves as a stop for one end of a sleeve 434, which slips over said rod 431 and is secured in place against said collar 433 by lock nuts 435 threaded on the end of said rod 431. The rearward end of the sleeve 434 is journaled in a bushing in a bracket 436 secured to the plate 252 and said sleeve carries a switch contact member 437, which is insulated therefrom, and which is adapted to form a connection between any one of five pairs of switch blades 438 and 439 (Figs. 5B and 6B) supported by the bar 258. The five sets of switch blades 438 and 439 correspond to the five positions of the pointer 423, and when said pointer is in zero position the contact member 437 makes a connection between the 0 pair of blades 438 and 439, thus indicating that there are no decimal places in the multiplier, and consequently no digits to be discarded, and so on, through positions 1, 2, 3 and 4 (Figs. 2 and 5B), which indicates respectively that 1, 2, 3 and 4 digits are to be discarded from the product. The digit discarding circuits used in connection with the decimal slide 56 will be explained more fully later herein.

ELECTRICAL MULTIPLYING UNIT

As explained at the beginning of this specification, the principle of multiplication used in the present machine is founded on the well known Hofgaard principle of calculation disclosed in the Hofgaard patents and particularly in Patent No. 2,262,235, previously referred to, in which the method of operation and construction of the various relays and other parts of the multiplying unit are fully disclosed. Therefore it is believed unnecessary to enter into a minute description of these parts, which have become established in the art by said Hofgaard patents. One valuable improvement, however, has been made in the various groups of addition relays by incorporating in each a non-transfer controlling relay to insure that non-transfer connections are properly made, and, unless such connections are properly made, to terminate operation of the machine until the error has been corrected.

It is believed that a list of all the relays used in the electrical portion of this machine will be helpful if placed right at the beginning of the description of said electrical portion. This list includes all relays, the control switches, and a brief description of each, and also gives the figure numbers for locating said relays in the drawings.

LIST OF RELAYS, SWITCHES, ETC.

| Relays | Description |
| --- | --- |
| 1.A (0 to 9) Figs. 22A to 22D<br>7.A (0 to 9) Figs. 24A to 24D | Relays of addition groups 1 and 7 for simultaneous addition of partial products. |
| Other addition groups:<br>2<br>3<br>4 Fig. 23<br>5<br>6 | Intervening groups of addition relays between relays 1.A and 7.A, which are identical in construction and operation with the 1.A group. |
| BSS (Fig. 19) | A control switch for preventing premature initiation of the product printing cycle. (See also FSS.) |
| 1.C (Fig. 22A) | Non-transfer indicating relay (group 1). |
| 7.C (Fig. 24A) | Non-transfer indicating relay (group 7). |
| 8.C (Fig. 28) | Non-transfer indicating relay (discard transfer). |
| Cl (Fig. 24B) | Clearing relay for product register. |
| CPS (Fig. 27A) | Control plus switch. |
| CS (Fig. 17) | Clearing relay operating switch. |
| 1.D (Fig. 22A) | Transfer indicating relay (group 1). |
| 7.D (Fig. 24A) | Transfer indicating relay (group 7). |
| 8.D (Fig. 28) | Transfer indicating relay (discard transfer). |
| 9.D (Fig. 29) | Transfer indicating relay (carry on carry). |
| DS (Fig. 16) | Decimal point control slide. |
| E (Fig. 28) | Evens relay which is energized if the number of discarded digits is even to insure that after all unwanted digits have been discarded, the lowest retained digit will be stored in the lowest order of the product register. (See also relay O.) |
| FSS (Fig. 21) | Control switch for releasing timing chain relays, which in turn release the rack stop magnets, after the complete product has been printed. |
| 1.GC (Fig. 22A) | Non-transfer relay control (group 1). |
| 7.GC (Fig. 24A) | Non-transfer relay control (group 7). |
| 8.GC (Fig. 28) | Non-transfer relay control (discard transfer). |
| 1.GD (Fig. 22A) | Transfer relay control (group 1). |
| 7.GD (Fig. 24A) | Transfer relay control (group 7). |
| 8.GD (Fig. 28) | Transfer relay control (discard transfer). |
| 7.L (0 to 9) Figs. 24A to D | Locking contact relays of product register 7. |
| A.M (0 to 9) Figs. 27B, C and D | For storing of partial products. Multiplication relays of group A. |
| B.M (0 to 9) Figs. 27A and B | Multiplication relays of group B. |
| C.M (0 to 9) Figs. 27B, C and D | Multiplication relays of group C. |
| D.M (0 to 9) Figs. 26B, C and D | Multiplication relays of group D. |
| MA and MB (Fig. 25A) | Timing chain control relays. |
| MT (1 to 13) Figs. 25A to D | Timing chain relays. |
| MTN (Fig. 27A) | General holding relay. |
| 1.NT (Fig. 22B) | Non-transfer relay (group 1). |
| 7.NT (Fig. 24B) | Non-transfer relay (group 7). |
| 8.NT (Fig. 28) | Non-transfer relay (discard transfer). |
| O (Fig. 29) | Odds relay which is energized, if the number of digits discarded is odd, to insure that the lowest order retained digit will be stored in the lowest order of product register 7. (See also relay E.) |
| KBS (Fig. 9) | Keyboard switches which are controlled by the multiplicand and multiplier keys for entering multiplication factors in the multiplying unit. |
| PBS (Fig. 18) | Keyboard control switch for initiating the multiplying cycle. |
| RC (Fig. 29) | Reset control relay. Opens one energizing line to the reset relay 7W (Fig. 24A). |
| RM1 (Fig. 25A) | Releases CPS at end of multiplying cycle in preparation for the product printing cycle. |
| RM2 (Figs. 20 and 5B) | Release solenoid 371. Initiates the product printing cycle. |
| RSM (Figs. 4B and 15) | Rack stop magnets 369. |
| ST1 (Fig. 25D) | Start relay for MT chain. |
| ST2 (Fig. 25A) | Auxiliary to ST1. Prevents premature start. |
| 1.T (Fig. 22B) | Transfer relay. (Group 1.) |
| 7.T (Fig. 24B) | Transfer relay. (Group 7.) |
| 8.T (Fig. 28) | Transfer relay (discard transfer). |
| TM (1 to 5) Figs. 25A to D<br>TM (6 to 12) Figs. 26A to D | Pairing relays for pairing multiplier and multiplicand digits. |
| 1.TS (0 to 9) Figs. 22B to D | Transfer switch relays for routing the transfer and no-transfer circuits, as required. |
| 7.U (Fig. 24A) | Release relay for product register 7. |
| UC (Fig. 29) | Relay for energizing 7.U as determined by discarding impluse. |
| 7.V1 (Fig. 24B) | Odd actuating relay for product register 7. |
| 7.V2 (Fig. 24A) | Even actuating relay for product register 7. |
| VX (Fig. 29) | Relay for reversing the impulses to 7.V1 and 7.V2, if an odd number of digits have been discarded. |
| 7.W (Fig. 24A) | Clearing and resetting relay for product register 7. |
| 7.X (Fig. 24A) | Provides holding circuits for the locking relays 7.L of product register 7. |

Conventions and standards

The Hofgaard patents referred to repeatedly herein have established certain conventions and standards which it is desired to adhere to in the present specification. In order to recall these conventions and standards to memory, a brief outline thereof will now be given.

One of the two terminals of the coil of every relay or magnet is permanently connected to the negative terminal of the source of electrical energy. For the sake of simplicity, this universal negative connection is omitted in all diagrams, since it can readily be understood that if a circuit be established from positive to the other terminal of the winding, the circuit will be completed through the winding to negative and consequently the relay or magnet will be energized.

For the purpose of simplifying the wiring diagram, the main positive wire from the source of electricity has been omitted and the various postiive connections are shown as if originating at the relay contacts. Thus the mark ++ (plus-plus) at a relay contact signifies that the contact in question is directly connected to the main positive supply. This connection is maintained throughout the operation of the machine. Where, however, a relay contact is marked + (plus) the contact is connected to the main supply source through the contacts of the control plus switch CPS (Fig. 27C). The control plus switch, which is normally open, is caused to close by the operation of the pin board switch PBS, as previously described, and connects the points marked + to the main supply source. After the product is computed and as product printing is initiated, the control plus switch is opened.

All relays are designated by letters with or without numeral combinations, for example, referring to Fig. 25A relays ST2, MA, etc.: Contacts within the relays are distinguished by numbers. Thus the combination ST2—5 would mean the contact marked 5 in relay ST2. For clearness, such combinations may be termed designation groups.

The main diagram is divided into sections, each comprising a number of relays. In each section the wires leading to and from the relay contacts to another section are shown terminating in arrow heads indicating the direction of the lead. Where a wire or cable terminates, one or more designation groups give the names of other relay contacts to which the wire or cable leads. For example, the wire leading from contact 9 in relay MA (Fig. 25A) is labeled, at the termination thereof, VX—3 (Fig. 28), thus signifying that contact 9 in relay MA is connected to contact 3 in relay VX. Similar designation groups at the termination of line 3 of the relay VX confirm this connection. By this means a mass of confusing lines on the wiring diagrams is avoided.

In the specification reference is continually made to the operation of relay contacts, some of which are adapted to make contact when the relay operates, and so complete a circuit, while others break contact and so interrupt a circuit when the relay is operated. The abbreviations "maker" and "breaker," respectively, have been used throughout to distinguish between the two types of contacts.

Figs. 10 to 14 inclusive illustrate the system of connections used in the wiring diagrams. For example, Fig. 13 illustrates wires in the diagram which cross but are not electrically connected, while Fig. 14 shows wires which meet and are electrically connected, the dot representing the electrical connection.

Fig. 10 shows a bundle of wires traversing the same route, and this bundle of wires may be represented as a cable (Fig. 12), in which the wires are numbered as they enter and leave the cable, a certain number always representing the same wire, whether at the cable termination or at intermediate points. Figs. 10 and 12 represent identical wiring.

All relays are shown in skeleton form, the electrical connections only being indicated. Fig. 11 shows a relay, the box or boundary line 1 representing the body of the relay, and the point 2 representing one terminal of the winding of said relay to which point the energizing line is led. The other terminal of the winding, as already explained, goes direct to negative and is not shown. At 3 is represented a spring contact armature, working in cooperation with a "maker," while 4 represents a similar spring contact armature co-operating with a "breaker." When the relay is energized, the spring contacts move outward from the center toward the outside of the relay; therefore at 3 a contact is made and at 4 a contact is broken, when the relay functions. The numeral 5 (Fig. 11) represents a spring armature working in conjunction with both "maker" and "breaker," and it is therefore evident that one circuit is broken and another is made when the relay functions. At 6 wires are shown leading from contacts, while 7 shows the wires leading into cables, with mutations of numbering.

The relays embodied in the present machine are substantially the same as those shown and described in the Hofgaard U. S. Patents Nos. 1,876,295, 1,876,296, and 2,262,235, and for this reason no detailed description is given of these relays herein, as reference may be head to the above patents and particularly to Patent No. 2,262,235 for a full disclosure thereof.

Entering of the multiplier and multiplicand in the multiplying unit

The following description of the electrical multiplying unit will necessitate partial repetition of the explanation of the mechanical portion of the machine. However, it is believed that this repetition may prove advantageous in various ways.

Referring to Fig. 2, first the multiplicand, which in this case may be the price, and the multiplier, which may be the quantity, are set up on the keys 46 and 47, after which the multiplication key 54 is depressed. Depression of the multiplication key conditions the keyboard switches for operation, actuates the non-add key, and depresses the motor bar 58, which sets the mechanical portion of the machine in operation. At the end of the rearward movement of the actuators 68 (Figs. 3, 4A and 4B) during which movement said actuators are positioned under control of the multiplicand and multiplier keys 46 and 47, the keyboard switch framework 250 receives its initial movement downwardly, as explained above, thereby transferring the multiplicand and multiplier amounts to the switch plugs 343, which are locked in set positions prior to return movement upwardly of the framework 250. Return movement upwardly of the framework 250 thrusts the insulated contacts 345 (Fig. 7), at the upper ends of the plugs 343 which have been set, between the contact blades of the switch members 346, 347 and 348, thus preparing the keyboard switches for transferring the multiplicand and multiplier to the multiplying attachment.

Shifting movement of the framework 250 downwardly and upwardly, as explained above, also renders the pin board or starting switch (PBS) 354 (Figs. 7, 8 and 18) effective to complete a circuit from ++ over PBS—1, (Fig. 18) RM1—3 (Fig. 25A) to breaker RM1—4. Here the circuit splits, one branch going to CPS—1 (Fig. 27A), the winding of the control plus switch CPS, another branch going over RC—3 (Fig. 29) breaker RC—4 to 7.W—1 (Fig. 24A), the winding of the clearing relay 7.W of the product accumulating register 7L, and a third branch going over ST2—3 (Fig. 25A), breaker ST2—4 also to 7.W—1. Magnets CPS and 7.W are, therefore, energized.

From this point the return movement forwardly of the actuators 68 and the completion of the first mechanical cycle proceed independently of the multiplication operation. The remainder of the factor entering cycle performs no special function in relation to the multiplying operation other than releasing all keys except the Multiplication key 54 (Figs. 2 and 4A) and opening the switch BSS (Figs. 4B and 19), the function of which will be explained later.

The operation of relay 7.W closes a circuit from ++ over 7.W—4 (Fig. 24A) to 7.LO—1 (Fig. 24D), the winding of the zero locking relay in the product register. The operation of 7W also moves all of the thrust bars in the product register, raising the hooks and releasing any contacts that were previously locked therein, to clear-out the product remaining from the preceding operation and thus leave the product register in a zeroized condition. The construction of the clearing relay 7W and the manner in which it operates the locking bars are fully disclosed in said Hofgaard Patent No. 2,262,235.

Energization and operation of the control plus switch (CPS) (Fig. 27A), connects the main plus supply to all parts marked + on the wiring diagram. The completion of the plus line causes energization of one relay in each of the four multiplication groups A.M, B.M, C.M and D.M (Figs. 26B, C and D and Figs. 27A to D inclusive), said energized multiplication relays corresponding to the numerical values of the digits of the multiplier. The circuit to the highest order or A group is from + (Fig. 9) over a closed keyboard contact, say, for example, 5 in bank A, then over KBS—A(5), that is, the fifth wire in the keyboard cable A, then over A.M10—3(5) or the fifth wire in cable A.M10—3 (Fig. 27B) to A.M5—1, the winding of the multiplication relay A.M5 (Fig. 27C). The circuits of the other three groups, B, C and D, are similar in every respect to group A.

The multiplication relays in each group are similar, so that a brief description of the relays of one group will suffice for all. The A group (Figs. 27B, 27C, and 27D) consists of ten relays A.M0 to 9, each relay of which has contacts for forming right-hand components of partial products and left-hand components of partial products by connecting input digit lines of the cables A.M0—4 and A.M0—5 to output lines in cable A.M0—10 and A.M0—11 according to right-hand and left-hand components of partial products, respectively.

For convenience in identifying the partial product significance of the cables which extend from the pairing relays, over the multiplication relays to the addition relays, these cables will, in addition to the reference numbers as A.M0—5, also be given the general reference numbers 10A for those used in obtaining the tens or left-hand component of the partial products formed in the A group of multiplication relays. The general reference number 1A will be applied to cables used in obtaining the units or right-hand component of the partial products formed in the A group. Similar designations as 10B, 1B, 10C, 1C, 10D, and 1D will also be given to left-hand and right-hand component cables associated with the B, C, and D groups of multiplication relays.

As an example of the manner in which the input and output lines are connected, attention is directed to Fig. 27C, in which the digit lines of cable A.M0—4, which is also generally indicated as cable 1A, are carried by the cable marked 6 in the relay A.M5 to the contacts thereof, the digit value of the lines being shown to the right of cable 6 in Fig. 27C. When the relay A.M5 is energized, the contacts close to connect the digit lines of cable to the digit lines of cable 8 according to the right-hand component of partial products of the value of the input digit lines in cable 1A, which are selectable according to various ones of the multiplicand digits, times the value of the multiplication relay, which is energized according to the multiplier digit related to that group. As an example, the 0, 2, 4, 6, and 8 input digit lines from cable 1A are connected by the relay A.M5 to the 0 digit line in cable 8, because the right-hand partial product component of each of these digits times 5 is 0. Similarly, the 1, 3, 5, 7, and 9 digit lines from cable 1A are connected by the relay A.M5 to the 5 digit line in cable 8, because the right-hand partial product component of any of these digits times 5 is equal to 5. Said cable 8 leads to output cable A.M0—10, which is also generally indicated as cable 1A. The input digit lines in cable A.M0—5, which is generally indicated as cable 10A, are used to form the left-hand partial product components by their selective connections to digit lines in cable 9 which lead to the output cable A.M0—11, which is also indicated generally as 10A. The values of the digit lines which are connected are shown adjacent the cable 6, 7, 8, and 9 in each multiplication relay. For further details of the construction and operation of these relays, reference may be had to the Hofgaard Patent No. 2,262,235, mentioned earlier herein, where they are fully disclosed.

The manner in which the input lines of the various groups are selected according to multiplicand digits as multiplication progresses will be explained later herein.

The cable 10A extends to the input lines of the first addition group. The cable 1A extends to the first addition group to control the energization of the adding relays 1.A0 to 9 therein. The adding relays of the second to sixth addition groups and the adding relays of the product register are controlled respectively by the cables 10B, 1B, 10C, 1C, 10D, and 1D. The various addition relays enable the necessary addition of the partial product components to form the digits of the final product.

The holding relay 7.X (Fig. 24A) for the 7.L locking relays of the product register is energized direct from + to 7.X—1 and the starting relay ST1 for the MT chain (Figs. 25A to D) is energized from + over breaker ST2—5 (Fig. 25A) over line 151 (Figs. 25A to 25D) to ST1—1. The relay ST2 is an auxiliary relay to the relay ST1 and prevents premature re-start of the timing chain.

The general holding relay MTN (Fig. 27A) has eight energizing lines in parallel, one from each of the addition groups 1 to 7 (Figs. 22, 23 and 24) and one from the discard transfer control group. One such circuit, which is typical of all, starts from plus, over breaker 1.C—3 (Fig. 22A), to 1.D—3, and over breaker 1.D—4 to MTN—1 (Fig. 27A), the winding of relay MTN. The other circuits which are similar, start in 2.C, 3.C, and so on, including 7.C (Figs. 23 and 24A). The circuit from the discard transfer group starts in 8.C (Fig. 28) and it is necessary for all these circuits to be broken at the same time for MTN to be released.

On the assumption that there are no digits to be discarded from the product, relay 7.U (Fig. 24A) will be energized from + (Fig. 16) over the zero contact in the decimal slide, hereinafter referred to by the letters DS, over DS—1(0) directly to 7.U—1 the winding of 7.U (Fig. 24A).

As explained earlier herein, the number of digits to be discarded from the product is determined by the position of the decimal slide 56 (Fig. 5A) which is manually set in accordance with the decimal point in the multiplier, prior to machine operation. It will be remembered that the multiplicand and the product each have two fixed decimal places. It is therefore obvious that the number of decimal places to be discarded from the result or product is the same as the number of decimal places in the multiplier. Consequently, if there are no decimal places in the multiplier, that is, no digits to be discarded, then, as explained above, the discarding impulse goes directly over DS—1(0) (Fig. 16) to energize 7.U. If there are digits to be discarded, as determined by the position of the decimal slide 56, the energization of 7.U is delayed, and consequently the product register is not affected by the accumulation of partial products until the first wanted digit appears in said product, as will be described more fully later.

The operation of relay 7.LO (Fig. 24D) brings all its locking contacts, as well as its free contacts, into the operated position. The operation of relay 7.LO energizes the reset control relay RC (Fig. 29) from ++ over 7.W—3 (Fig. 24A), over line 152 (Figs. 24A to 24D), to contact 7.LO—17 (Fig. 24D) and over maker 7.LO—18 to RC—1 (Fig. 29).

The operation of relay ST1 (Fig. 25D) energizes 1.GD, the control relay for the transfer relay of addition group 1, from + over ST1—22 to 1.GD—1 (Fig. 22A). ST1 likewise energizes the other GD relays over similar circuits from + over makers ST1—23, ST1—24, ST1—25, ST1—26, ST1—27, ST1—28, and ST1—29. ST1 also energizes the relay MT1, of the timing chain from + over maker ST1—10 to MT1—1 the winding of relay MT1. The operation of relay RC (Fig. 29) breaks at RC—3, one branch of the energizing line to relay 7.W (Fig. 24A); however, this relay remains energized through the circuit over ST2—4 previously traced.

The operation of relays 1GD to 8GD opens the energizing lines to their respective transfer relays 1.T to 8.T (Figs. 22, 23, 24 and 28); however, these transfer relays have not as yet been energized. Relay RC (Fig. 29) closes its holding circuit from plus direct.

Transfer control relay 1.GD closes its holding circuit from + over breaker 1.D—5, and maker 1.GD—2 to 1.GD—1. The other GD relays for the 2 to 6 addition groups inclusive, close similar holding circuits. The transfer control relay 7.GD, for the seventh addition group, closes its holding circuit from + over contacts 9.D—3 (Fig. 29), 9.D—4, to contact 7.D—10 (Fig. 24A) over breaker 7.D—5 to 7.GD—2 to 7.GD—1. The discard transfer control relay 8.GD (Fig. 28) closes a holding circuit similar to that for 1.GD, explained above. It should be noted that the transfer control relays as 1.GD, which are first energized from contacts in ST1, are maintained energized from their related D relays after the relay ST1 has broken this energizing line and will remain energized until the D relay is energized to indicate a transfer.

The relay MT1 closes one holding circuit from + over breaker MT2—6, maker MT1—5, and maker MT1—2 to MT1—1. The relay MT1 completes a circuit from + over RC—5 (Fig. 29), MT1—11, Fig. 25D, MT1—12 over line 281 (Figs. 25D to 25A) to S2—1, the winding of relay ST2 (Fig. 25A). Relay MT1 also completes a circuit from + over MT1—15, MT2—16, MT2—17, MT1—25(1), TM1—5(1) to TM1—1, the winding of the first pairing relay TM1 (Fig. 25D).

Relay ST2 breaks the energizing line to relay ST1, which is released, and ST2 also breaks the remaining line to relay 7.W, which is likewise released. Relays ST2 and RC remain energized until the multiplying operation is complete, and prevent reenergization of relay 7.W during a multiplying operation. The release of ST1 breaks the energizing line to MT1 and to the transfer control relays 1.GD to 8.GD, but all these relays continue to be held by their holding circuits.

The release of relay 7.W lowers the locking hooks for register 7 thus locking zeros under all the bars of the product register, and the release of 7W likewise breaks at 7.W—4, the energizing line to relay 7.LO, which is released. However, the locking contacts in this relay remain locked in closed position.

The release of relay ST1 (Fig. 25D) reestablishes, at ST1—3 and ST1—4, the line to contact MTN—11 in relay MTN. Relay ST2 closes its holding circuit from + direct. The relay ST2 (Fig. 25A) completes a circuit from + over maker ST2—8, to contact 1.GD—3 (Fig. 22A) and over 1.GD—4, 1.GC—3, 1.GC—4, 1.C—4, 1.C—5 to 1.NT—1, the winding of 1.NT the non-transfer relay for the first addition group. ST2 completes similar energizing lines to the non-transfer relays 2.NT to 8.NT inclusive. The release of ST1 completes the energizing line to the timing chain control relay MA (Fig. 25A) from + over MT1—18 (Fig. 25D), ST1—19, ST1—21, and line 282 (Figs. 25D to A) to MA—1. The first pairing relay TM1 (Fig. 25D), closes its holding circuit which starts at MT1—1 (Fig. 25D), and extends over wire MT1—26(1), wire TM1—6(1), and contact TM1—2 to TM1—1.

Relay TM1 also closes circuits to pair the units digit of the multiplicand with the units digit of the multiplier to obtain the right-hand component of the partial product and also sets up the necessary zero controls, as will now be explained.

By referring to Fig. 9 it will be seen that the keyboard switches have two sets of cables for transferring each denominational order of the multiplicand to the multiplying unit, namely, cables 1a to 8a and cables 1b to 8b. These two sets of cables are necessary to avoid feed-back circuits, as explained in the Hofgaard Patent No. 2,262,235, referred to hereinbefore. The two sets of contacts 347 and 348 correspond in effect to the sections 1A and 1B of the first factor primary register described in this patent.

The keyboard switch contacts 345, which are rendered effective according to the digits of the multiplicand, connect the corresponding contacts 347 and 348 to + and, accordingly, connect corresponding digit lines in the cables KBS—1a to KBS—8a and KBS—1b to KBS—8b, to +. The cables KBS—1a to KBS—8a and KBS—1b to KBS—8b extend to the pairing relays, where they are variously paired with the cables 10A, 1A to 10D and 1D in the different stages of the multiplication.

Figure 25B:
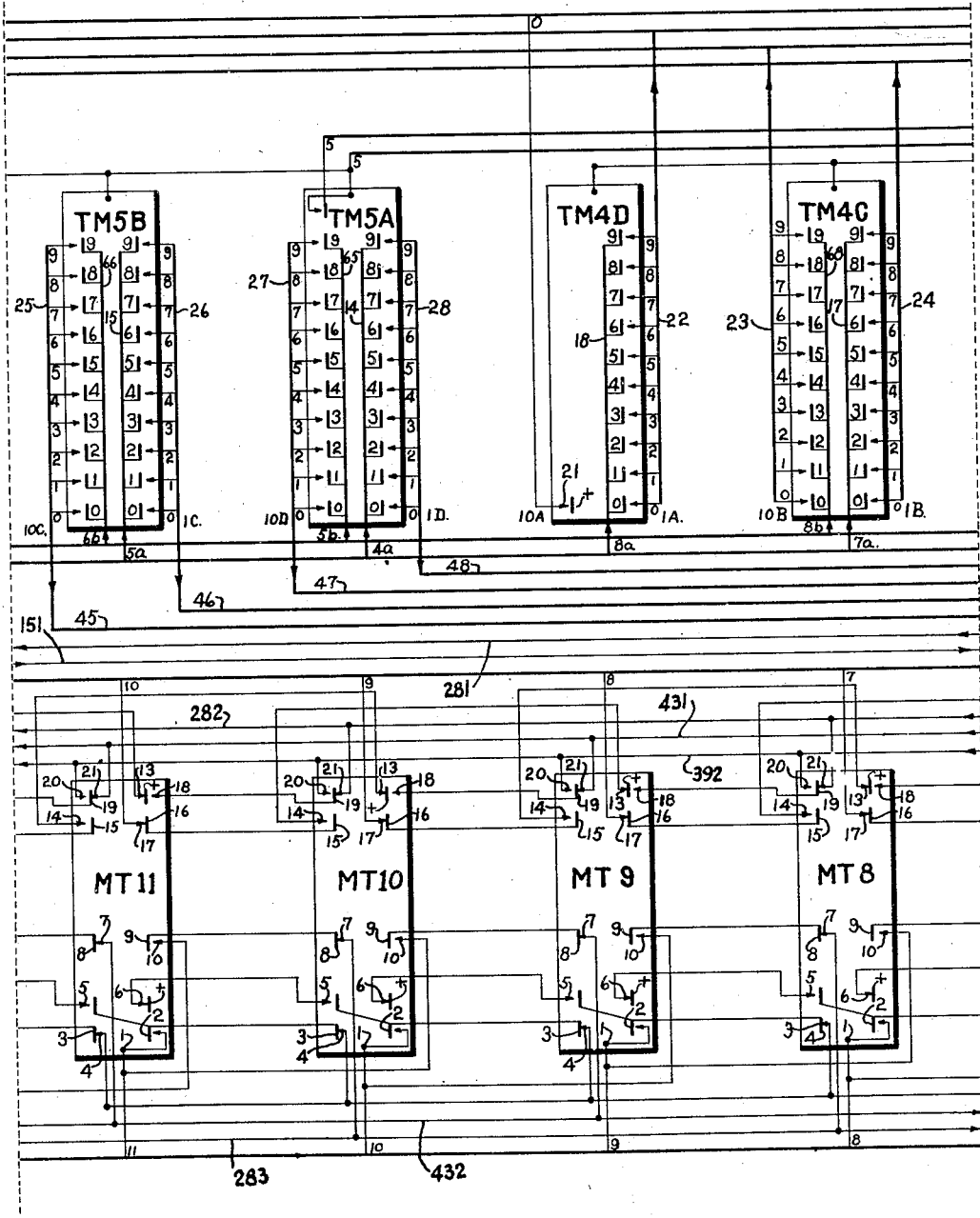
Figure 25C:
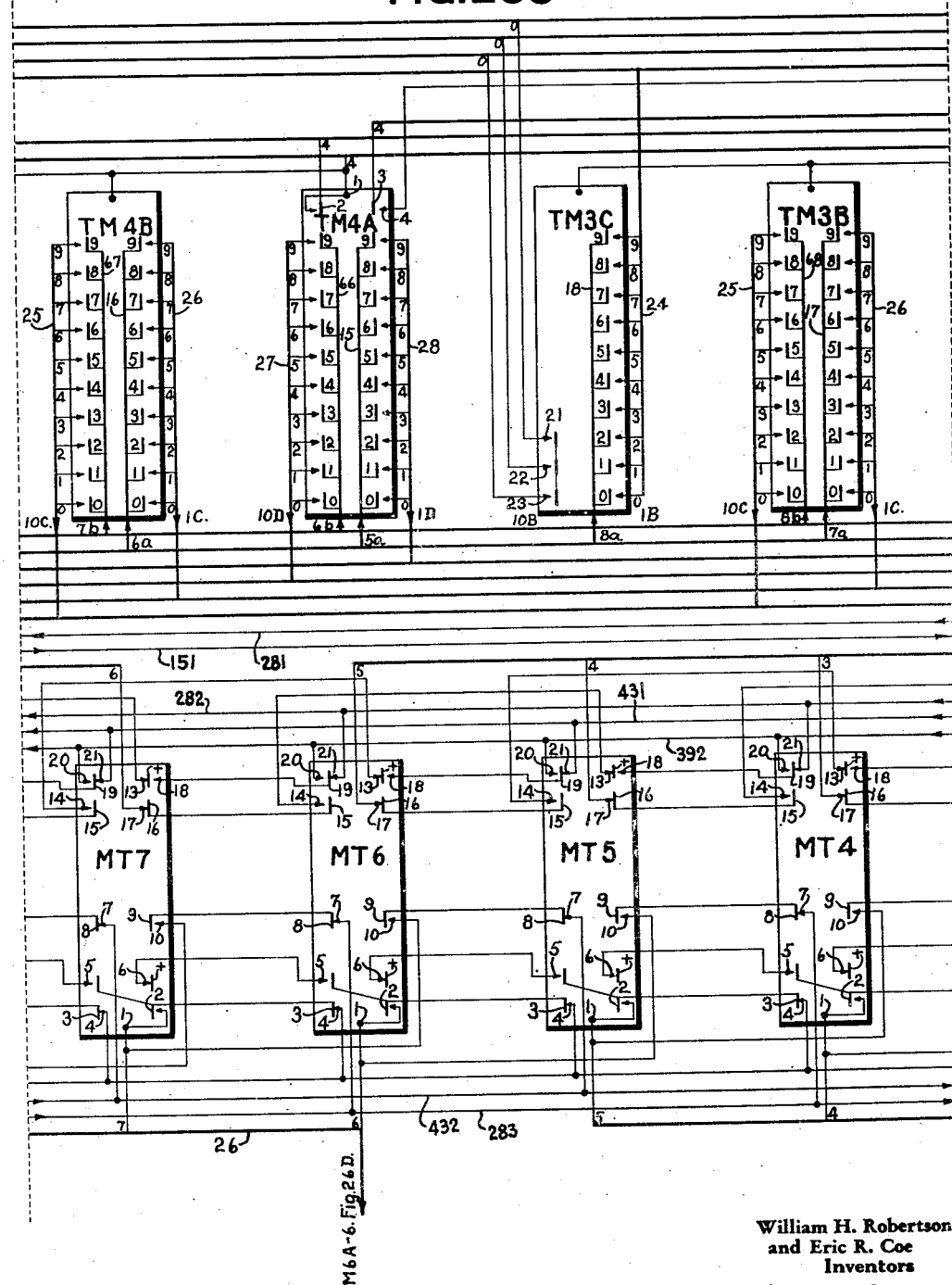
Figure 26A:
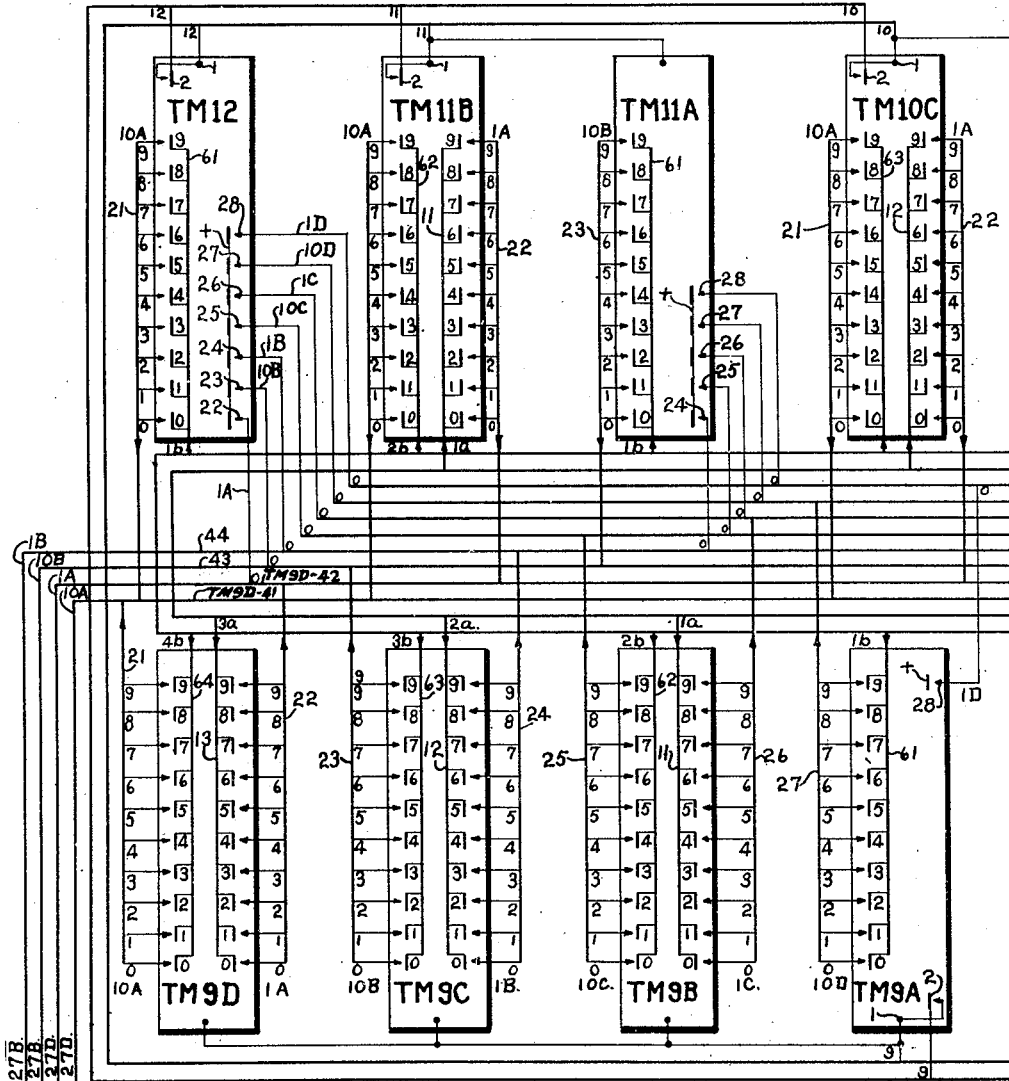
Figure 26B:
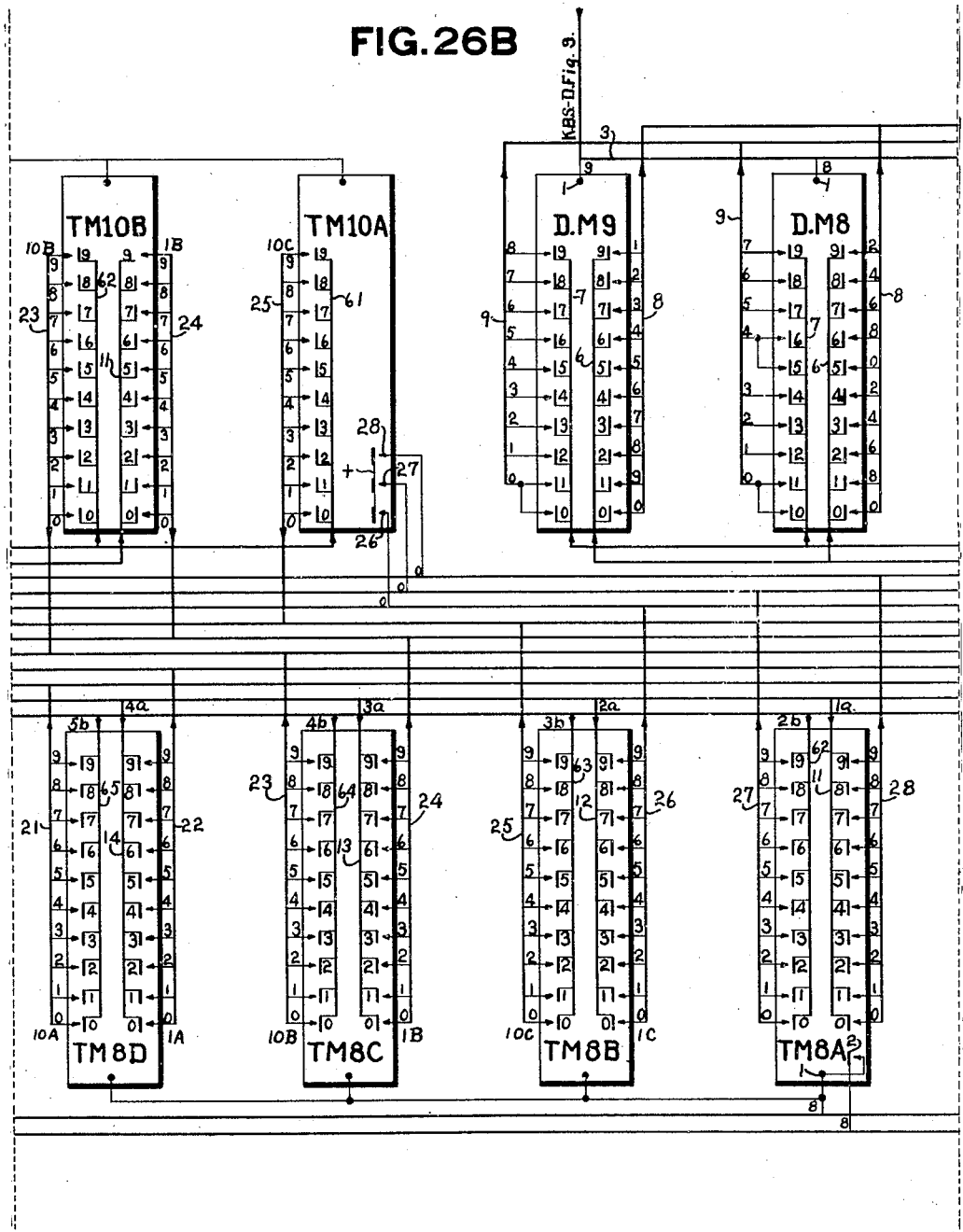
Figure 26C:
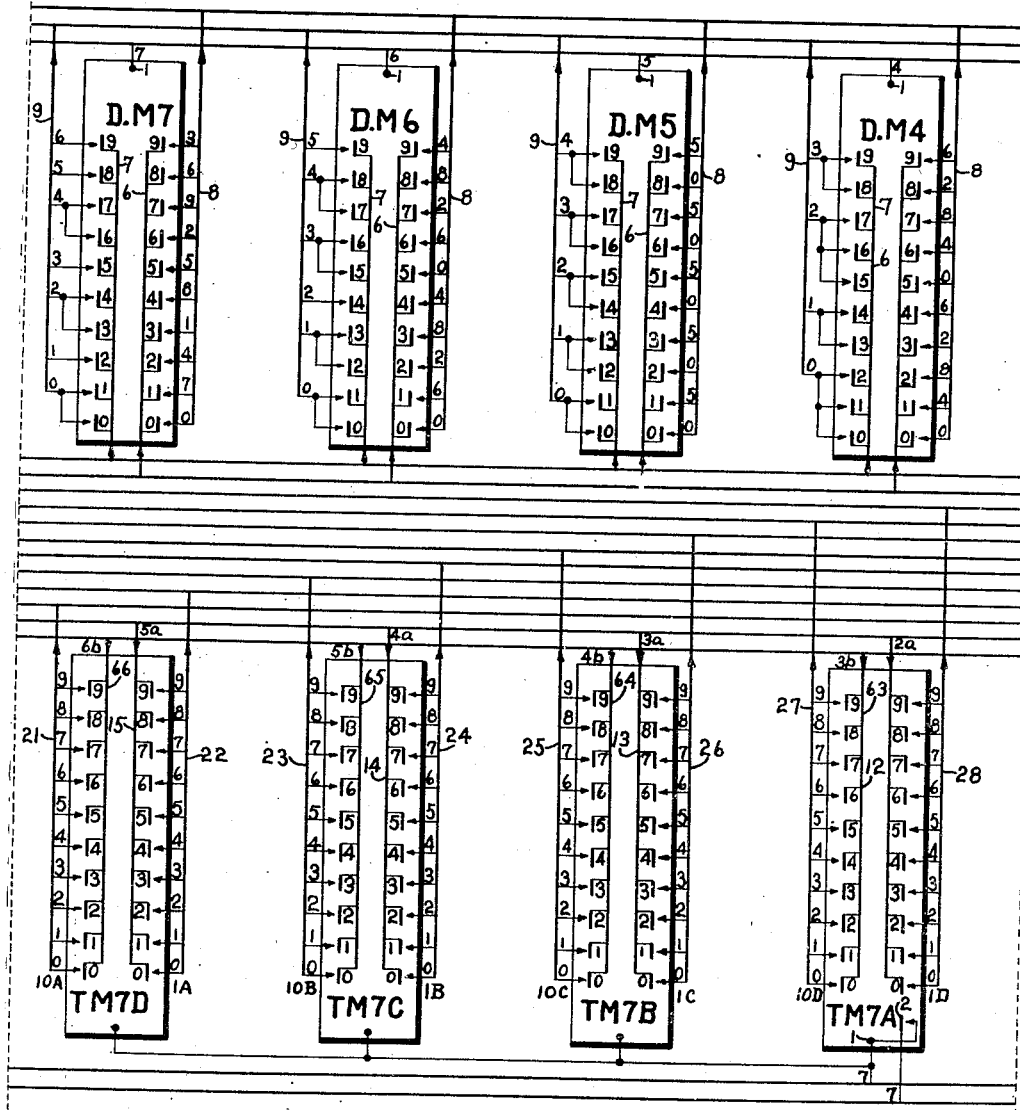
Figure 26D:
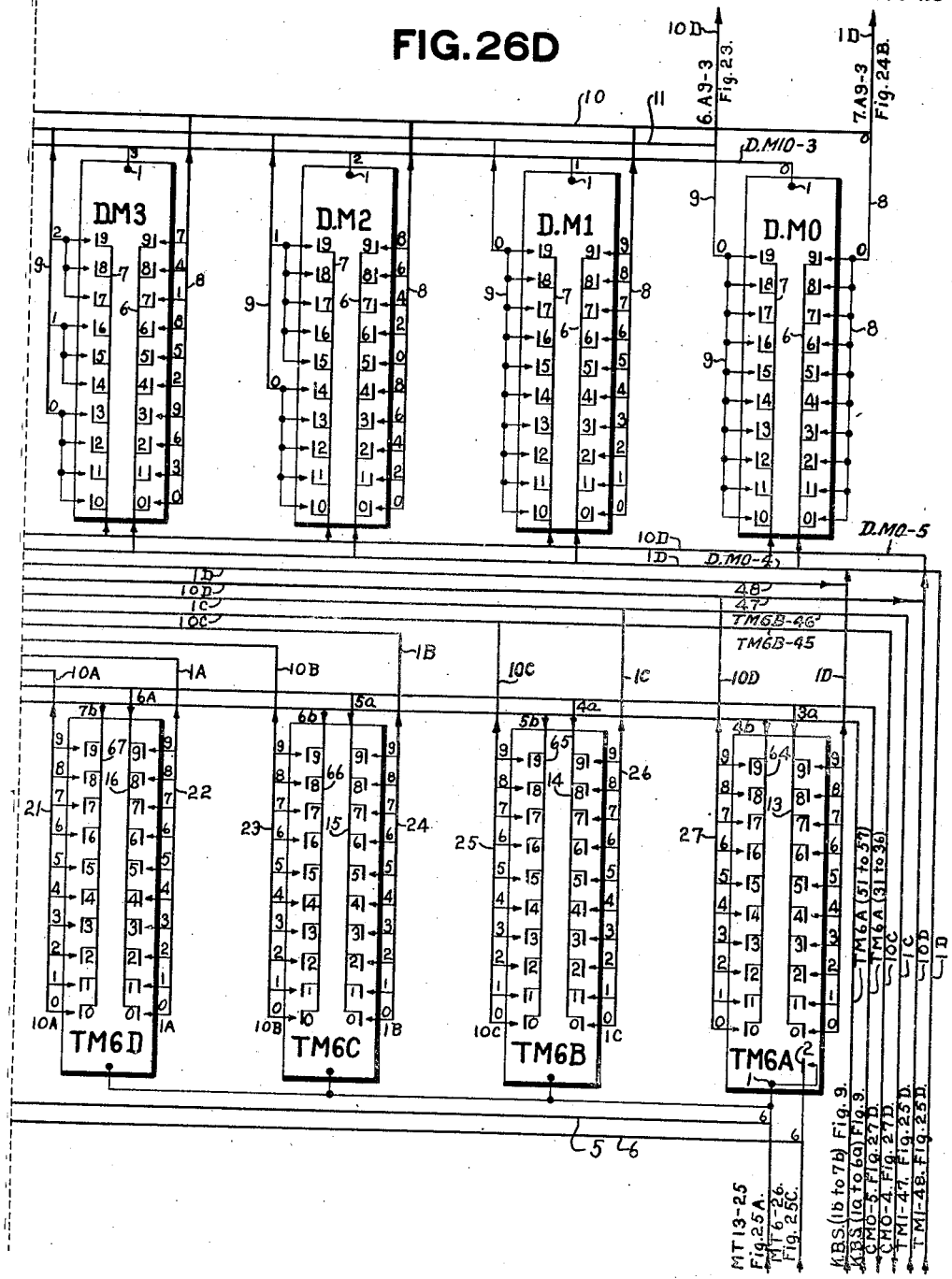

Thus, in the first stage of the multiplication, the first pairing relay TM1 sets up zero controls on cables 10A, 1A, 10B, 1B, 10C, 1C, and 10D, from + over contacts TM1—21, TM1—22, TM1—23, TM1—24, TM1—25, TM1—26, and TM1—27, respectively. For pairing the units digits of the multiplicand and multiplier, relay TM1 completes the energizing lines to the proper addition relay in the 7th group (Figs. 24A to D) over the selected contact in the lowest or cents bank in the switchboard (see also Fig. 9). For example, the circuit extends from +, over contact 5 over wires KBS—8a(5), TM1—38(5), Fig. 25D), TM1—18(5), TM1—28(5), TM1—48(5) to wire D.M0—4(5) (Fig. 26D). The course of the digit just entered will then be determined by the digit locked in the lowest order or D position (Fig. 9) in the multiplier portion of the switchboard. If, for example, this figure is 5, the relay D.M5 (Fig. 26C), will have previously been energized, as described above. The circuit continues over wires D.M5—6(5), D.M5—8(5), D.M0—10(5), 7.A9—3(5) (Fig. 24B) to 7.A5—1 (Fig. 24C), the winding of relay 7.A5. It is therefore evident that the proper relay in each of the addition groups has been energized.

At this point, if one digit is to be discarded from the product, as determined by the position of the decimal slide 56 (DS Fig. 16) relay TM1 closes the discarding circuit at this time. From comparison of the circuit with that described above, it will be seen that the circuit comes over DS—1(1) instead of DS—1(0) and said circuit continues over TM1—3, TM1—4 (Fig. 25D) to O—1 the winding of the odds discarding relay O (Fig. 29). The significance of the above statement will be more apparent later.

The general holding relay MTN (Fig. 27A) completes the second holding circuit to MT1 (Fig. 25D), from + over MTN—11, ST1—4 (Fig. 25D), ST1—3, MT1—2 to MT1—1. Relay 1.NT (Fig. 22B) completes its holding circuit from + over MTN—3, 1.NT—2, to 1.NT—1. The other non-transfer relays, 2.NT to 8.NT inclusive, complete similar holding circuits to that of 1.NT. Relay 1.NT also completes the energizing line to 1.GC from + over 1.NT—3, 1.C—6, 1.C—7 to 1.GC—1. Relays 2.NT to 8.NT inclusive also close similar energizing lines to relays 2.GC to 8.GC inclusive.

Relay 7.A5 (Fig. 24C) completes a circuit from + over contact 7.A5—14 and line 7.A9—14, to MB—6 (Fig. 25A), breaker MB—7 to maker MA—8. Here the circuit splits, one branch going over MA—10, line 283 (Figs. 25A to 25D), ST1—7, ST1—8, MT1—9, MT1—10 to MT2—1, the winding of the relay MT2, which is the second relay of the timing chain (Fig. 25D). The other branch is the energizing line for relay 7.V1 (Fig. 24B) and continues over MA—9 (Fig. 25A), VX—3 (Fig. 28), breaker VX—6, 7.U—3, (Fig. 24A), 7.U—5, to 7V1—1, the winding of the actuating relay 7.V1 for the odd numbered thrust bars.

It is to be noted here, that if there were digits to be discarded from the product, the discarding impulse would not have been sent over DS—1(0) and relay 7.U would not have been energized at this time. Consequently the circuit to relay 7.V1 would not have been completed and the non-operation of 7.V1 would therefore prevent storage of the incoming digit in the locking relays of the product register, and as a result the digit would be discarded.

The energized addition relays in each group together complete a circuit from + over TM1—21 (Fig. 25D), wires TM1—41(0) (Figs. 25D to 25A), TD5D—21(0), A.M0—5(0) (Fig. 27D), A.M5—7(0), A.M5—9(0), A.M0—11(0), 1.NT—4(0), 1.NT—5(0), 1A9—6(0), 1.A0—4(0), 1.A0—5(0), to 1.A0—7(0). Here the circuit splits, one branch going over 1.TS0—10(0), (Fig. 22D), to 1.TS0—1, the winding of relay 1TS0 in the transfer switch group, and the other branch going over 2.NT—4(0) Fig. 23). 2.NT—5(0), 2.A9—6(0), 2.A0—4(0), 2.A0—5(0) to 2A0—7(0). Here again the circuit splits, one branch going to energize 2.TS0, and the other branch continuing over 3.NT—4(0).

The circuits proceed thus, energizing 3.TS0, 4.TS0, 5.TS0, and 6.TS0, the transfer switch relays for the different addition groups. As before, from 6.A0 (Fig. 23) the circuit branches, the second branch going over 8.NT—4(0) (Fig. 28), 8.NT—5(0), 7.NT—4(0) (Fig. 24B), 7.NT—5(0), 7.A9—6(0), 7.A5—4(0), 7.A5—5(5) 7.A0—7(5), 7.L0—10(5), to 7.L5—1,, the winding of relay 7.L5. This is the incoming digit mentioned earlier herein, which is presently to be locked in the product register, but which would have been discarded had not the release relay for the product register 7.U (Fig. 24A) been energized.

At this point the odds relay O (Fig. 29) if operated, would complete a circuit from + over O—3 to UC—1, the winding of relay UC, the energizing relay for 7.U, and would also complete a circuit from + over O—7 to VX—1, the winding of relay VX, the reversing relay for 7.V1 and 7.V2.

Figure 27A:
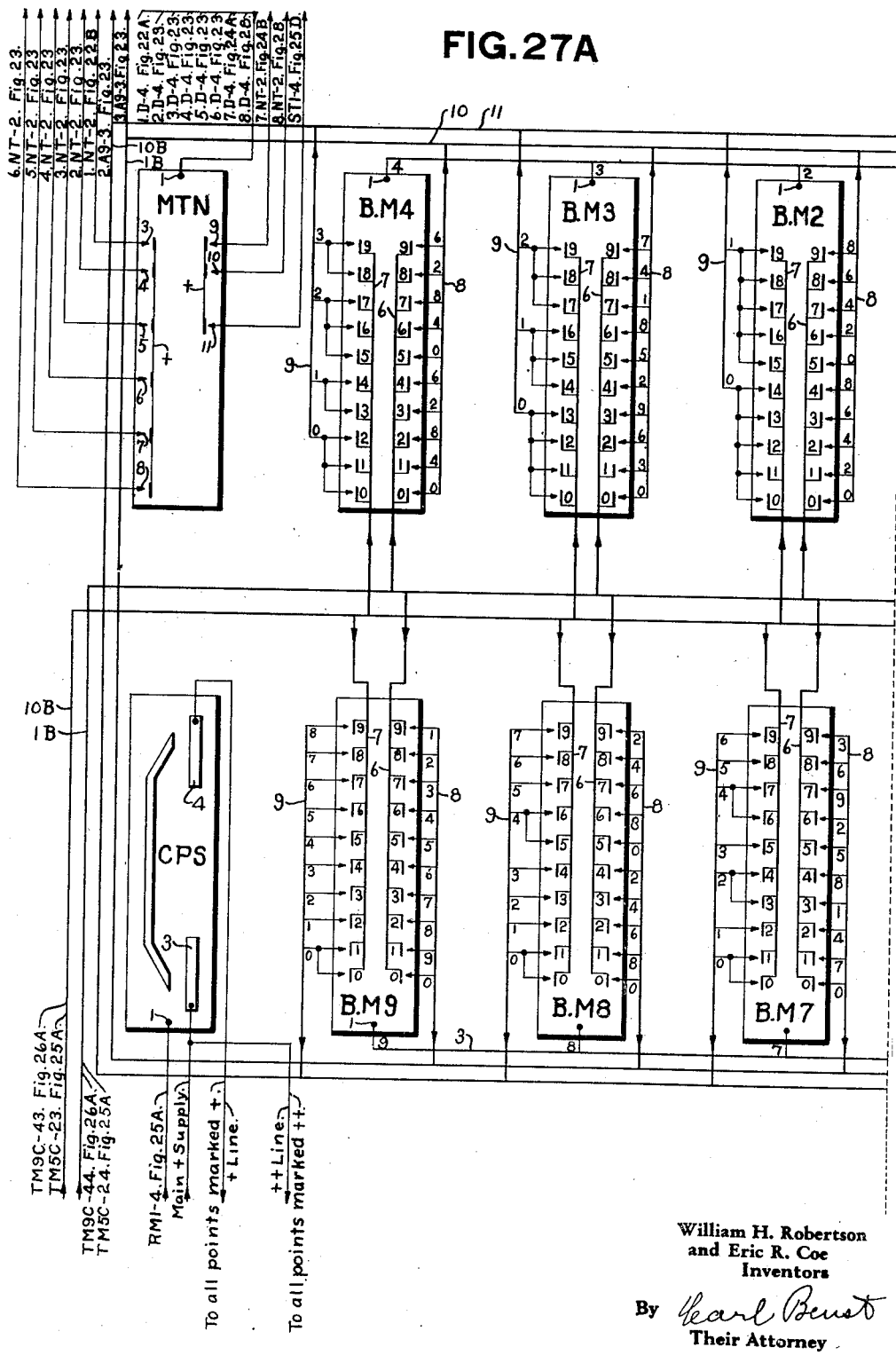
Figure 27C:
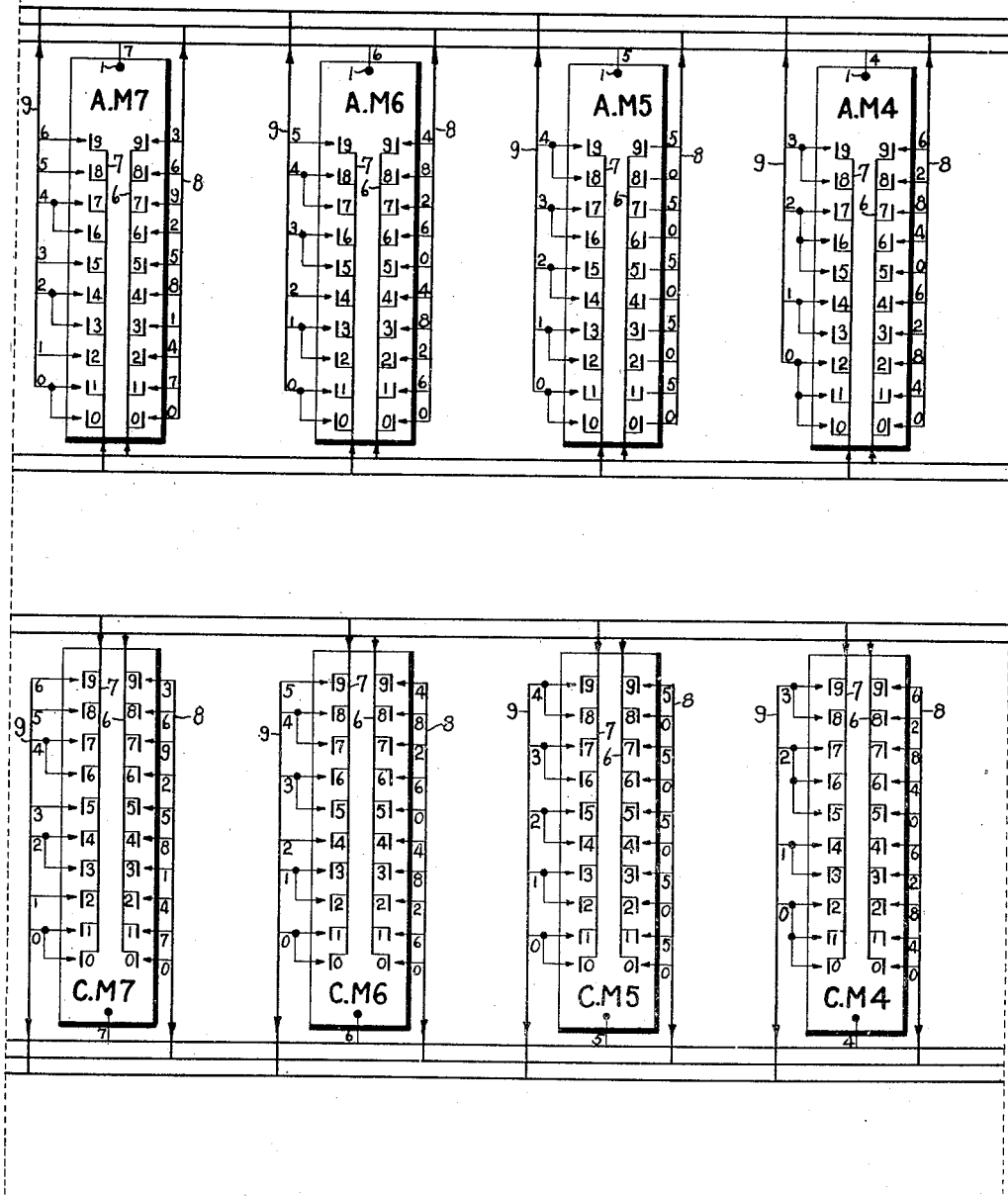
Figure 27D:
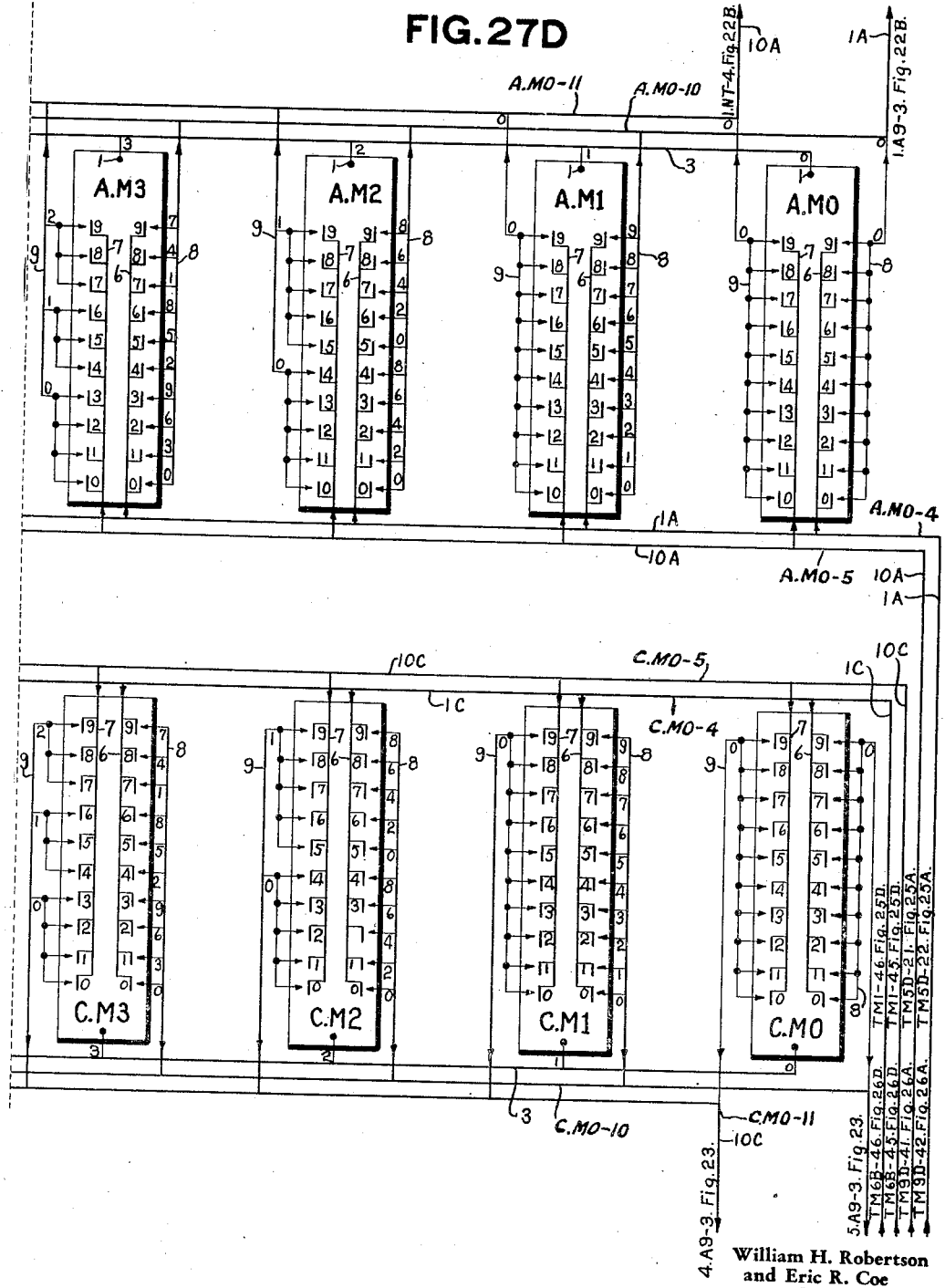

The operation of the non-transfer control relays 1.GC to 8.GC break at contacts 3, 4 the energizing lines to 1.NT to 8.NT, but the latter are still held by the general holding relay MTN (Fig. 27A).

Referring to Fig. 25D, MT2 breaks one holding circuit to MT1, (over MT2—6) but MT1 is still held by the general holding relay MTN (over ST1—3). MT2 breaks the energizing line to TM1 at MT2—16, MT2—17, but TM1 is still held by the circuit extending to MT1—1. The relay 7V1 (Fig. 24B) moves the first thrust bar preparing a holding circuit for the product register relay 7.L5 from the contact 7.X—3 controlled by this bar.

The non-transfer control relay 1GC (Fig. 22A) closes its holding circuit from + over 1.C—8, 1.GC—2 to 1.GC—1. The other non-transfer control relays 2.GC to 8.GC inclusive, close similar holding circuits to that of the 1.GC relay.

The transfer switch relay 1.TS0 (Fig. 22D) completes a circuit from + over MT2—1. (Fig. 25D), MT1—19, MT1—20, line 392 (Figs. 25D to 25A), MA—3 (Fig. 25A), MA—5, MB—4, MB—5, line 1.TS20—3 (Figs. 22B to 22D), 1.TS0—3, 1.TS0—4, wires 1.A0—8(0), 1.A0—9(0), 1.A0—11, wires 1.A0—12(0), 1.NT—6(0), 1.NT—7(0), wire in non-transfer cable NT, 1.TS9—12(0) (Figs. 22B to 22D), 1.TS0—8, (Fig. 22D), 1.TS0—9 and wire 393 (Figs. 22D to 22A) to 1.C—1, the winding of the non-transfer indicating relay 1.C. The transfer switch relays 2.TS0 to 6—TS0 (Fig. 22A) complete similar circuits, energizing their respective non-transfer indicating relays 2.C to 6.C. The energized relay 7.L5 of the product register (Fig. 24D) completes a similar circuit to 7.C and also completes a circuit from + over MT2—18, as traced above to MB—5, over 7.L20—3, thence over 7.L5—3, 7.L5—5, over 7.L13—5 to 8.C—1 (Fig. 28) to energize the non-transfer indication relay 8.C of the discarding group.

The relay 7.L5 closes its holding circuit from + over 7X—3 (Fig. 24A), the first contact in the holding relay 7.X for the product register, thence over line 291 (Figs. 24A to 24C), contact 7.L5—2 to 7.L5—1. Further movement of the first thrust bar, under the influence of the odds actuating relay 7.V1 (Fig. 24B), raises the hooks allowing the first place locking contact in relay 7.L5 to move into the operated position.

The timing chain relay MT2 (Fig. 25D) closes its holding circuit from + over MT3—6, MT2—5, and MT2—2.

Assuming that the relays VX and UC (Fig. 29) have been energized, said relays close their holding circuits from + direct. The relay UC completes a circuit from + over UC—3 to 7.U—1, energizing the product register release relay 7U. The relay VX, if energized, cross-connects the energizing line to 7V1 and 7.V2. From the above it is obvious that no matter how many digits are to be discarded, the lowest digit stored must be stored under the first thrust bar, and therefore the relay 7.V1 must receive the first actuating impulse. When no dgits or an even number of digits, are to be discarded, the impulse comes over the timing chain control relay MA in the normal manner to the winding of the relay 7.V1. When an odd number of digits is to be discarded, the first impulse comes through when the timing chain control relay MB (Fig. 25A) is energized, and therefore, said impulse will normally be routed to the winding of relay 7.V2. To remedy this condition the reversing relay VX (Fig. 29) is energized whenever an odd number of digits is to be discarded, and upon operation causes the leads to the windings of the actuating relays 7.V1 and 7.V2, to be crossed.

The operation of the non-transfer indication or C relays breaks, at contacts 3 (1.C—3, Fig. 22A, for example), all of the energizing lines to the general holding relay MTN, which is released. Each C relay also breaks, at contacts 7 and 8 (1.C—7 and 1.C—8, for example), both the energizing and holding circuits to its respective non-transfer controlling or GC relay, and consequently the 1.GC to 8.GC relays are released. The release of the general holding relay MTN breaks the remaining holding circuit to timing relay MT1, pairing relay TM1, and the non-transfer relays 1.NT to 8NT, and as a result all these relays are released.

The timing relay MT1 breaks, at MT1—18, the energizing circuit to relay MA, which is released. MT1 also breaks, at MT1—20, the energizing circuit to non-transfer indicating relays 1.C to 8C, all of which are released. The release of MT1 also breaks, at MT1—10, the energizing circuit to relay MT2, but MT2 is held by relay MT3 from contact MT3—6 therein. The release of the pairing relay TM1 breaks the energizing circuit to relays 1.A to 7.A, 1.TS, to 6.TS, and 7.L5. This reeleases 1.A to 7.A and 1.TS to 6.TS but 7.L5 is held by the holding circuit over 7.X3. The release of the pairing relay TM1 breaks the energizing circuit to the odds relay O, in case the latter has been energized, and said relay is thus released.

The release of the control relay MA breaks, at MA—9, the energizing circuit over VX—3, VX—5 to 7.V1, which is released. The release of relays 1.GC to 8.GC and 1.C to 8.C restores the energizing circuit to non-transfer relays 1.NT to 8.NT. The non-transfer indication relays 1.C to 8.C (Figs. 22A and 23) restore, at contacts 3, the energizing circuits to the general holding relay MTN.

The release of the timing chain relay MT1 (Fig. 25D) completes a circuit from + over MT1—13, MT2—14, MT2—15, MT3—16, MT3—17, wire MT1—25(2), TM1—5(2) to TM2—1, the winding of the pairing relay TM2.

Due to the limited number of contacts that can be assembled in each relay, the pairing relay TM2 consists of two relays TM2A and TM2B. Other TM relays are likewise subdivided. However, each of these groups of relays operates as one relay and is so referred to in the specification.

The released timing chain relay MT1 (Fig. 25D) completes a circuit from + over MT2—18, MT1—19, MT1—21, line 431 (Figs. 25D to 25A) to MB—1, the winding of the timing chain control relay MB. The release of relay 7V1 (Fig. 24B) allows the first thrust bar to commence its return stroke to lock the operated contact in the first denominational order under the first hook in relay 7.L5 (Fig. 24C) of the product register. Continued movement of the first thrust bar releases 7.L5 by breaking the holding circuit in 7.X (Fig. 25A). However, the contact in 7.L5 has been locked in closed position.

Relay MTN completes the holding circuit to MT2 from + over MTN—11 (Fig. 27A), MT1—4, MT1—3, MT2—2 to MT2—1. The non-transfer relays 1.NT to 8.NT inclusive complete their holding circuits from MTN—3 in the manner previously explained, and these non-transfer relays likewise complete the energizing circuits from contacts 3 therein to relays 1.GC to 8.GC in the manner described above.

The pairing relay TM2 (Fig. 25D) completes its holding circuit from MT2—1 over wires MT1—26(2), TM1—6(2), to contact TM2—2 and thence to TM2—1. Relay TM2 completes zero control circuits from + over TM2—22 to TM2—25 inclusive, over cables 1A, 10B, 1B, and 10C to the windings of the addition relays 1.A0 to 4.A0 inclusive, respectively in the manner previously described herein. TM2 also completes circuits to the addition relays in the 5th, 6th and 7th addition groups, starting from + over the switchboard contacts (Figs. 9 and 25D) over cables KBS—8 and KBS—7 respectively, as described above in connection with the relay TM1 to accomplish the pairing of the cable from KBS—8a with 1C, KBS—8b with 10D, and KBS—7a with 1D.

According to the problem shown set up in Fig. 9 and worked out fully earlier herein to show the various partial product components, the pairing of KBS—8a with 1C will produce the right-hand component of the partial product of 5 × 3, or 5, and will cause the relay 5.A5 of the fifth addition group to be energized. The pairing of KBS—8b with 10D will produce the left-hand component of the partial product of 5 × 5, or 2, and will cause the relay 6.A2 of the sixth addition group to be energized. The pairing of KBS—7a with 1D will produce the right-hand component of 5 × 5, or 5, and will cause the relay 7.A5 of the product register to be energized.

If two digits are to be discarded, as indicated by the position of decimal slide 56 (Figs. 5A and 16) TM2 here completes a circuit from + over DS—1(2), (Fig. 16), TM1—7(2) (Fig. 25D), contacts TM2A—3, TM2A—4 to E—1 (Fig. 29) the winding of the evens relay E. The non-transfer control relays 1.GC to 8.GC break, at contacts 3 and 4, the energizing lines to relays 1.NT to 8.NT (Figs. 22A and 22D), for example, but the latter relays continue to be held by the general holding relay MTN (Fig. 27A). Relays 1.GC to 8.GC close their holding circuits from contacts in related relays 1.C to 8.C.

The operation of the addition relays completes a circuit similar to the one traced above from + over TM1—21. The instant circuit is from + over TM2B—21 over contacts in the addition relays, energizing a transfer switch or TS relay in each group, and finally energizing a locking relay 7.L2 in the product register. This energized locking relay bears a number equal to the units of the sum of the components simultaneously added during the second stage. Since the components are 5, 2, and 5, their sum is 12, and a carry will be prepared in the 7 or product register. The addition relay 7.A5 (Fig. 24C) completes a circuit from + over 7.A5—14, wire 7.A9—14, MA—6 (Fig. 25A), MA—7, MB—8. Here the circuit splits, one branch going over MB—9, VX—4 (Fig. 29) 7U—4 (Fig. 24A), 7U—6, to 7.V2—1 to energize the evens actuating relay 7.V2. The other branch of the circuit goes over MB—10, wire 432 (Figs. 25A to 25D), contacts MT1—7, MT1—8, MT2—9, MT2—10 to MT3—1 (Fig. 25D), the winding of the timing chain relay MT3.

If the even discarding relay E (Fig. 29) has been energized, it will complete a circuit from + over E—3 to UC—1, the winding of relay UC. No circuit is completed, however, to energize the reversing relay VX, as the discarded number is even and the first impulse will be correctly sent to 7.VI.

The energization of the timing chain relay MT3 breaks, at MT3—6, one holding circuit to MT2, but MT2 continues to be held by the general holding relay MTN from MTN—II. MT3 also breaks the energizing line to the pairing relay TM2, nevertheless TM2 remains energized from MT2—I. Relay 7.V2 moves the second thrust bar, thereby preparing a holding circuit from 7.X for the locking relay 7.L2 which has been energized.

Relay MT3 closes its holding circuit over contact MT4—6 (Fig. 25C) and MT3 also completes energizing circuits to the various non-transfer indicating or C relays, and transfer indicating relay 7.D over their respective TS and L relays. The selected locking relay 7.L2 (Fig. 24) closes its holding circuit over the second place contact in 7.X (Fig. 24A). Relay 7.V2 raises the hooks on the second thrust bar. The control relay UC (Fig. 29) for relay 7.U, if energized, completes the energizing circuit to 7.U and the product register 7L is actuated so that a digit may be entered therein.

In the summation of partial products in this stage of the multiplication, a tens transfer is prepared in the seventh or product register by the energization of the transfer indicating relay 7.D.

Since this is the first place in the problem where a transfer has been required, it is believed that an explanation of the transfer mechanism in general at this point would make the explanation of the problem more clear. It will be assumed that transfers are required in all the addition groups. The timing chain relay MT3 sends out the usual impulse, but this impulse is rerouted to the transfer indication relays I.D to 8.D (Figs. 22, 23, and 28) instead of the non-transfer indication relays I.C to 8.C. The circuit for the first addition group goes from + over MT3—18 (Figs. 25C and 25D), MT2—19, MT2—20, line 392, MA—3 (Fig. 25A), MA—4, MB—3, MB—5, I.TS20—3, contacts 3 and 4 in the energized I.TS0 to 9 relay, wire in cable I.AO—8, one of the cables I.AO to 9—9, I.AO to 9—10 (Fig. 22), transfer cable I.TS—11, contacts 6, 7 in the energized I.TS0 to 9 relay to I.D—I, the winding of the transfer indication relay I.D.

The circuits energizing 2.D to 7.D are similar, but relay 8.D is energized only if the odds or evens relays O or E be energized at the same time. This is because 8.D is used for transferring amounts only when a digit greater than 4 is to be discarded. The circuit energizing 8.D starts from + over MT3—18 exactly as stated above, continuing with the other circuits as far as MB—5, thence over 7.L—3, 7.L—5 (that is, assuming the locking relay to be numbered greater than 4), then, if the evens relay E (Fig. 29) is energized, over E—4, E—5 to 8.D—I. If the odds relay O is energized instead of the evens relay, the circuit, instead of going as outlined above, goes over E—4, E—5, O—4, O—5, to 8.D—I. In all cases, if neither relay E nor O is energized, or if the number of the selected locking relay in register 7 is less than 5, the circuit is routed to 8.C—I, as may be seen from the diagram. Assuming, then, that the transfer indicating relays I.D to 8.D are energized, the energized relay 7.L closes its holding circuit, and 7.V2 raises the hooks on the second thrust bar. Relays I.D to 8.D break the energizing lines to the general holding relay MTN and the holding circuits to I.GD to 8.GD, resulting in the release of these relays.

It should be noted that the relay ST1 has been deenergized and the original energizing circuits for the transfer control relays I.GD to 7.GD have been broken at contacts ST1—22 to 28, but the respective control relays are held energized until this time from their transfer indicating relays as I.D to 7.D. Relay MTN breaks the holding circuits to MT2, TM2, and I.NT to 8.NT thus releasing these relays.

Relay MT2 releases relay MB and relays I.D to 8.D. Relay MT2 likewise breaks the energizing line to MT3, but MT3 remains energized by means of its holding circuit. The pairing relay TM2 (Figs. 25C and 25D) breaks the energizing line to the addition relays I.A to 7.A, the transfer switch relays I.TS to 6.TS, and the locking relays 7.L. The A and TS relays are released, but 7.L remains energized through its holding circuit. The timing chain control relay MB releases the evens actuating relay 7.V2 (Fig. 24B).

The transfer control relays I.GD to 8.GD (Figs. 22, 23, and 28) close energizing lines to the transfer relays I.T to 8.T from + over ST2—8 (Fig. 25A), I.GD—3, I.GD—5, I.GC—5, I.GC—6, I.D—7 to I.T—I, the winding of the No. 1 transfer relay I.T. The other transfer relays 2.T to 8.T are energized in a similar manner. The transfer indicating relays, I.D to 8.D, restore the energizing line to relay MTN. The timing chain relay MT2 energized the pairing relay TM3 and the control relay MA. The release of the evens actuating relay 7.V2 (Fig. 24B) allows the second thrust bar to return, locking the contact in second denominational place in the relay 7.L and then releasing the relay 7.L.

The general holding relay MTN completes the holding circuit to relay MT3, and transfer relays I.T to 8.T close their holding circuits and energize relays I.GD to 8.GD. The pairing relay TM3 closes its holding circuit and energizes the addition relays I.A to 7.A. The transfer control relays I.GD to 8.GD break the energizing lines to the transfer relays I.T to 8.T, but the latter remain energized through their holding circuits. Relays I.GD to 8.GD close their holding circuits. The addition relays I.A to 7.A energize the transfer switch relays I.TS to 6.TS and the product register relays 7.L4. Relay 7.A energizes the timing chain relay MT4 and the odds actuating relay 7.V1 (Figs. 24A and 25D).

Returning now to the circuits involved in the instant problem, the circuit over which transfer indicating relay 7.D is energized is as follows: From + over MT3—18 (Fig. 25D), MT2—19, MT2—20, line 392 (Figs. 25D to 25A), MA—3, MA—4, MB—3, MB—5, 7.L20—3 (Fig. 24B), contacts 7.L2—3 (Fig. 24D), 7.L2—4, wires 7.AO—7(2) (Fig. 24C), 7.A5—9(2), 7.A5—10(2) to wire in transfer cable T(2), contacts 7.L2—6, 7.L2—7, wire 433 (Figs. 24D to 24A) to transfer indicating relay 7.D.

The operation of the non-transfer indicating relay I.C to 6.C and 8.C and transfer indicating relay 7.D (Figs. 22, 23 and 28) breaks the energizing circuits to the general holding relay MTN and the energizing and holding circuits to the non-transfer control relays I.GC to 6.GC and 8.GC, and the holding circuit for the transfer control relay 7.GD, all of which are released. The release of MTN breaks the remaining holding circuit to the timing relay MT2, which is released. MTN also breaks the holding circuit to the pairing relay TM2 and to non-transfer relays I.NT to 8.NT, all of which are released. Relay MT2 breaks, at MT2—18, the energizing line to MB (Fig. 25) and to relays 1.C to 6.C and 8.C and 7.D, all of which are released. MT2 likewise breaks, at MT2—10, the energizing circuit to MT3 but MT3 continues to be held by relay MT4 from + over MT4—6, MT3—5, MT3—2. The pairing relay TM2 breaks the energizing lines to the selected relays in the groups 1.A to 7.A, 1.TS to 6.TS and 7.L2, and the A and TS relays are thus released, but 7.L2, the selective relay in this group, continues to be held from 7.X. TM2 breaks the energizing line to the evens relay E, (Fig. 29) which is released.

It is believed that a description of further operation of the discarding control relays E and O will be unnecessary, as any operation thereof follows in order, as already described.

The timing chain control relay MB (Fig. 25A) releases relay 7.V2 (Fig. 24A). Selectively the released non-transfer control relays 1.GC to 6.GC and 8.GC and the transfer control relay 7.GD close the energizing circuits from ST2—8 to 1.NT to 6.NT and 8.NT and to 7.T and the non-transfer and transfer indication relays 1.C to 6.C, 7.O and to 8C restore the energizing circuits to the general holding relay MTN. The circuits by which the non-transfer relays are energized from + over ST2—8 have been traced earlier herein. The circuit for energizing transfer relay 7.T extends from + over contacts ST2—8 (Fig. 25A), 7.GD—3 (Fig. 24A), 7.GD—5, 7.GC—6 (non-transfer control relay 7.GC, which was energized from 7.NT in the previous stage, has remained energized over holding circuit from 7.C—8, inasmuch as relay 7.C was not energized in that stage), contacts 7.D—6, 7.D—7 to 7.T—1. MT2 completes the energizing lines to TM3 and the timing chain control relay MA. The evens actuating relay 7.V2 allows the second thrust bar to begin its return stroke, thus locking the contact in the second order of the locking relay 7.L2. Continued movement of the thrust bar breaks the holding circuit to the relay 7.L2, which is released; however, as explained before, the digit remains locked in the locking contact.

The general holding relay MTN completes the holding circuit to MT3 (Fig. 25D), the non-transfer relays 1.NT to 6.NT and 8.NT close their holding circuits, and also energize relays 1.GC to 6.GC and 8.GC. Similarly, the transfer relay 7.T closes its holding circuit and also energizes relay 7.GD. The pairing relay TM3 for the third denominational order of the final product closes its holding circuit and performs its pairing function by completing the energizing circuits selectively to the addition relays 1.A to 7.A. The relays 1.GC to 6.GC, 7.GD, and 8.GC break the energizing lines to 1.NT to 6.NT, 7T, and 8.NT, but the latter relays continue to be held by relay MTN. Relays 1.GC to 6.GC, 7.GD, and 8.GC close their holding circuits.

Relays 1.A to 7.A complete the energizing lines to the various transfer switch relays 1.TS to 6.TS and to the locking relay 7.L9. The addition relay 7.AO completes the energizing lines to the timing chain relay MT4 of the fourth denominational order and to the odds actuating relay 7.V1. Relay MT4 breaks one holding circuit to MT3 but MT3 remains energized. MT4 also breaks the energizing circuit to TM3, but TM3 likewise remains energized. The relay 7.V1 moves the third thrust bar, preparing a holding circuit for the locking relay 7.L9.

Relay MT4 closes its holding circuit from + over MT5—6, MT4—5, and MT4—2. Relay MT4—2 sends out the usual impulse from + over MT4—18 (Figs. 25C and 25D), MT3—19 over contacts in the MA and MB relays and over the contacts in the 1.TS to 6.TS and 7.L9 to the non-transfer indication relays 1.C to 8.C. From the problem worked out above, it is seen that there are no tens transfers prepared during the summation of partial product components in the third denominational order of the product.

The non-transfer indicating relays 1.C to 8.C, when energized, break, at contacts 3 therein, the energizing lines to MTN, which is thereby released, and also break, at contacts 6 and 7, the energizing circuits and holding circuits for the non-transfer control relays 1.GC to 8.GC.

The release of holding relay MTN breaks, at MTN—1 (Fig. 27A), the remaining holding circuit to timing relay MT3 and pairing relay TM3 and, at contacts 3 to 9, the holding circuits for the non-transfer relays 1.NT to 6.NT and 8.NT and the transfer relay 7.T, all of which are released.

The release of relay MT3 breaks the energizing circuits to relays MA and 1.C to 8.C, which are released. Relay MT3 also breaks the energizing circuit to MT4, but relay MT4 is held by its holding circuit from MT5.

The release of pairing relay TM3 breaks the energizing circuits to addition relays in the groups 1.A to 6.A and 7.A, which release relay 7.L9, but this relay remains held over the closed contact in relay 7.X. The release of 1.A to 6.A releases 1.TS to 6.TS.

Relay MA, when released, breaks the circuit to the odds actuating relay 7.V1, and the release of the actuating relay causes the contact to be locked closed in the relay 7.L9 and the holding circuit for relay 7.L9 to be opened.

The release of relays 1.C to 8.C, after the relays 1.GC to 8.GC have been released, will cause the circuits to the relays 1.NT to 8.NT to be completed and these relays energized. The release of relays 1.C to 8.C also restores the energizing lines to relay MTN.

The release of MT3 causes the energization of the pairing relay TM4 and the control relay MB.

Relay TM4 provides the necessary zero controls and pairs the keyboard switch cables with the cables as 1.D, 10D to provide the required partial product components for the fourth denominational order of the partial product.

The operations during the various succeeding stages are similar to those given above, and it is believed that the circuits already traced will be sufficient for an understanding of the invention without having the circuits for the remaining stages explained in detail.

The various stages of operation of the electrical multiplying unit continue in the manner outlined above, through the timing chain relays, pairing relays, addition relays and product register relays until the energization of the timing chain relay MT12 (Fig. 25A), which is energized after the pairing relay TM11 and control relay MA have been energized. The odd number actuating relay 7.V1 is energized at the same time as relay MT12. The operation of relay MT12 breaks one holding circuit to MT11 and the energizing line to relay TM11, but both of these relays continue to be held through their holding circuits. Relay 7.V1 moves the 11th thrust bar, preparing a holding circuit for the relay 7.L0. The timing chain relay MT12 closes its holding circuits, one of which comes as usual from + over MT13—6, MT12—5, MT12—2 to MT12—1, and the other holding circuit comes from + over the control switch BSS—1 (Figs. 4 and 19), MT12—22 to MT12—1. The relay MT12 energizes the non-transfer indicating relays 1.C to 8.C. Relay 7.L0 closes its holding circuit over the closed contacts in 7.X. The odd number actuating relay 7.VI raises the hooks on the 11th thrust bar.

Relays 1.C to 8.C release the general holding relay MTN and the non-transfer control relays 1.GC to 8.GC (Figs. 22, 23 and 28), whereupon relay MTN releases the timing chain relay MT11, the pairing relay TM11 and the non-transfer relays 1.NT to 8.NT. Relay MT11, upon being released, releases the control relay MA and relays 1.C to 8.C, and likewise breaks the energizing line to MT12, but MT12 remains energized through its holding circuit. Release of relay TM11 releases the addition relays 1.A to 7.A and the transfer switch relays 1.TS to 6.TS, but the relay 7.L0 remains energized. Release of the control relay MA releases the odd actuating relay 7.VI. Relays 7.GC to 8.GC energize relays 1.NT to 8.NT and relays 1.C to 8.C energize the general holding relay MTN. The release of relay MT11 causes the energization of the pairing relay TM12 and the control relay MB. The release of relay 7.VI allows the 11th thrust bar to return, locking the contact closed in 11th place in relay 7.L0, and then releasing relay 7.L0.

The general holding relay MTN (Fig. 27A) completes a third holding circuit to the timing relay MT12 over MT11—4 and MT11—3. The non-transfer relays 1.NT to 8.NT close their holding circuits, and also energize the non-transfer control relays 1.GC to 8.GC. The operation of the pairing relay TM12 (Fig. 26) causes the holding circuit thereto to be closed and likewise causes the selective energization of the addition relays 1.A to 7.A. Relays 1.GC to 8.GC break the energizing circuits to 1.NT to 8.NT but relays 1.NT to 8.NT continue to be held through their holding circuits. Relays 1.GC to 8.GC close their holding circuits.

The addition relays 1.A to 7.A energize the transfer switch relays 1.TS to 6.TS and the relay 7.L0. Addition relay 7.A0 energizes the timing chain relay MT13 and the odd number actuating relay 7.V2. Relay MT13 breaks one holding circuit to relay MT12, but the latter continues to be held, and likewise MT13 breaks the energizing circuit to TM12, but TM12 continues to be held through its holding circuit. Relay 7.V2 moves the 12th thrust bar of the product register, preparing the holding circuit for the locking relays. Relay MT13 closes its holding circuit from ++ over the control switch FFS—1 (Figs. 4B and 21) MT13—2 to MT13—1 and from + over MT12—25, MT13—2, to MT13—1. The relay 7.L0 closes its holding circuit. Relay 7.V2 raises the hooks on the 12th thrust bar. The non-transfer indicating relays 1.C to 8.C release relay MTN and relays 1.GC to 8.GC (Figs. 22 and 23).

The order of events in the completion of the multiplying cycle depends upon whether or not the first mechanical or factor entering cycle has been completed. For example, if the first mechanical cycle has not been completed, the control switch BSS (Figs. 4B and 19) is still closed, as explained earlier herein, and as will be seen from observing (Fig. 4B). In this case the general holding relay MTN breaks one holding circuit to relay MT12, but MT12, and along with it, its corresponding pairing relay TM12, remain energized through the switch BSS. This results in the continued holding of relays MB, 1.C to 8.C, 1.A to 7.A, 1.TS to 6.TS and 7.L. The control relay MB continues to hold 7.V2 (Figs. 24A and 25A). The general holding relay MTN releases the non-transfer relays 1.NT to 8.NT. The non-transfer control relays 1.GC to 8.GC cannot energize their associated non-transfer relays 1.NT to 8.NT since the circuits are broken in the non-transfer indication relays 1.C to 8.C. Consequently relay MTN remains released. At this point all action in the electrical multiplying unit ceases, pending the release of the timing chain relay MT12.

If the first mechanical cycle has been completed, the opening of the control switch BSS (Figs. 4B and 19) breaks the holding circuit to relay MT12 and its associated pairing relay TM12, thus releasing both relays. The release of relay MT12 releases the control relay MB and relays 1.C to 8.C. Likewise the release of MT12 breaks the energizing circuit and one holding circuit to relay MT13 but MT13 is still held over by the control switch FSS (Figs. 4B and 21). The release of relay TM12 releases the addition relays 1 to 7.A and relays 1.TS to 6.TS but the locking relay 7.L continues to be held. The release of relay MB releases the even number actuating relay 7.V2.

There are no more TM or pairing relays to be energized and there are no further energizing circuits to the control relays MA or MB. The release of the evens actuating relay 7.V2 allows the 12th and last thrust bar to return, thus locking the contact in 12th place in the locking relay 7.L0. The release of the timing chain relay MT12 (Fig. 25A) completes a circuit from ++ over MT13—20, MT12—23, MT12—24 to RM1—1, the winding of the control plus switch release RM1 (Fig. 25A). The release of relay MT12 also completes a circuit from ++ over MT12—26, MT13—21, MT13—19, over the common wire 7.L0—14, from which the circuit branches, one branch going from each of the locked contacts in register 7 (Figs. 24B to 24D) over the cables 7.L0—15, 7.L1—15, 7.L2—15, to 7.L9—15, which are grouped in cable 7.L8—16, over the corresponding wires of the cables a, b, c, to l (Figs. 15 and 24) to the windings of the correspondingly numbered rack stop magnets RSM 369 (Figs. 4B and 15).

It will be seen by referring to Figs. 24A to D that each of the relays 7.L0 to 7.L9 inclusive, of the product register, has twelve locking contacts a to l inclusive, corresponding to the twelve denominational places of the product, and it is, therefore, obvious that several contacts may be locked in any one relay. For example, relay 7.L0 may have several zeros locked in the different denominational orders thereof and 7.L5 may have several 5's locked in the contacts of the different denominational orders thereof, so that several of the branch circuits may lead from each or any one of the relays into any one of the cables 7.L0—15 to 7.L9—15. However, it is possible for only one digit to occur in each denominational order. For example, if the "a" contact in relay 7.L0 is locked, no other "a" contact in the other relays 7L1 to 7L9 inclusive can be locked. Therefore it is possible for only one circuit to lead into any one of the cables a to l inclusive, and therefore only one rack stop magnet RSM in each of the denominational groups a to l can be energized at one time. When no other digit is transmitted to the rack stop magnets, a zero will always be sent through by the relay 7.L0.

After the selected contact in the 12th denominational order has been locked, by return movement of the twelfth thrust bar, continued return movement of said bar releases the locking relay 7.L0. The non-transfer indicating relays 1.C to 8.C restore the energizing lines to the general holding relay MTN and to the non-transfer relays 1.NT to 8.NT. Operation of the control plus switch release relay RM1 (Fig. 25A) breaks the energizing circuit to the control plus switch CPS (Fig. 27A), resulting in the release of said switch.

The release of the control plus switch removes the main plus source from all the points marked +, which results in the releasing of the following relays: All multiplication relays A.M to D.M, energized from + over the switchboard. The general holding relay MTN, energized from + over the non-transfer indicating relays 1.C to 8.C. The holding relay 7.X for the product register, energized from plus direct. The reset control relay RC (Fig. 29) held from plus direct. The transfer control relays 1.GD to 8.GD held from + over the transfer indicating relays 1.D to 8.D. The auxiliary starting relay ST2 for the timing chain (Fig. 25A) held from plus direct. The non-transfer relays 1.NT to 8.NT energized from + over ST2—8. The release relay 7.U for the product register, which is energized from + over the decimal slide DS (Fig. 16). The reversing and energizing relays VX and UC (Fig. 29), in case they are energized, held from + direct. All relays have now been released except the control plus switch release relay RM1, the last timing chain relay MT13, and the rack stop magnets RSM.

The release of the timing chain auxiliary starting relay ST2 (Fig. 25A), completes a circuit from ++ over relay RM1—5, ST2—6, ST2—7, to RM2—1, the winding of the release solenoid RM2, which initiates the second or product printing operation of the mechanical portion of the machine. Energization of the solenoid RM2 sets the necessary controls for the product printing operation, releases the keyboard switches 344 (Fig. 4B), the control switch PBS (Figs. 8 and 18), the Multiplication key 54 (Fig. 4) and trips the machine by depressing the Motor Bar 50, all of which was fully explained near the beginning of this specification.

At the beginning of the product printing cycle, the actuators 68 and their respective extensions 337 (Figs. 3 and 4) begin their initial movements rearwardly, under influence of the leading frame 91, as explained previously. This movement of the actuators and the extensions 337 is terminated by the bent-over ears 365 on said extensions coming in contact with the upper ends of the rack stop bars 366, or the zero stop bars 370, which have been moved upwardly to effective positions by energization of their respective rack stop magnets 369. This positions the extensions 337 and their associated actuators 68 in proportion to the product locked in the product register 7, and as each of said actuators 68 (Fig. 3) is connected to its associated printing sector 96, said printing sector is likewise positioned in relation thereto. After said printing sectors are thus positioned they are released for their printing stroke, in the usual manner, to print the product upon the record material supported by the platen roll 112.

Near the end of the product printing cycle the pawl 415 (Fig. 4B), in cooperation with the block 413, opens the control switch FFS (see also Fig. 21) to break the last holding circuit to the last timing chain relay MT13 (Fig. 25A), thus releasing said relay. The release of relay MT13 breaks the energizing circuit to the rack stop magnets 369, and to the control plus switch release relay RM1 (Fig. 25A). The release of relay RM1 breaks the energizing circuit to the machine release solenoid RM2. All circuits have now been broken and all relays have, therefore, been released, and the machine comes to rest and is now ready for the next multiplying operation.

The locked contacts in register 7 (Fig. 24) remain locked at the end of machine operation and are not released until the beginning of the succeeding machine operation, at which time the control switch PBS (Figs. 8 and 18) is closed, in the manner explained previously, to energize the product register clearing relay 7.W. Operation of relay 7.W moves all the thrust bars in the product register to raise the hooks and release all contacts, which were locked in the preceding operation, thus clearing the product register in preparation for the present operation.

MODE OF OPERATION

It is believed that a thorough understanding of the mode of operation of the machine of the present invention will have been obtained from the preceding specification. Nevertheless, it is believed that a brief outline of operation at this point may be helpful.

Using the bill or statement shown in Fig. 32 as an example, let us assume that the John Doe Company, a retail haberdashery has purchased a bill of goods from the Wholesale Merchandising Company. In making out a bill for this goods the Wholesale Merchandising Company will generally proceed in the following manner:

The operator first makes sure that the traveling carriage is in its extreme right-hand or starting position and that the throat of the front feed platen is open. Next a statement sheet, blank or bill, similar to that shown in Fig. 32, is inserted in the open throat of the front feed platen, positioned in relation to the printing line, and the throat of the front feed platen closed. Using the keys 57 of the typewriter attachment (Fig. 2), the operator types in the name of the purchaser (John Doe Company) after which the traveling carriage is returned to starting position to bring the Description column of the bill opposite the printing point of the typewriter and the platen roll is rotated to position the body portion of the bill in proper relationship to the printing line.

Next the first item (Ties) is typed in the Description column and the unit designation (EA) an abbreviation for each, is typed in the proper column, after which the traveling carriage is returned to starting position to position the Unit Quantity and Unit Price columns in proper relationship to the type sectors of the accounting machine. Next the quantity or multiplier, (100) is set up on the quantity or multiplier keys 47 (Fig. 2) and the price or multiplicand ($1.50) is set up on the price or multiplicand keys 46.

In setting up the quantity on the keys 47 the operator will make sure that if there are no decimal places in the quantity the decimal slide indicator 56 is in the zero position, and if there are decimal places in the quantity that said indicator is positioned in accord therewith.

After the quantity and the price have been set up, the operator initiates the multiplying operation by depressing the Multiplication key 54.

During the first mechanical or factor entering operation of the machine, the quantity and price are printed in their respective columns on the bill and simultaneously entered as factors in the multiplying unit. The traveling carriage then tabulates automatically to bring the Quantity Price column of the bill opposite the type sectors. During the multiplying cycle, which follows the factor entering operation without interruption, the price is multiplied by the quantity and the product is locked in the product register. After the multiplying cycle is completed, the last mechanical or product printing operation of the machine follows automatically, and during this operation the actuators and their respective printing sectors are positioned in proportion to the product, and said product, in this case $150.00, is printed in the Quantity Price column.

Tabulation of the traveling carriage to the Quantity Price column causes a control block on said carriage, in cooperation with the add hanging bar lever, to select and condition the balance or #1 totalizer for an adding operation. During the last mechanical operation the quantity price, ($150.00) is added in the #1 totalizer of the accounting machine. Near the end of the last mechanical operation, the traveling carriage is automatically returned to starting position and the platen roll is automatically rotated to line-space the bill.

The operator types in the second item, (Socks) types the unit designation Pr. for pair, after which the traveling carriage is returned to locate the Unit Quantity and Units Price columns in proper relationship to the printing mechanism of the accounting machine.

Next the unit quantity, (200) is set up on the keys 47, and the unit price, or price per pair, ($1.00) is set up on the keys 46, after which depression of the Multiplication key 54 initiates another multiplying operation, during which the date, quantity and price are printed in their respective columns and simultaneously transferred to the electrical multiplying unit. The traveling carriage then tabulates automatically to bring the quantity price column opposite the printing mechanism. After the price has been multiplied by the quantity, the last mechanical operation of the machine is initiated, in the manner set out above, to print the quantity price or product, in this case $200.00, in the Quantity Price column and to simultaneously add the unit total in the balance totalizer.

As before, the traveling carriage is returned automatically to starting position and the bill simultaneously line-spaced. However, as this is the last item, the operator depresses the typewriter tabulating key 79 (Fig. 2) to bring the last or Balance column of the bill opposite the printing mechanism. The operator then depresses the Balance key 48 (Fig. 2) and initiates a balancing operation by depressing the motor bar 50, during which operation the Balance totalizer is closed and the balance of the bill, $350.00, is printed in the Balance column.

The above simple example of multiplication is but one of the many ways in which the machine embodying the instant invention may be used to advantage in various business systems. Further illustrations of the versatility and flexibility of this machine are given in Figs. 33, 34 and 35, which outline three business systems involving credits, debits, multiplication, simple and chain discounts.

Explaining first the system used in connection with the fragmentary bill shown in Fig. 33, after making sure that the traveling carriage is in the extreme right-hand position, the operator types the description of the article, (Ties) types the units designation (EA) for each, after which the traveling carriage is returned to starting position by use of the Credit return bar 58 (Fig. 2), to locate the Unit Quantity and Unit Price columns in proper relationship to the accounting machine type sectors. Next the quantity (100) is set up on the multiplier keys 47, and the price, ($1.50) is set up on the multiplicand keys 46.

The operator then depresses the Multiplication key 54 (Fig. 2) to initiate a multiplying operation, and during the first or factor-entering operation, the unit quantity and unit price are imprinted in their respective columns, after which, in the multiplying cycle, they are multiplied and in the final or product printing operation the traveling carriage is tabulated to the Quantity Price column, and the product ($150.00) is printed in this column and simultaneously added in the balance totalizer, which has been selected for addition in the manner explained previously.

The next item (Handkerchiefs) is handled in exactly the same manner as the ties, and after the quantity price or product ($30.00) has been printed in the Quantity Price column, the operator line-spaces the platen roll by depressing the Vertical Feed bar 51 (Fig. 2). Next the balance totalizer is sub-totalized, and the sub-total ($180.00) of the two items, is printed in the Quantity Price column, directly below said items. After the sub-total has been printed, the traveling carriage is automatically returned to starting position to properly position the Description column in relation to the printing point of the typewriter keys 57. During the return movement of the traveling carriage the platen roll is automatically rotated to line-space the bill. The discount rate of 40% is then typed in the Description column, after which the Charge return bar 59 (Fig. 2) is depressed to return the traveling carriage to a non-print position for the accounting machine printing mechanism. After determining that the decimal slide 56 is in the proper position, in this case the second position, the discount of 40% is set up on the multiplier keys 47, the #1 add key 48 depressed, and the machine is released for an adding operation by depressing the Vertical Feed bar 51. During this operation the discount is added in the left-hand side of the balance totalizer, and since the traveling carriage is in non-print position the discount will not be printed, and as the Vertical Feed bar was used to release the machine, the bill will be lined-spaced during this operation.

Next the Sub-Total and Balance keys are depressed, after which the Multiplication key 54 is depressed to initiate a multiplying operation, and during this operation the amounts on the two sides of the balance totalizer are transmitted to the electrical multiplying unit and are multiplied together, but are not printed as factors in the Unit Quantity and Unit Price columns, as the traveling carriage is still in non-printing position. Immediately after multiplication starts, the traveling carriage tabulates to aline the Quantity Price column of the bill with the accounting machine printing sectors.

Immediately after the multiplying operation is under way the subtract key 48 (Fig. 2) is depressed, to cause the amount of the discount or product ($72.00) to be printed in red in the Quantity Price column, and simultaneously subtracted from the balance totalizer, thereby leaving the net amount ($108.00) therein. The traveling carriage is then tabulated to the Balance column by using the typewriter tabulating key 79, after which the operator depresses the Balance key 48 and the Motor Bar 50 to initiate a balance operation, in which the balance totalizer is totalized and the balance therein ($108.00) is cleared therefrom and simultaneously printed in the Balance column.

Fig. 34 is an example illustrating how the machine of the present invention is used in dealing with chain discounts.

In this example, the two items, Ties and Handkerchiefs, are handled in exactly the same manner as explained in connection with Fig. 33, and after the balance totalizer has been sub-totalized, to print the sub-total ($180.00), in the Quantity Price column, the traveling carriage is automatically returned to the extreme right-hand position. Next, the typewriter keys 57 (Fig. 2) are used to type in the discount rates of 75, 50, and 20 per cent, after which the traveling carriage is returned to its extreme right-hand or non-print position and the motor bar control lever (not shown) is placed in second position to prevent automatic tabulation of the traveling carriage, to retain said carriage in non-print position.

Next the decimal point control slide is placed in the proper position, in this case the second position, after which the complement (25) of the first discount rate is set up on the multiplier keys 47 and the Motor Bar 50 is depressed to add the complement of the first discount rate in the left-hand side of the balance totalizer. Next the Balance key 48 (Fig. 2) and the Multiplication key 54 are depressed to initiate a multiplying operation in which the balance totalizer is cleared, and the amount ($180.00) in the right-hand side thereof, and the discount rate (25) in the left-hand side thereof, are cleared from said totalizer and simultaneously entered in the multiplying unit as factors which are multiplied together and the product thus obtained entered in the balance totalizer.

The other discount rates, 50 and 20%, are dealt with in exactly the same manner as explained above, and after the last rate has been dealt with, the motor bar control lever is moved to its first or normal position. The traveling carriage is then tabulated to the Balance column, the Balance key 48 and the Motor Bar 50 are depressed, to clear the balance totalizer and simultaneously print the total or balance, ($18.00) in the Balance column.

The example illustrated in Fig. 35 is more or less a combination of the other three examples illustrated in Figs. 32, 33 and 34. In this case the two items, Ties and Handkerchiefs, and the discount rate of 40% thereon, are handled in the same manner as explained in connection with Fig. 33. The third item, (Wool Socks) is dealt with in exactly the same manner as the other two items, after which the traveling carriage is returned to its extreme right-hand position and the item, Express, typed in the Description column. After this the accounting machine tabulating key 55 (Fig. 2) is depressed, to tabulate the traveling carriage to the Quantity Price column, the amount of the express ($5.50) is then set up on the multiplicand keys 46, after which the Motor Bar 50 is depressed to add the amount of the express in the balance totalizer and simultaneously print said amount in the Quantity Price column.

After the express item has been printed in the Quantity Price column and added in the balance totalizer, the typewriter tabulating key 79 (Fig. 2) is depressed, to tabulate the traveling carriage to the Balance column, and a sub-total operation is performed to print the sub-total ($149.50) in the Balance column. The traveling carriage is then returned to the Description column, where the notation, By Check, is typed therein, after which the traveling carriage is tabulated to the Quantity Price column by depressing the accounting machine tabulating key 55. The amount of the check ($100.00) is then set up on the multiplicand keys 46 and a subtract operation is performed, during which the amount of the check ($100.00) is subtracted from the balance totalizer and simultaneously printed in red in the Quantity Price column. After this, the typewriter tabulating key 79 is depressed to tabulate to the Balance column, and a balance operation performed to clear the balance totalizer and print the balance, ($49.50) in the Balance column of the bill.

The above four examples of operation illustrate in a general way the capabilities of the machine of this invention. However, there are numerous other ways in which this machine may be used to advantage in solving the many problems presented by the various business systems in use in the business world.

While the form of mechanism herein shown and described is admirably adapted to fulfill the objects primarily stated, it is to be understood that it is not intended to confine the invention to the one form or embodiment herein disclosed, for it is susceptible of embodiment in various forms, all coming within the scope of the claims which follow.

What is claimed is:

1. In a machine of the class described, the combination of a plurality of keys; a member differentially positioned under control of said keys; a plurality of switches; a shiftable frame; a plurality of switch closing members, one for each of said switches, displaceably mounted in said frame, said members being normally in ineffective position but displaceable to effective or switch closing position; means to retain the members in displaced or switch closing position; means on the differential member to select said displaceable members; means to shift said frame to cause a selected member first to be displaced and retained in displaced position and thereafter to close a corresponding switch; and means to operate said retaining means to release said displaceable member and allow said switch to open.

2. In a machine of the class described, the combination of a plurality of keys; a member differentially positioned under control of said keys; a plurality of switches; a shiftable frame; a plurality of switch closing members, one for each of said switches, displaceably mounted in said frame, said switch closing members being normally in ineffective position but displaceable to effective or switch closing position; means to retain the switch closing members in displaced or switch closing position; means on the differential member to select any one of said switch closing members; normally inoperative means to shift said frame; a control member; means operated by said control member to render the shifting means operative to shift said frame to cause a selected member first to be displaced and retained in displaced position and thereafter to close a corresponding switch; and means to operate said retaining means to release said displaceable member and allow said switch to open.

3. In an accounting machine having an electrical multiplying mechanism, said accounting machine being operable to perform a factor-entering operation and a product-printing operation and said multiplying mechanism being operable to compute said product, the combination of a manipulative member to initiate said factor-entering operation; a plurality of keys for setting up the digits of a multiplier and a multiplicand; a plurality of switches, one corresponding to each of said keys; a shiftable frame; a plurality of switch closing members, one for each of said switches, displaceably mounted in said frame, said switch closing members being normally in ineffective position but displaceable to effective or switch closing position; means in said frame to retain the members in displaced or switch closing position; means on the differential members to select the switch closing members; a control switch for initiating a computing operation of the multiplying mechanism; means to shift said frame to cause the control switch to be closed and the selected switch closing members first to engage the means on the differential members to be displaced thereby and thereafter to close said switches; actuating means for said shifting means; means operated by said manipulative member to couple the actuating means to the shifting means; means to retain the coupling means in effective position; normally inoperative means to release said switch closing member retaining means; and means operated by the multiplying mechanism to initiate said product-printing operation of the accounting machine, release the retaining means for the coupling means to render the shifting means inoperative by its actuating means, and render the releasing means for the switch closing member retaining means operative to thereby cause all of the closed switches to be opened during said product-printing operation.

4. In an accounting machine having an electrical multiplying mechanism, said accounting machine being operable to perform a factor-entering operation and a product-printing operation and said multiplying mechanism being operable to compute said product, the combination of a manipulative member to initiate said factor-entering operation; a plurality of keys for setting up the digits of a multiplier and a multiplicand; a plurality of switches, one corresponding to each of said keys; a shiftable frame; a plurality of switch closing members, one for each of said switches, displaceably mounted in said frame, said switch closing members being normally in ineffective position but displaceable to effective or switch closing position; means in said frame to retain the members in displaced or switch closing position; means on the differential members to select the switch closing members; a control switch for initiating a computing operation of the multiplying mechanism; means to shift said frame to cause the control switch to be closed and the selected switch closing members first to engage the means on the differential members to be displaced thereby and thereafter to close said switches; actuating means for said shifting means; means operated by said manipulative member to couple the actuating means to the shifting means; means to retain the coupling means effective; normally inoperative means to release said switch closing member retaining means; product storage means settable by the multiplying mechanism according to the digits of the product; normally inoperative stop members controlled from said product storage means for stopping said differential member according to the digit values of the product; means operated by the multiplying mechanism after the product is set up in the storage devices for rendering the stop members operative, initiating said product-printing operation of the accounting machine, releasing the retaining means for the coupling means to render the shifting means inoperative, and rendering the releasing means for the switch closing member retaining means operative, to thereby release all the switches and prevent the reclosing of the switches when the differential members are set according to the product.

5. In a recording multiplying machine, the combination of means to set up the factors of a problem, one of which factors may contain a whole part and a decimal part; multiplying means controlled by said factor set up means to compute the digits of the product order by order beginning with the lowest denominational order thereof; means, normally inoperative, having denominational elements for receiving and storing the digits of the product order by order as they are formed; a plurality of recording elements having fixed denominational significance and always controlled from the same denominational elements of the product storing means; a control member settable according to the number of digits in the decimal part of said one factor; and means controlled by said control member for rendering the product storing means operable to receive and store digits when the digit of the product is formed which has the same denominational significance as that of the lowest order recording element.

6. In a recording multiplying machine, the combination of keys for simultaneously setting up a multi-digit multiplier and a multi-digit multiplicand; switches closable under control of said keys; electrical multiplying mechanism controlled by said switches and operable to form the digits of the product order by order beginning with the lowest denominational order thereof; product storing means controlled by said multiplying mechanism and having denominational elements for receiving and storing the digits of the product order by order as they are formed; a plurality of recording elements having fixed denominational significance and controlled from the denominational elements of like denominational significance in said storing means; a decimal control slide settable in accordance with the position of the decimal point in one factor; and means controlled by said slide for controlling the operation of the product storing means to prevent the entry and storage of digits in the product storing means until the digit of the product is formed which has the same denominational significance as that of the lowest order recording element.

7. In a recording multiplying machine, the combination of keys to set up the digits of both factors of a problem, one of which factors may contain a whole number part and a decimal part; a plurality of switches; means controlled by said keys to close said switches according to said digits; electrical multiplying mechanism controlled by said switches, and operable in successive stages to form the digits of the product order by order beginning with the lowest denominational order thereof; means, normally inoperative, having denominational elements to receive and store the digits of the product order by order as they are formed; a plurality of recording members having fixed denominational significance for recording said product; means for controlling the recording members always from the denominational elements of the storing means having the same denominational significance as the recording members; electrically operable means to render the storing means operative to receive and store digits; a plurality of control contacts; means for selectively closing one or another of said control contacts according to the number of digits in the decimal part of said one factor; circuits for controlling said electrically operable means, one circuit extending from each of said contacts to said electrically operable means; and means for completing said circuits successively one after the other in different stages of the multiplying operation whereby the circuit connecting the closed control contact to the electrically operable means will be completed at the proper stage of the operation and will enable the product storing means to receive and store digits when the digit of the product is formed which has the same denominational significance as that of the lowest order recording member.

8. In an accounting machine having a multiplying mechanism cooperable therewith, said accounting machine being operable to perform a factor entering and printing or first operation and a product printing or second operation and said multiplying mechanism computing the product of said factors, the combination of a plurality of manipulative devices to set up the digits of a multiplier and a multiplicand; differential means settable under control of said manipulative devices; multiplier and multiplicand entry receiving means settable under control of the differential means according to the multiplier and multiplicand during the first operation of the accounting machine, and operable to control said multiplying mechanism according to said factors; cyclically operable means to control the sequence of operation of the multiplying means in performing a computation; manipulative control means to initiate said first operation of the accounting machine; means operated by the accounting machine in said first operation and after said entry receiving means have been set, for initiating the operation of the cyclically operable means to thereby initiate an operation of the multiplying mechanism to compute the product; means controlled by the cyclically operable means for initiating said second operation of the accounting machine when the computation is completed; and means operated by the accounting machine in said first operation to control the cyclically operable means of the multiplying mechanism to delay the completion of the computation until said first operation has been completed thereby to prevent the automatic initiation of the second operation of the accounting machine before the completion of the first operation thereof.

9. In an accounting machine having an electrical multiplying mechanism, said machine having printing means and adapted to perform multiplication problems in three continuous operations, namely, a factor entering and printing or first operation of the accounting machine, a multiplying operation of the electrical multiplying mechanism, and a product printing or second operation of the accounting machine, the combination of a plurality of manipulative devices to simultaneously set up the digits of a multiplier and a multiplicand; switches corresponding to the manipulative devices for controlling the multiplying mechanism; means differentially operable from a normal position under control of said devices during said first operation of the accounting machine for controlling the closure of said switches; cycle control means to control the sequence of operations of the multiplying mechanism to perform a computation; means, operated by the accounting machine during the return of the differentially operable means to normal position, to control the cycle control means and initiate an operation of said multiplying mechanism; means controlled by said cycle control means to initiate said second operation of said accounting machine at the end of a multiplying operation; and means operable in said first operation of the accounting machine to arrest the operation of the cycle control means to delay the completion of the multiplying operation and consequent initiation of the second operation of the accounting machine until said first operation of the accounting machine has been completed.

10. In an accounting machine having an electrical multiplying mechanism, said accounting machine having printing means and operable to perform a factor entering and printing or first operation and a product printing or second operation and said multiplying mechanism having product receiving means and contral means sequentially operable to control, in succession, the operations necessary to produce the product, the combination of a plurality of depressible keys for setting up the digits of a multiplier and a multiplicand; switches corresponding to said keys for controlling the multiplying mechanism; differential means operable from a normal position under control of said keys in said first operation for controlling the selective closure of said switches; means operated during the return of the differential means to normal position to initiate the sequential operation of the control means in the multiplying mechanism; manipulative means to initiate said first operation of the accounting machine; a plurality of stop members settable under control of the product storing means for controlling the differential means in the second or product printing operation of the accounting machine; means operated by the sequential control means in the last sequence of control of the multiplying mechanism for initiating said second operation of the accounting machine and causing said stop members to be set; and means operable in said first operation of the accounting machine to block the last sequential operation of the control means of the multiplying mechanism until the accounting machine has completed its first operation and the differential means are in normal position, to thereby prevent the initiation of the second operation of the accounting machine and the control of the differential means by the stop members until the first operation is finished.

11. In an accounting machine having an electrical multiplying mechanism, said accounting machine being operable to perform a factor entering and printing or first operation and a product printing or second operation and said multiplying mechanism computing the product of said factors, the combination of depressible keys to simultaneously set up a multiplier and a multiplicand; a multiplying mechanism operation initiating switch; an electric switch for each of the multiplier and multiplicand keys, for completing circuits to the multiplying mechanism corresponding to the depressed multiplier and multiplicand keys; said switches including stationary blades and corresponding movable connectors therefor; a shiftable framework for supporting the movable connectors; power means to operate the accounting machine; means to connect the shiftable framework to the power means; a multiplication key to initiate an operation of the power means; denominational actuators controlled by the depressed multiplier and multiplicand keys and having projections which selectively cooperate with the movable connectors; means, operated by the multiplication key, to connect the shiftable framework to the power means to enable the shiftable framework to be moved downwardly by the power means to cause the projections on the actuators to displace the movable connectors corresponding to the depressed keys; means to latch the displaced connectors in displaced position, whereupon return movement upwardly of the framework causes said connectors to be forced between the blades of the corresponding switches to cause the circuits, corresponding to the depressed multiplier and multiplicand keys, to be closed; and means cooperating with the connector for the multiplication initiating switch to cause the connector to be displaced and the switch to be closed by the shifting movement of the framework to thereby initiate an operation of the electrical multiplying mechanism to perform a computation according to the multiplicand and multiplier set in the switches.

12. In an accounting machine with an electrical multiplying mechanism, said machine being operable to perform a first or factor entering and printing operation and a second or product printing operation and said electrical multiplying mechanism being operable to compute the product of said factors, the combination of depressible keys to simultaneously set up a multiplier and a multiplicand; electrical switches comprising stationary blades and corresponding movable connectors, said switches corresponding to the multiplier and multiplicand keys; a shiftable framework to support the movable connectors; actuators to be controlled by the multiplier and multiplicand keys; projections on the actuators to cooperate selectively with the movable connectors corresponding to the depressed multiplier and multiplicand keys; power means to operate the accounting machine; manipulative means to initiate the first operation of the accounting machine by rendering the power means operative; means rendered effective by the manipulative means and operated by the power means to shift the framework from a normal position to cause the movable connectors, corresponding to the depressed keys, to be displaced in relation to said framework by engaging the projections on the actuators and thereafter to shift the frame back to its normal position; means to latch the movable connectors in displaced position, whereupon return movement of the framework to its normal position forces said movable connectors between the switch blades to complete circuits to the electrical multiplying mechanism, said circuits corresponding to the multiplier and multiplicand; a control switch closed upon return movement of the framework to initiate an operation of the multiplying mechanism; control means to initiate an operation of the power means to cause the second or product printing operation of the accounting machine; and latch releasing means connected to the power means by said control means and operative during the second or product printing operation to release the latches to allow the displaced movable connectors to return to normal position.

13. In an accounting machine having an electrical multiplying mechanism, said accounting machine being operable to perform a factor entering and printing or first operation and a product printing or second operation and said multiplying mechanism computing the product of said factors, the combination of keys to set up a multiplier and a multiplicand; actuators operable in said first and second operations of the accounting machine; a plurality of electrical switches corresponding to the multiplier and multiplicand keys; means on the actuators to select, under control of the depressed multiplier and multiplicand keys in the first or factor entering operation, switches corresponding to depressed keys; means, effective during the factor entering operation, to close the selected switches to enter the multiplier and multiplicand in the electrical multiplying mechanism; means to initiate said second or product printing operation of the accounting machine; and means operated by the second operation initiating means to render said switch closing means inoperative thereby to enable the actuators to be used in said product printing operation without entering the product value in said switches.

14. In an accounting machine having an electrical multiplying mechanism, said accounting machine being operable to perform a factor entering and printing or first operation and a product printing or second operation and said multiplying mechanism computing the product of said factors, the combination of keys to set up a multiplier and a multiplicand; actuators differentially operable in said first and second operations of the accounting machine; a plurality of electrical switches corresponding to the multiplier and multiplicand keys; means on the actuators to select, under control of the depressed multiplier and multiplicand keys, switches corresponding to depressed keys; shiftable means to close the selected switches to enter the multiplier and multiplicand in the multiplying mechanism; power operated means to drive said accounting machine; a manipulative device to initiate the first operation of the accounting machine by rendering the power operated means operative; means operated by the manipulative means to connect the shiftable means to the power operated means for operation thereby; control means to initiate an operation of the power operated means to cause the second or product printing operation of the accounting machine; and means operated by said control means to cause the shiftable means to be disconnected from the power operated means to prevent the closing of switches in said second operation, thereby to enable the actuators to be used in said second operation without causing the selective closing of switches.

15. In an accounting machine having an electrical multiplying mechanism, said accounting machine being operable to perform a factor entering and printing or first operation and a product printing or second operation and said multiplying mechanism computing the product of said factors, the combination of keys to set up a multiplier and a multiplicand; actuators differentially operable in said first and second operations of the accounting machine; a plurality of electrical switches corresponding to the multiplier and multiplicand keys; means on the actuators to select, under control of the depressed multiplier and multiplicand keys, switches corresponding to depressed keys; shiftable means to close the selected switches to enter the multiplier and the multiplicand in the multiplying mechanism; power operated means to drive said accounting machine; a manipulative device to initiate the first operation of the accounting machine by rendering the power operated means operative; coupling means operated by the manipulative means to connect the shiftable means to the power operated means for operation thereby; means to latch the coupling means in operated position to retain the connection between the shiftable means and the power operated means; control means to initiate an operation of the power operated means to cause the second or product printing operation of the accounting machine; and means operated by said control means to operate the latch to release the coupling means and cause the shiftable means to be disconnected from the power operated means to prevent the closing of switches in said second operation, thereby to enable the actuators to be used in said second operation without causing the selective closing of switches.

16. In an accounting machine having an electrical multiplying mechanism, said accounting machine being operable to perform a factor entering and printing or first operation and a product printing or second operation and said multiplying mechanism computing the product of said factors, the combination of a plurality of switches selectively closable to represent factor data; differentially operable means for selecting which of the switches will be closed; means shiftable to engage the differentially operable means and operable to close selected switches; shifting means operating means enabled in a factor-entering operation; a product receiving device; means controlled by the product receiving device to control the differentially operable means according to the value in said receiving device in said product printing or second operation of the accounting machine; control means to initiate said second operation of the accounting machine; and means operated by the control means to diable the operating means for the shiftable means to prevent the selection and closure of switches according to the product value in said second operation.

WILLIAM H. ROBERTSON.
ERIC R. COE.